US011345771B2

(12) United States Patent
Miyake et al.

(10) Patent No.: US 11,345,771 B2
(45) Date of Patent: May 31, 2022

(54) COMPOSITIONS AND METHODS OF PROMOTING ORGANIC PHOTOCATALYSIS

(71) Applicants: THE REGENTS OF THE UNIVERSITY OF COLORADO, Denver, CO (US); COLORADO STATE UNIVERSITY RESEARCH FOUNDATION, Fort Collins, CO (US)

(72) Inventors: Garret Miyake, Fort Collins, CO (US); Jordan Corinne Theriot, Denver, CO (US); Matthew D. Ryan, Longmont, CO (US); Ryan Michael Pearson, Fort Collins, CO (US); Tracy Allen French, Fircrest, WA (US); Haishen Yang, Shanghai (CN); Andrew Lockwood, Kent (GB); Charles Musgrave, Longmont, CO (US); Chern-Hooi Lim, Boulder, CO (US); Ya Du, Shanghai (CN); Blaine McCarthy, Fort Collins, CO (US)

(73) Assignees: The Regents of the University of Colorado, Denver, CO (US); Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 17/190,110

(22) Filed: Mar. 2, 2021

(65) Prior Publication Data
US 2021/0269558 A1 Sep. 2, 2021

Related U.S. Application Data

(60) Division of application No. 15/960,086, filed on Apr. 23, 2018, now Pat. No. 10,975,171, which is a continuation-in-part of application No. PCT/US2016/058245, filed on Oct. 21, 2016.

(60) Provisional application No. 62/378,563, filed on Aug. 23, 2016, provisional application No. 62/316,036, filed on Mar. 31, 2016, provisional application No. 62/245,804, filed on Oct. 23, 2015.

(51) Int. Cl.

| C08F 220/18 | (2006.01) |
|---|---|
| C08F 4/40 | (2006.01) |
| C08F 20/14 | (2006.01) |
| C08F 220/14 | (2006.01) |
| C08F 2/48 | (2006.01) |
| B01J 31/02 | (2006.01) |
| C07B 37/02 | (2006.01) |
| C07B 39/00 | (2006.01) |
| C07B 41/00 | (2006.01) |
| C07B 43/00 | (2006.01) |
| C07B 45/00 | (2006.01) |
| C08F 2/50 | (2006.01) |
| C08F 220/44 | (2006.01) |
| C08F 218/08 | (2006.01) |
| C08F 212/08 | (2006.01) |
| C08F 220/22 | (2006.01) |
| C08F 220/28 | (2006.01) |
| C08F 230/08 | (2006.01) |

(52) U.S. Cl.
CPC ..... *C08F 220/1811* (2020.02); *B01J 31/0244* (2013.01); *C07B 37/02* (2013.01); *C07B 39/00* (2013.01); *C07B 41/00* (2013.01); *C07B 43/00* (2013.01); *C07B 45/00* (2013.01); *C08F 2/48* (2013.01); *C08F 2/50* (2013.01); *C08F 4/40* (2013.01); *C08F 20/14* (2013.01); *C08F 220/14* (2013.01); *C08F 220/1804* (2020.02); *C08F 220/1807* (2020.02); *B01J 2231/12* (2013.01); *B01J 2231/42* (2013.01); *C08F 212/08* (2013.01); *C08F 218/08* (2013.01); *C08F 220/22* (2013.01); *C08F 220/285* (2020.02); *C08F 220/44* (2013.01); *C08F 230/085* (2020.02); *C08F 2438/01* (2013.01)

(58) Field of Classification Search
CPC ............. B01J 31/0244; B01J 2231/12; B01J 2231/41; C07B 37/02; C07B 39/00; C07B 41/00; C07B 43/001; C07B 45/00; C08F 2/45; C08F 2/50; C08F 4/40; C08F 20/14; C08F 212/08; C08F 218/08; C08F 220/14; C08F 220/18; C08F 220/1804; C08F 220/1807; C08F 220/22; C08F 220/285; C08F 220/44; C08F 230/08; C08F 2438/01
See application file for complete search history.

(56) References Cited

U.S. PATENT DOCUMENTS

| 10,647,056 B2 * | 5/2020 | Clark | G03F 7/031 |
|---|---|---|---|
| 2002/0114056 A1 * | 8/2002 | Berneth | G02F 1/1503 359/265 |
| 2018/0173070 A1 * | 6/2018 | Yamamoto | G02F 1/1516 |

FOREIGN PATENT DOCUMENTS

WO 2015113114 A1 8/2015

OTHER PUBLICATIONS

PubChem SID 78186551, CID 11244539 (3665-72-3), deposit date Jun. 12, 2009.
"International Search Report and Written Opinion dated Mar. 17, 2017 for PCT International Application No. PCT/US2016/058245".

(Continued)

*Primary Examiner* — Sanza L. McClendon
(74) *Attorney, Agent, or Firm* — Saul Ewing Arnstein & Lehr LLP; Kathryn Doyle; Domingos J. Silva

(57) ABSTRACT

The invention provides novel compounds and methods that are useful in promoting reactions that proceed through an oxidative quenching pathway. In certain embodiments, the reactions comprise atom transfer radical polymerization.

38 Claims, 36 Drawing Sheets

(56) References Cited

OTHER PUBLICATIONS

Wallentin, C-J., et al., "Visible Light-Mediated Atom Transfer Radical Addition via Oxidative and Reductive Quenching of Photocatalysts", J. Am. Chem. Soc., vol. 134, 2012, pp. 8875-8884.

* cited by examiner

| PC | Triplet energy (eV) | $E^0(PC^*/PC^{\bullet+})$ (V vs SCE) | $E^0(PC^{\bullet+}/PC)$ (V vs SCE) |
|---|---|---|---|
| 1 | 2.31 | −2.36 | −0.05 |
| 2 | 2.34 | −2.34 | 0.00 |
| 3 | 2.37 | −2.24 | 0.13 |
| 4 | 2.21 | −2.06 | 0.16 |

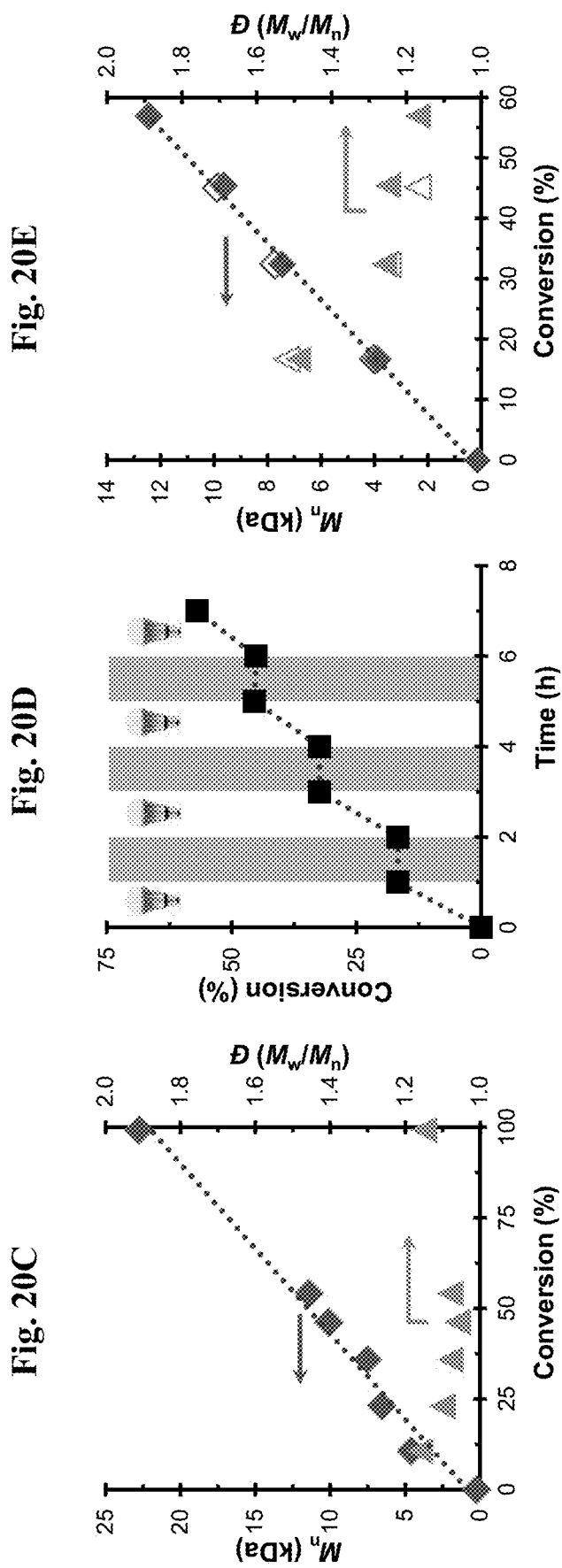

phenoxazine perylene    phenothiazine    dihydrophenazine 1-naphthalene-10-phenoxazine 1-naphthalene-10-phenothiazine $\delta = -0.03e$ $\delta = 0.03e$

³PC*

$\delta = 0.26e$ $\delta = -0.26e$

¹PC

*Phenoxazine*

$\delta = -0.53e$ $\delta = 0.20e$ $\delta = 0.33e$

³PC*

$\delta = 0.25e$ $\delta = -0.49e$ $\delta = 0.24e$

¹PC

*Dihydrophenazine*

$\delta = 0.21e$ $\delta = -0.21e$

³PC*

$\delta = 0.21e$ $\delta = -0.21e$

¹PC

*Phenothiazine*

COMPOSITIONS AND METHODS OF PROMOTING ORGANIC PHOTOCATALYSIS

CROSS-REFERENCE TO RELATED APPLICATIONS

The present application is a divisional of and claims priority under 35 U.S.C. § 121 to U.S. application Ser. No. 15/960,086, now allowed, which is a continuation-in-part of, and claims priority to, PCT International Application No. PCT/US2016/058245, filed Oct. 21, 2016, designating the United States and published in English as publication WO 2017/070560 on Apr. 27, 2017, which claims priority under 35 U.S.C. § 119(e) to U.S. Provisional Applications No. 62/245,804, filed Oct. 23, 2015, No. 62/316,036, filed Mar. 31, 2016, and No. 62/378,563, filed Aug. 23, 2016, all of which applications are incorporated herein by reference in their entireties.

STATEMENT REGARDING FEDERALLY SPONSORED RESEARCH OR DEVELOPMENT

This invention was made with government support under grant number DE-AR0000683 awarded by the Advanced Research Projects Agency-Energy (Department of Energy) and grant number R35GM119702 awarded by the National Institute of General Medical Sciences (National Institutes of Health). The government has certain rights in the invention.

BACKGROUND OF THE INVENTION

Atom transfer radical polymerization (ATRP) is one of the most powerful methodologies for precision polymer synthesis, and is considered to be the most important advancement in polymer synthesis in the last 50 years. Strict control over the equilibrium between a dormant alkyl halide and active propagating radical dictates a low concentration of radicals and minimizes bimolecular termination to achieve controlled polymerization. ATRP has historically relied on transition metal catalysts to mediate this equilibrium and polymerize monomers with diverse functionality into macromolecules with controlled molecular weight (MW), low MW dispersity (Đ), defined chemical composition, and complex architecture.

The caveat of traditional ATRP is that the transition metal catalysts present purification challenges for the polymer product and restrict their use in biomedical and electronic applications. Despite significant advancements to lower catalyst loading and improve purification techniques, organocatalyzed methods remain highly desirable. For example, organocatalyzed variants of ATRP using alkyl iodide initiators have been established, although they are not a broadly applicable replacement for metal-catalyzed ATRP. Considerable motivation thus exists for developing catalysts that mediate organocatalyzed ATRP (O-ATRP).

Photoredox catalysis is considered as a "green" process by introducing the opportunity to perform reactions under mild conditions, including ambient temperatures and using light. Upon irradiation and access of an excited state, a photocatalyst becomes both a stronger oxidant and reductant. This excited state molecule can then be exploited as a catalyst, through either a reductive or oxidative quenching pathway. The reductive quenching pathway commonly employs sacrificial electron donors, while the oxidative quenching pathway allows for direct electron transfer from the excited state photocatalyst. The reductive quenching pathway can be less desirable due to the need for a sacrificial electron donor, which can introduce undesirable decomposition pathways. The oxidative quenching pathway avoids these complications, but is less commonly used. Organic molecules are desirable photocatalysts because they are typically less expensive and eliminate the use of metal catalysts. However, organic photocatalysts that can mediate catalytic transformations through an oxidative quenching pathway are less common.

There is thus a need in the art for novel methods of promoting reactions using less expensive organic photocatalysts capable of performing oxidative and/or reductive steps. The present invention fulfills this need.

BRIEF SUMMARY OF THE INVENTION

The invention provides a method of promoting reaction of at least one reagent, wherein the reaction comprises a quenching step. The invention further provides certain organic compounds, which are useful within the methods of the present invention.

In certain embodiments, the quenching step is oxidative. In other embodiments, the quenching step is reductive.

In certain embodiments, the method comprises irradiating the at least one reagent in the presence of an organic compound with an excited-state reduction potential that is equal to or more negative than about −1.0 V vs. SCE.

In certain embodiments, the excited state comprises a singlet or triplet excited state. In other embodiments, the excited-state reduction potential is equal to or more negative than one selected from the group consisting of about −2.4 V vs. SCE, −2.3 V vs. SCE, about −2.2 V vs. SCE, about −2.1 V vs. SCE, about −2.0 V vs. SCE, about −1.9 V vs. SCE, about −1.8 V vs. SCE, about −1.7 V vs. SCE, about −1.6 V vs. SCE, about −1.5 V vs. SCE, about −1.4 V vs. SCE, about −1.3 V vs. SCE, about −1.2 V vs. SCE, and about −1.1 V vs. SCE. In yet other embodiments, the reaction comprises at least one selected from the group consisting of atom transfer radical addition/polymerization, dehalogenation, cycloaddition, cyclization, dimerization, coupling, reduction, ring-opening, alkylation, arylation, oxygenation, energy transfer, and radical addition. In yet other embodiments, the reaction comprises atom transfer radical addition/polymerization. In yet other embodiments, the at least one reagent comprises a (meth)acrylate and an organic halide. In yet other embodiments, the organic halide comprises an α-halo ester. In yet other embodiments, the reaction is essentially free of a metal or metalloid. In yet other embodiments, the polymerization reaction yields a polymer of dispersity equal to or lower than a value selected from the group consisting of about 1.13, about 1.20, and about 1.31. In yet other embodiments, the polymerization reaction yields a polymer of dispersity equal to or lower than about 2.0. In yet other embodiments, the polymerization reaction yields a polymer of tunable molecular weight.

In certain embodiments, the radiation comprises visible light. In other embodiments, the radiation comprises sunlight natural light source. In yet other embodiments, radiation comprises radiation provided by a LED. In yet other embodiments, the radiation comprises ultraviolet or infrared light.

In certain embodiments, the organic compound is at least one selected from the group consisting of:

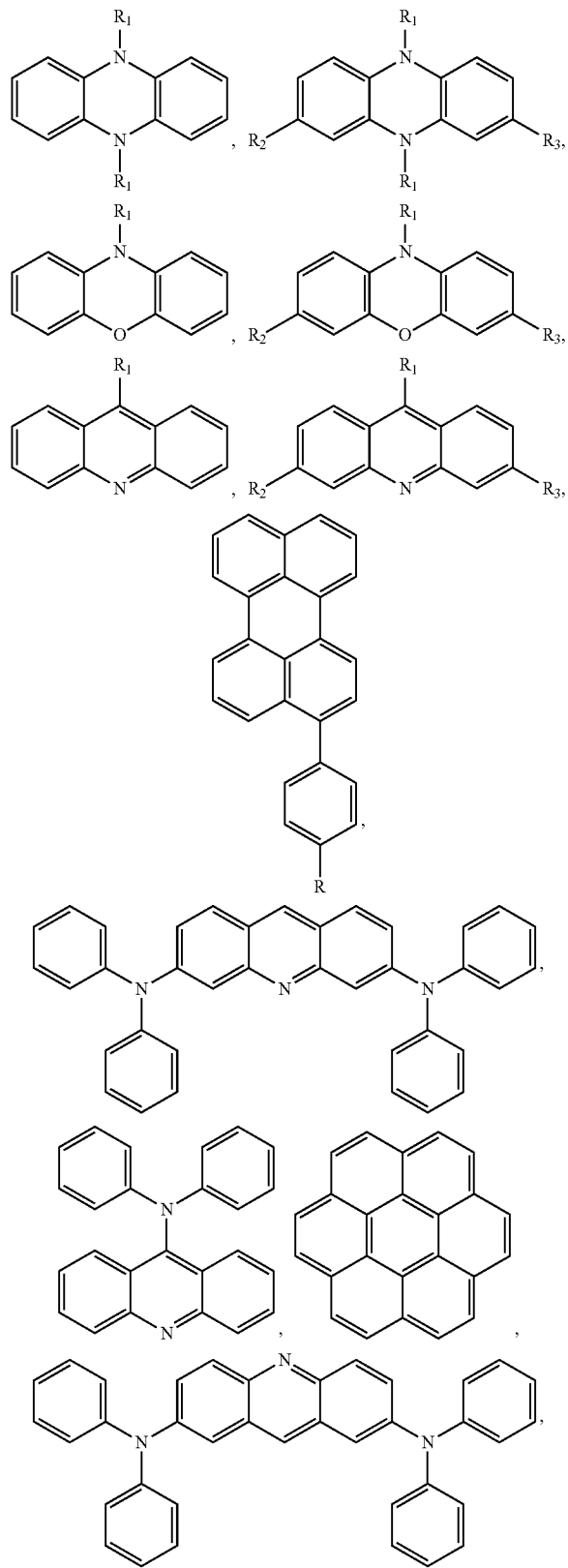

and, wherein each occurrence of R is independently selected from the group consisting of H, $C_1$-$C_6$ alkyl, $C_1$-$C_6$ haloalkyl, optionally substituted phenyl, —OH, —O($C_1$-$C_6$ alkyl), —$NO_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$$NH_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O)($C_1$-$C_6$ alkyl), —S(O)$_2$($C_1$-$C_6$ alkyl), —S(phenyl), —S(O)(phenyl), and —S(O)$_2$(phenyl);

each occurrence of $R_1$ is independently selected from phenyl, 1-naphthyl and 2-naphthyl, each of which is independently substituted with at least one R;

each occurrence of $R_2$ and $R_3$ is independently selected from phenyl and (4-phenyl)-phenyl, each of which is independently substituted with at least one R;

or a salt or solvate thereof.

In certain embodiments, each occurrence of R is independently selected from the group consisting of optionally substituted phenyl, $C_1$-$C_6$ haloalkyl, —$NO_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$$NH_2$, —S(O)$_2$NH($C_1$-$C_6$ alkyl), —S(O)$_2$N($C_1$-$C_6$ alkyl)($C_1$-$C_6$ alkyl), —S(O) ($C_1$-$C_6$ alkyl), —S(O)$_2$($C_1$-$C_6$ alkyl), —S(O)(phenyl), and —S(O)$_2$(phenyl). In other embodiments, at least one occurrence of R is optionally substituted phenyl, —$CF_3$ or —$NO_2$. In yet other embodiments, $R_2$ and $R_3$ are identical. In yet other embodiments, if two $R_1$ groups are present, they are identical.

In certain embodiments, the compound is selected from the group consisting of

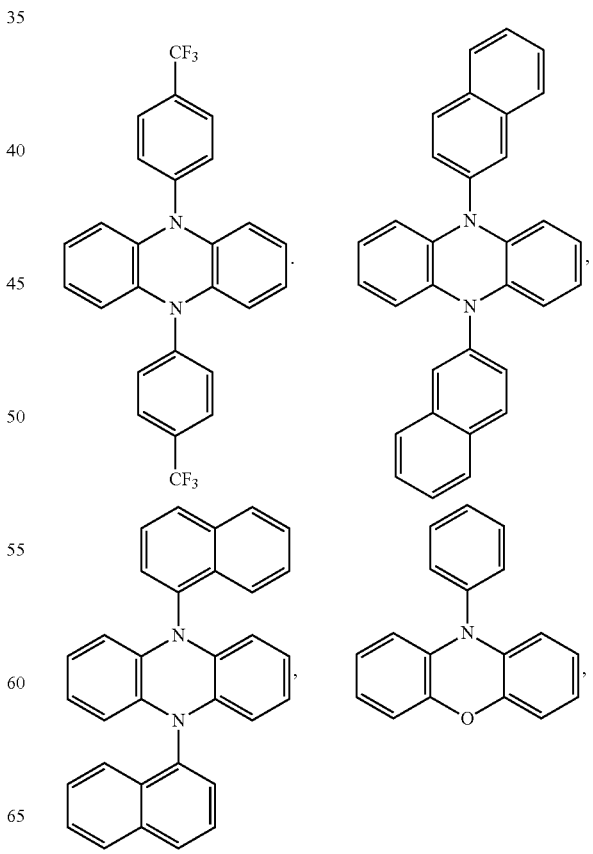

-continued

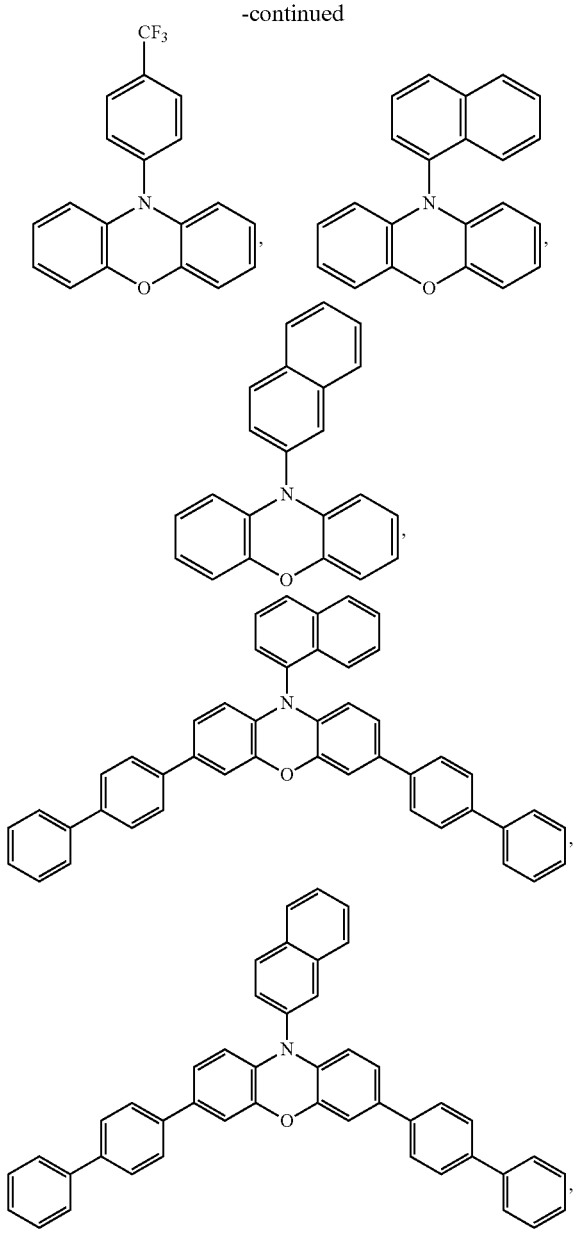

or a salt or solvate thereof.

In certain embodiments, the compound is selected from the group consisting of:

-continued

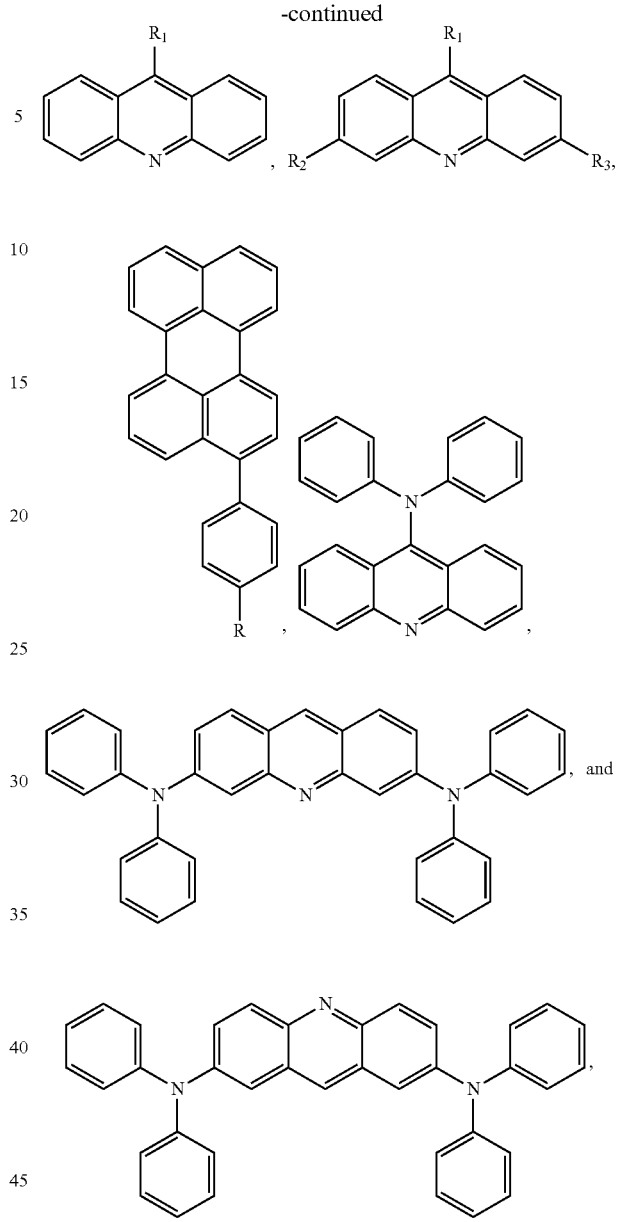

wherein:

each occurrence of R is independently selected from the group consisting of H, $C_1$-$C_6$ alkyl, $C_1$-$C_6$ haloalkyl, optionally substituted phenyl, —OH, —O($C_1$-$C_6$ alkyl), —$NO_2$, —CN, —C(=O)OH, —C(=O)O($C_1$-$C_6$ alkyl), —C(=O) O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O)($C_1$-$C_6$ alkyl), —S(O)$_2$($C_1$-$C_6$ alkyl), —S(phenyl), —S(O)(phenyl), and —S(O)$_2$(phenyl);

each occurrence of $R_1$ is independently selected from phenyl, 1-naphthyl and 2-naphthyl, each of which is independently substituted with at least one R; and each occurrence of $R_2$ and $R_3$ is independently selected from phenyl and 4-phenyl-phenyl, each of which is independently substituted with at least one R, or a salt or solvate thereof.

In various embodiments, the organic compound is at least one selected from the group consisting of:

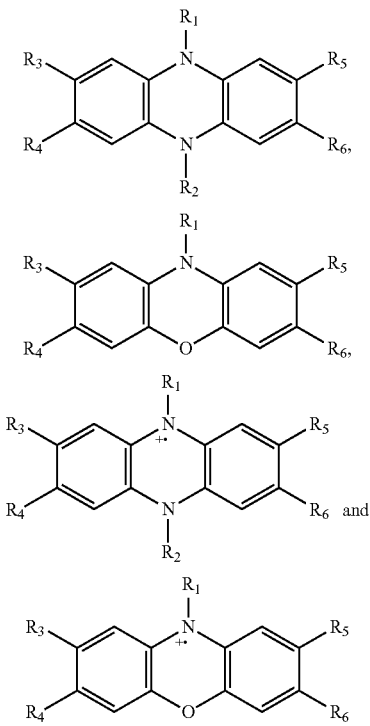

wherein:

each occurrence of R is independently selected from the group consisting of H, $C_1$-$C_6$ alkyl, $C_1$-$C_6$ haloalkyl, optionally substituted phenyl, —OH, —O($C_1$-$C_6$ alkyl), —$NO_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$$NH_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O)($C_1$-$C_6$ alkyl), —S(O)$_2$($C_1$-$C_6$ alkyl), —S(phenyl), —S(O)(phenyl), and —S(O)$_2$(phenyl);

each occurrence of $R_1$ is independently selected from the group consisting of phenyl, 1-naphthyl and 2-naphthyl, each of which is independently substituted with at least one R; and each occurrence of $R_2$ and $R_3$ is independently selected from phenyl and 4-phenyl-phenyl, each of which is independently substituted with at least one R; and each occurrence of $R_3$, $R_4$, $R_5$, and $R_6$ is independently selected from the group consisting of phenyl, 4-phenyl-phenyl, 1-naphthryl, 2-naphthryl, triphenylamine, phenanthrenyl, and pyrenyl, each of which is independently substituted with at least one R;

or a salt or solvate thereof.

In certain embodiments, $R_3$ and $R_5$ are H. In other embodiments, $R_4$ and $R_6$ are H. In yet other embodiments, $R_3$=$R_5$. In yet other embodiments, $R_4$=$R_6$. In yet other embodiments, $R_3$ is H and $R_5$ is not H. In other embodiments, $R_4$ is H and $R_6$ is not H. In yet other embodiments, $R_3$ and $R_5$ are not H. In yet other embodiments, $R_4$ and $R_6$ are not H.

In various embodiments, the organic compound is at least one selected from the group consisting of:

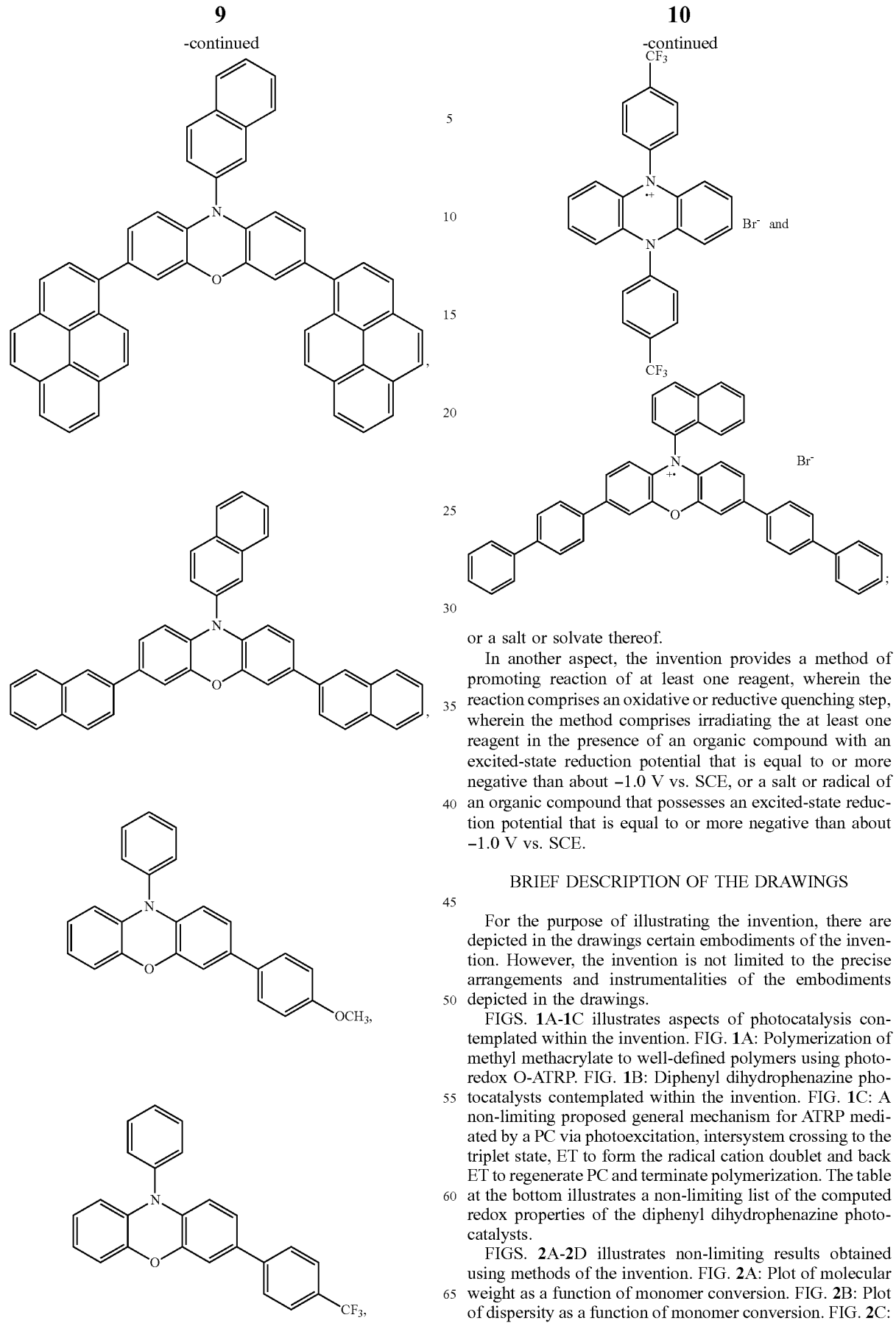

or a salt or solvate thereof.

In another aspect, the invention provides a method of promoting reaction of at least one reagent, wherein the reaction comprises an oxidative or reductive quenching step, wherein the method comprises irradiating the at least one reagent in the presence of an organic compound with an excited-state reduction potential that is equal to or more negative than about −1.0 V vs. SCE, or a salt or radical of an organic compound that possesses an excited-state reduction potential that is equal to or more negative than about −1.0 V vs. SCE.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 1A: Polymerization of methyl methacrylate to well-defined polymers using photoredox O-ATRP. FIG. 1B: Diphenyl dihydrophenazine photocatalysts contemplated within the invention. FIG. 1C: A non-limiting proposed general mechanism for ATRP mediated by a PC via photoexcitation, intersystem crossing to the triplet state, ET to form the radical cation doublet and back ET to regenerate PC and terminate polymerization. The table at the bottom illustrates a non-limiting list of the computed redox properties of the diphenyl dihydrophenazine photocatalysts.

FIG. 2A: Plot of molecular weight as a function of monomer conversion. FIG. 2B: Plot of dispersity as a function of monomer conversion. FIG. 2C: Plot of monomer conversion during irradiation (light bulb)

and dark (gray) sequences. FIG. 2D: Plot of $M_n$ (left-axis) and Ð (right-axis) as a function of monomer conversion for the pulsed-light irradiation experiment. Conditions: 1.0 mL DMA, 1.0 mL MMA, [MMA]:[EBP]:[3]=[1000]:[10]:[1].

FIG. 20C illustrates plot of Mn and Ð vs. monomer conversion for the polymerization of MMA. FIG. 20D illustrates plot of monomer conversion vs. time. FIG. 20E illustrates plot of Mn and Ð (filled symbols from after irradiation and empty symbols from after dark period) vs. monomer conversion using 6 as the PC during pulsed light irradiation with white LEDs.

FIG. 30A: Structure, computed triplet excited state reduction potential, and ESP mapped electron density of $^3$PC* 5. FIG. 30B: Computed triplet state SOMOs of PC 5. FIG. 30C: Plot of $M_n$ and Đ as a function of monomer conversion for the polymerization of MMA by PC 5; [MMA]:[DBMM]:[5]=[1000]:[10]:[1]; 9.35 μmoles PC, 1.00 mL dimethylacetamide, and irradiated with white LEDs (orange, signaled with "*"). FIG. 30D: UV-vis spectrum of PC 5 and 1-naphthalene functionalized phenoxazine, dihydrophenazine, and phenothiazine, with color coded structures, and extinction coefficients at their respective $\lambda_{max}$ with the visible absorbance spectrum highlighted in white.

DETAILED DESCRIPTION OF THE INVENTION

The invention relates to the unexpected discovery of that certain organic compounds can be used as photocatalysts in reactions that proceed via an oxidative and/or reductive quenching pathway, such as but not limited to atom transfer polymerization reactions. In certain embodiments, the organic compounds of the invention are strong reductants in the excited state. In other embodiments, the methods of the invention do not utilize transition metal catalysts and thus are essentially metal-free.

The organic compounds of present invention may be used not only in atom transfer radical polymerization, hut to reactions such as halogenations, cycloadditions, cyclizations, dimerizations, couplings (carbon-carbon bond formation, carbon-nitrogen bond formation, carbon-oxygen bond formation, carbon-sulfur bond formation and carbon-phosphorus bond formation), reductions, ring-opening reaction, alkylations, arylations, oxygenations, radical additions, among others. Such reactions can be conducted under batch conditions, flow conditions, or on surfaces. In certain non-limiting, embodiments, the ability to control reactivity with light allows the opportunity for spatial and temporal control. In other non-limiting embodiments, the use of these catalysts for photolithography allows for versatile polymerizations or functionalization from/to surfaces.

In certain aspects, the present disclosure relates to the use of O-ATRP to synthesize polymers. In certain embodiments, the methods of the invention provide similar precision as traditional ATRP, but instead use visible light photocatalysts (PCs) to realize energy efficient, "greener" polymerization methods. Visible-light photocatalysis allows for harnessing solar energy to mediate chemical transformations under mild conditions.

Figure 1A:
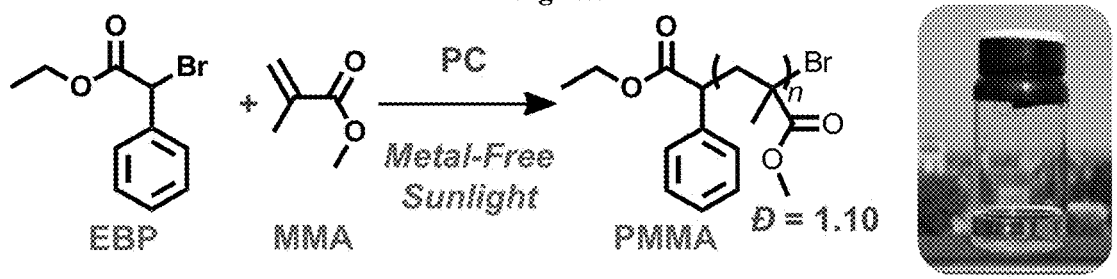
FIGS. 1A-1C illustrates aspects of photocatalysis contemplated within the invention.
Figure 1B:
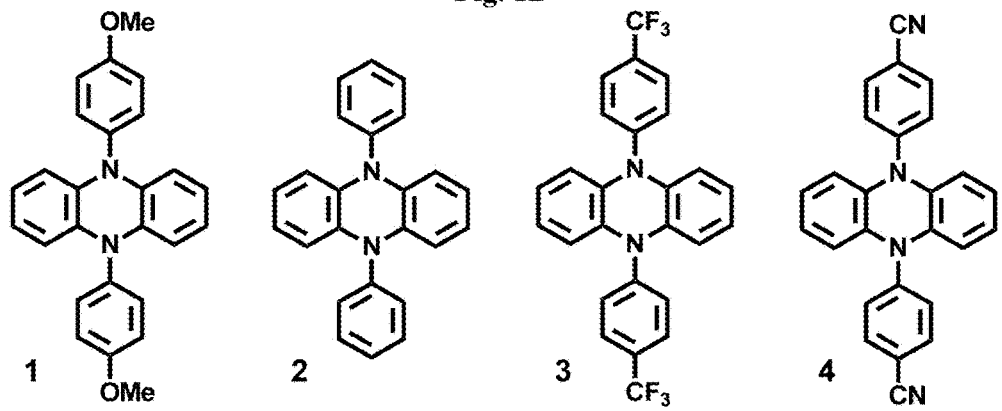
Figure 1C:
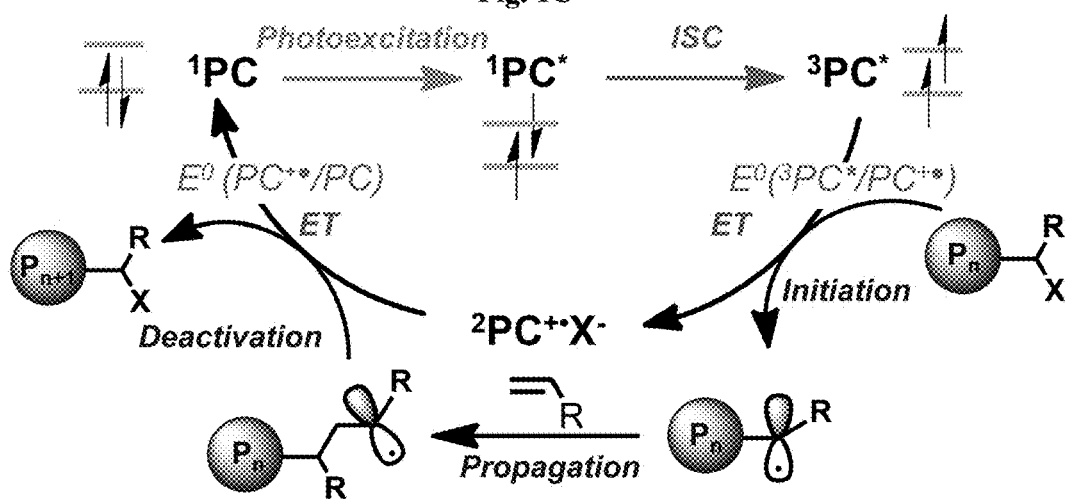

FIG. 1C illustrates a non-limiting mechanism of a photoredox O-ATRP, wherein a PC reversibly activates an alkyl bromide. In addition to the need for a strong reduction potential for the excited state PC, a delicate interplay must be balanced between the stability of its cation radical PC$^+$. and its oxidation potential relative to the propagating radical to yield a controlled radical polymerization.

In one aspect, 5,10-diaryl-5,10-dihydrophenazines can be utilized as a class of PCs for O-ATRP (FIG. 1B). The phenazine core is shared by several biologically relevant molecules that serve as redox-active antibiotics, while synthetic derivatives have drawn interest in organic photovoltaics and organic ferromagnets. In certain embodiments, an appropriate union between the excited-state reduction potential ($E^0$) and the stability of the resulting radical cation $PC^+$. allows for the production of polymers with controlled MW and low Ð. As such, electron donating (OMe, 1), neutral (H, 2), and withdrawing ($CF_3$, 3 and CN, 4) moieties on the N-phenyl substituents were investigated.

Figure 13:
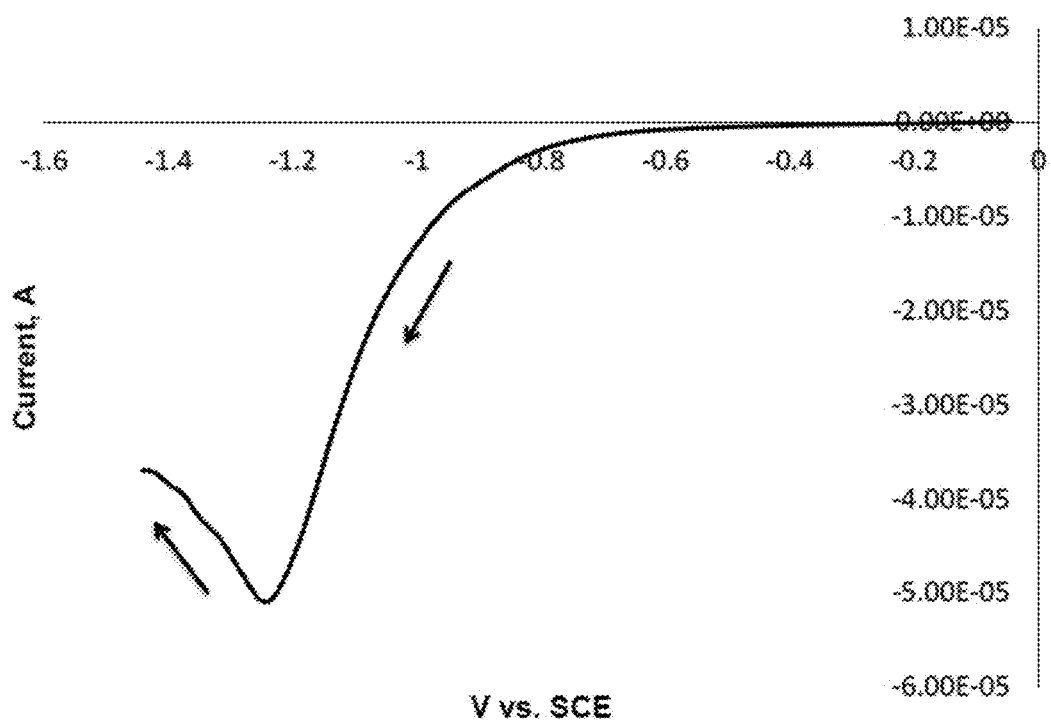
FIG. 13 is a graph illustrating a cyclic voltammetry (CV) of EBP on glassy carbon electrode in acetonitrile (0.10 M $Bu_4NClO_4$ electrolyte). Scan rate=100 mV/s. Onset of EBP reduction at ~−0.8 V vs. SCE. CV was performed using saturated Ag/AgCl reference electrode, and was converted to vs. SCE by subtracting 0.043 V. Although the onset of reduction measured here is consistent with the calculated $E^o(EBP/EBP.^−)$ of −0.74 V vs. SCE, an actual $E^o$ is determined using saturated solute and standard conditions that produce a reversible CV.
Figure 14:
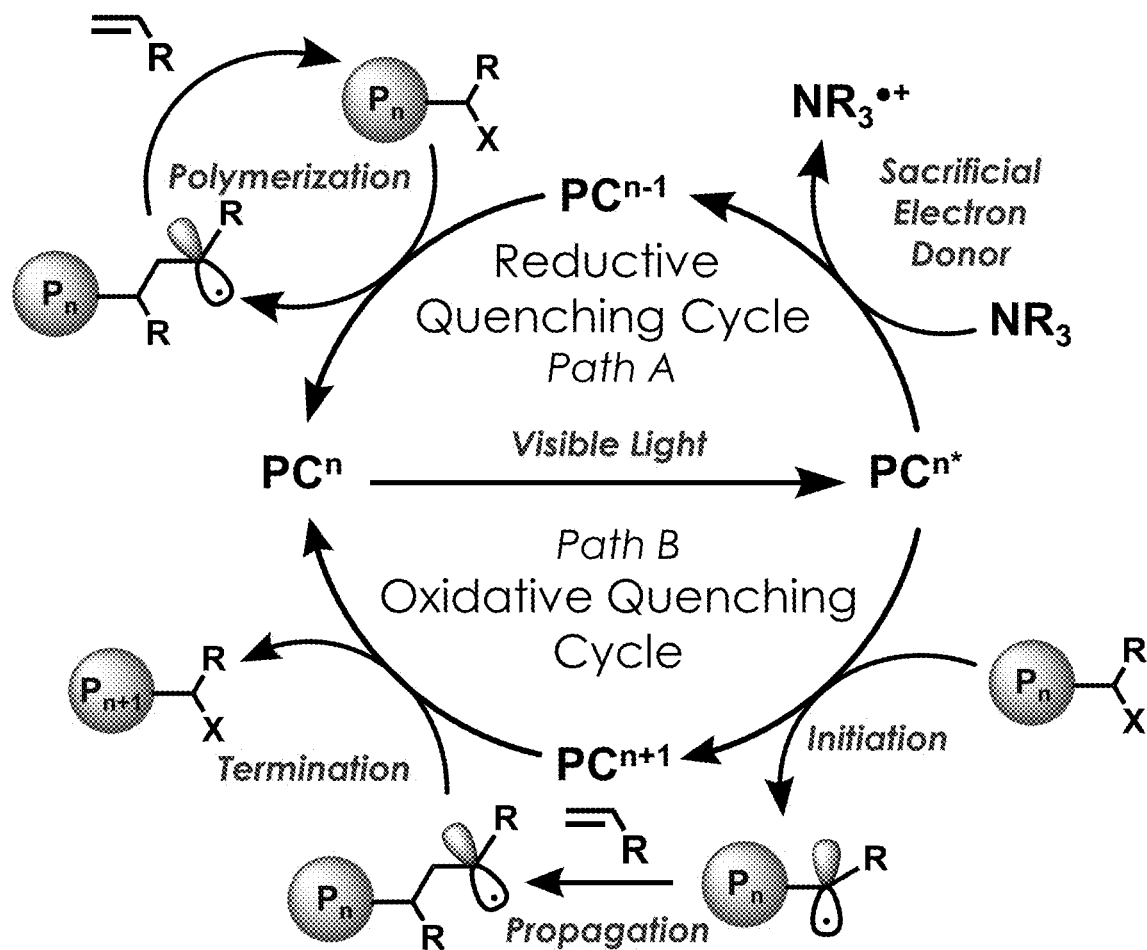
FIG. 14 is a scheme illustrating non-limiting mechanisms of photoredox mediated polymerizations proceeding through a reductive or oxidative quenching pathway.
Figure 15:
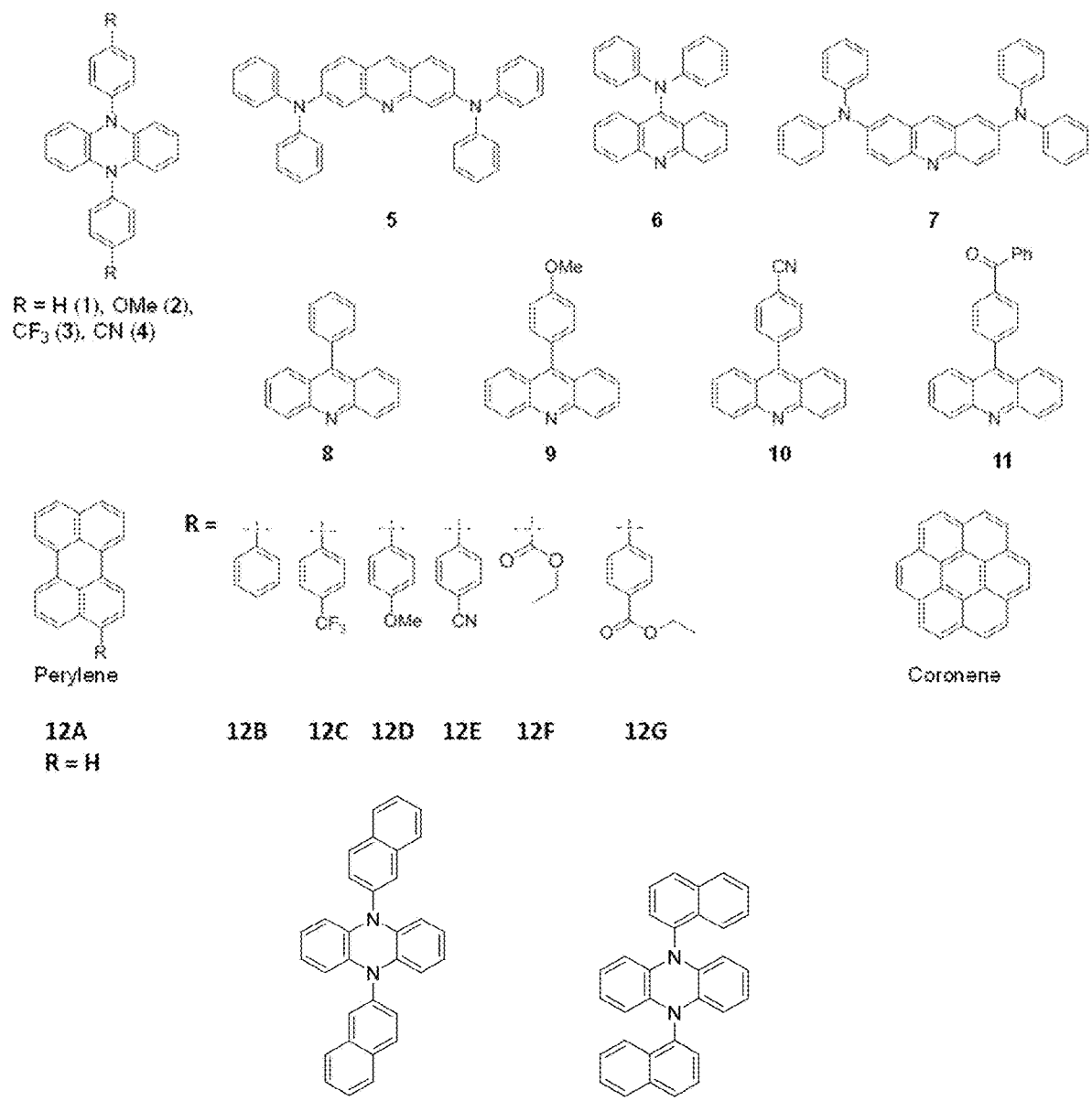
FIG. 15 is a schematic illustration of certain compounds contemplated within the invention.

Density Functional Theory (DFT) was used to calculate the reduction potentials, $E^0$, of the triplet excited state photocatalysts, initiator, and propagating radicals. 2 possesses a triplet excited-state reduction potential of $E^0(^3PC*/PC^+.)=-2.34$ V vs. SCE. Functionalization of the phenyl substituents with an electron donating group OMe (1) strengthened the reduction potential to $-2.36$ V, while introduction of electron withdrawing groups (EWGs) weakened the reduction potential to $-2.24$ and $-2.06$ V for 3 and 4, respectively. The triplet excited states of these PCs were all strongly reducing with respect to $1e^-$ transfer to ethyl α-bromophenylacetate (EBP). $E^0(EBP/EBP^-.)$ was calculated to be $-0.74$ V vs. SCE, consistent with the cyclic voltammetry results, which showed that the onset of EBP reduction occurs at $\sim-0.8$ V vs. SCE (FIG. 13). These reduction potentials are significantly more reducing than classic metal PCs, including polypyridyl iridium complexes ($E^{0*}$ as negative as $-1.73$ V vs. SCE) that have been used in photomediated ATRP. However, iridium PCs are expensive, do not address the problem of metal contamination, and have only been demonstrated to produce polymers with Ð as low as 1.19.

The reducing power of these PCs exhibited by their negative $E^0(^3PC*/PC^+.)$s arises from a distinct combination of their high triplet state energies (~2.2-2.4 eV) and the formation of relatively stable radical cations $[E^0(PC^+./PC)=\sim-0.1-0.2$ V$]$ upon their oxidation. Furthermore, these radical cations are also sufficiently oxidizing to deactivate the propagating chains. $E^0$s for propagating radicals with n monomer repeat unit(s) bound to EBP of $E^0([EBP-MMA_n]/[EBP-MMA_n]^-.)$ were computed to be $-0.74$, $-0.86$, and $-0.71$ V, for n=0, 1 and 2, respectively. These $E^0$s were sufficiently negative with respect to oxidization by the radical cations to drive radical deactivation and regeneration of the PC to complete the photocatalytic cycle.

The series of target PCs were synthesized in two steps from commercial reagents in good yields. Under otherwise identical conditions, all of the PCs were tested in the polymerization of methyl methacrylate (MMA), using EBP as the initiator and white LEDs for irradiation in dimethylacetamide (Table 2, runs 1-4). All four PCs proved effective in polymerization after 8 hours of irradiation, with the PCs bearing EWGs exhibiting the best catalytic performance. PC 3 allowed for the production of polymers with a combination of not only the lowest dispersity (Ð=1.17), but also the highest initiator efficiency (I*=65.9%). This polymerization could even be driven with sunlight to produce polymethyl methacrylate (PMMA) with an impressively low dispersity of Ð=1.10 (Mw=7.54 kDa).

Figure 2A:
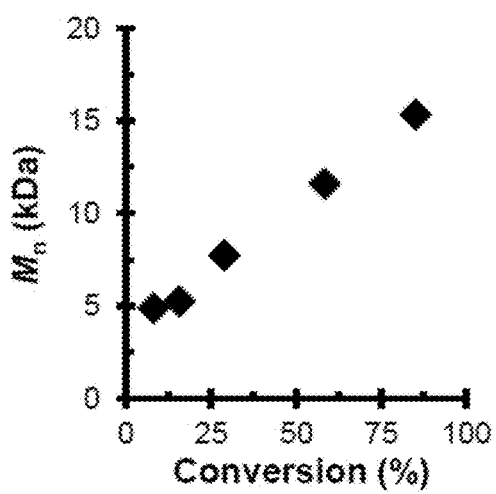
FIGS. 2A-2D illustrates non-limiting results obtained using methods of the invention.
Figure 2B:
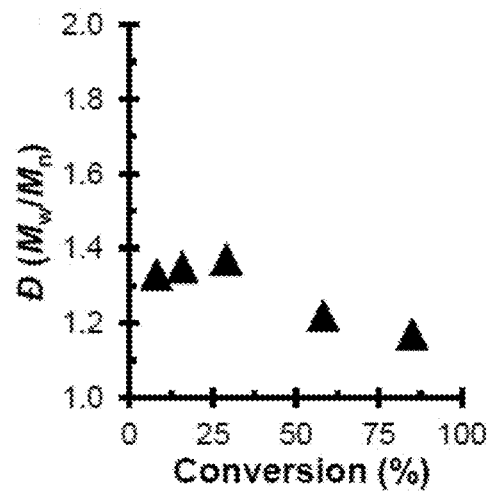
Figure 2C:
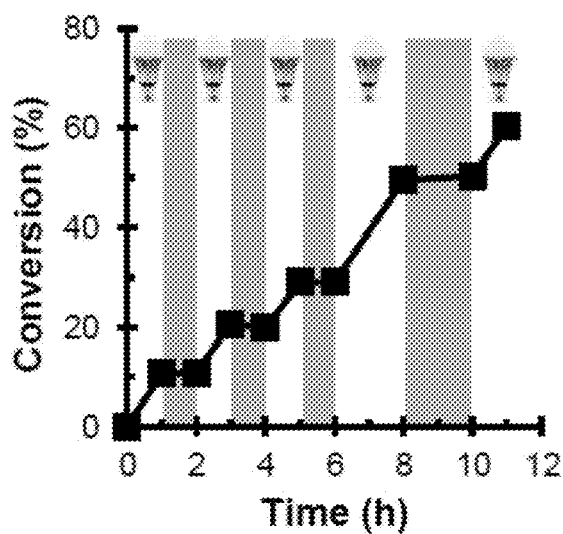
Figure 2D:
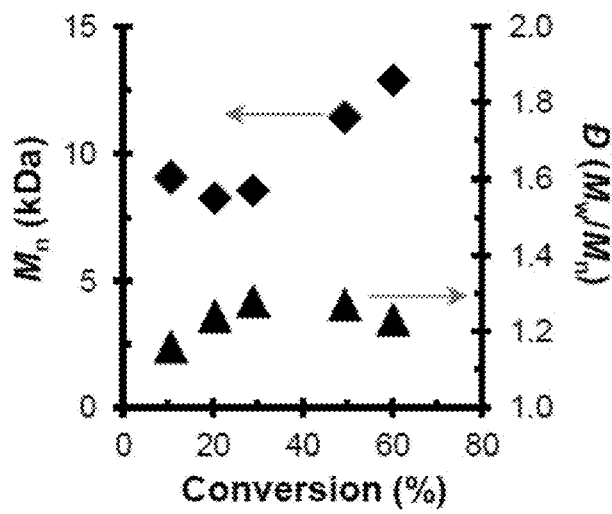

3 was further characterized herein (Table 1). To examine the polymerization in detail, time-point-aliquots were taken during polymerization to monitor the MW and Ð progression as a function of monomer conversion (FIGS. 2A-2B). The control provided by 3 was evidenced by the linear increase in polymer MW and low Ð throughout the course of polymerization. Furthermore, temporal control was realized by employing a pulsed-irradiation sequence (FIG. 2C). Polymerization was only observed during irradiation pulses, paused during dark periods, and the MW steadily increased with continued irradiation while maintaining low Ð (FIG. 2D).

To investigate the potential for modulation of the polymer MW, the effect of adjusting the initiator ratio was tested (Table 1, runs 3-6). The $M_w$ of the resulting PMMA was modulated from 7.12 to 85.5 kDa. High EBP ratios resulted in controlled polymerizations and low dispersities (Ð=1.26-1.17), and despite the moderate loss of precise control over the polymerization at low EBP ratios (Ð=1.54), high MW polymer was produced achieving high initiator efficiency (Mw=85.5 kDa, I*=86.3%). Alternatively, adjusting the monomer ratio regulated polymer MW while also maintaining low Ð (Table 1, runs 7-10). Efficient control over the polymerization by 3 is highlighted by the consistently high I* and low Ð achieved over broad reaction conditions to produce polymers with tunable MWs through varying initiator or monomer ratios.

Traditional ATRP allows for the synthesis of well-defined block copolymers. The reversible-deactivation mechanism enforced in ATRP continuously reinstalls the Br chain-end group onto the polymer and thus, isolated polymers can be used to reinitiate polymerization. To further support that this polymerization operates via an O-ATRP mechanism, a series of block polymerizations were performed.

Figure 3:
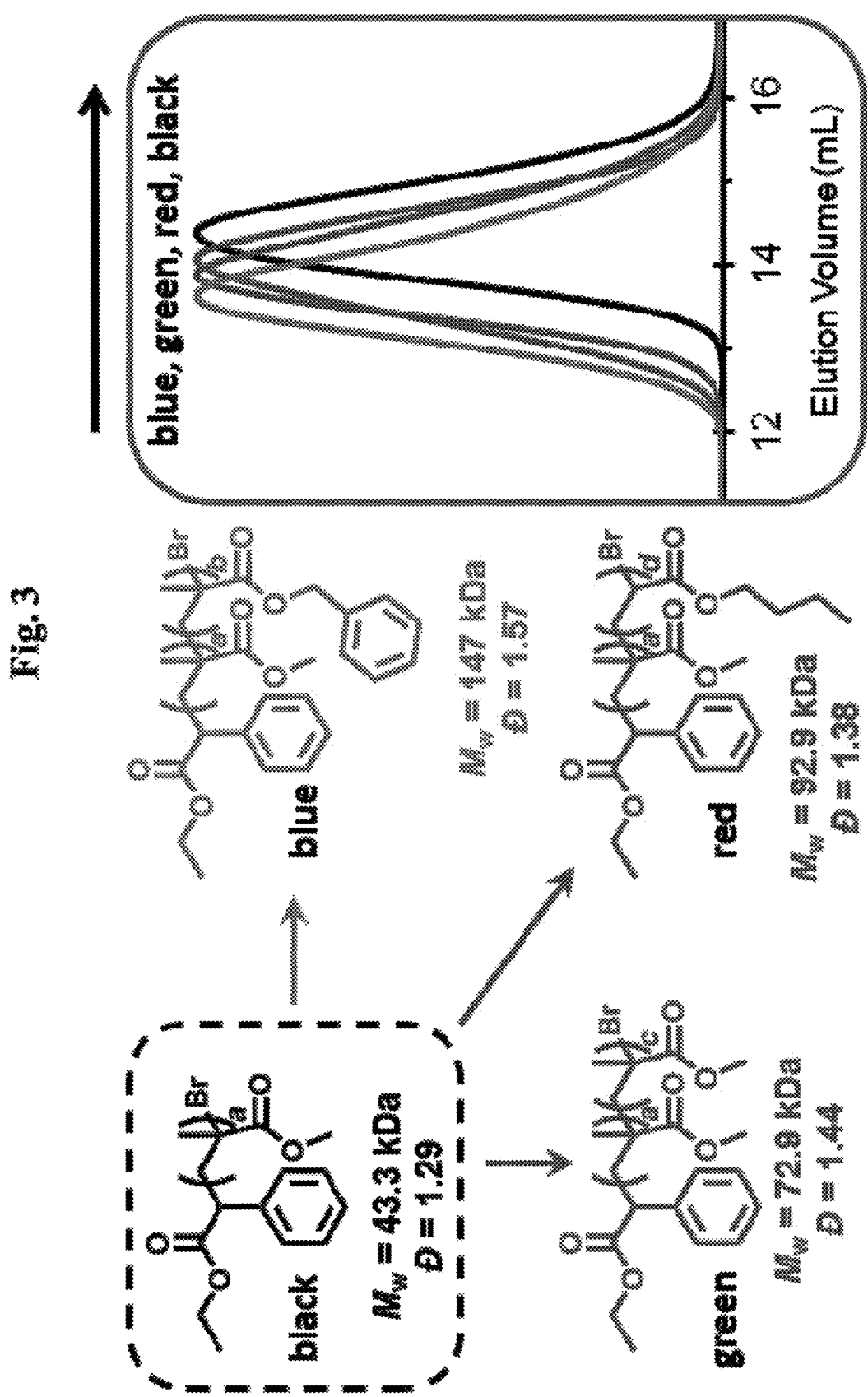
FIG. 3 is a scheme illustrating: left—chain-extension from a PMMA macro-initiator (black) to produce block polymers with MMA (green), benzyl methacrylate (blue), and butyl acrylate (red); right—gel permeation chromatography (GPC) traces of each polymer (the maximums of the curves are, in increasing mL values (left to right), blue, green, red and black.
Figure 9:
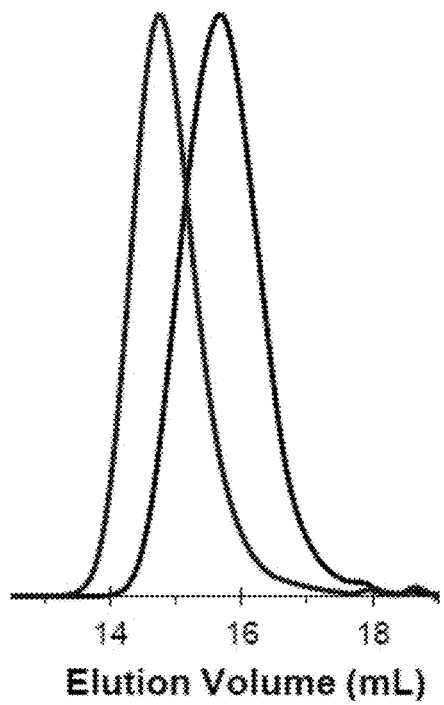
FIG. 9 is a GPC trace showing the results of the synthesis of PMMA-b-PMMA; the polymer produced after 12 hours (black; right curve) and the polymer produced after additional monomer and 6 hours of irradiation (blue; left curve).
Figure 10:
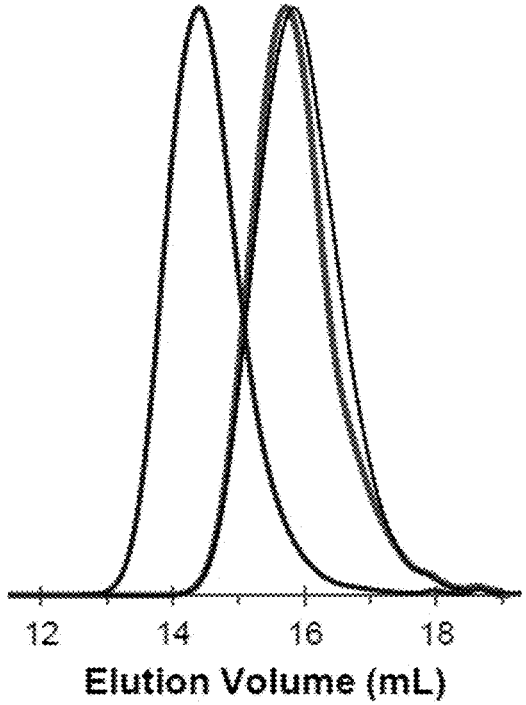
FIG. 10 is a GPC trace showing the results of the synthesis of PMMA-b-PMMA with a dark resting period: the polymer produced after 8 hours (red), the polymer produced after the dark period (black), and the polymer produced after additional monomer and irradiation 8 hours of (blue) (in increasing order to maximum elution volume: blue<red~black).
Figure 11:
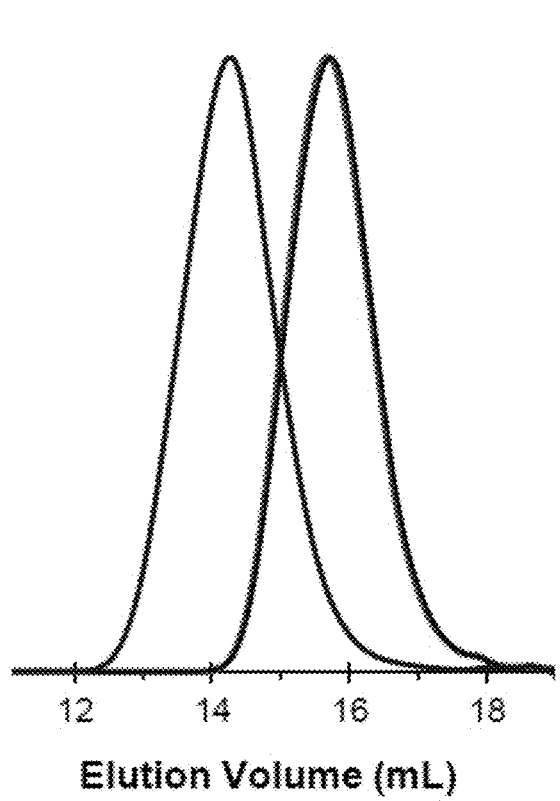
FIG. 11 is a GPC trace showing the results of the synthesis of PMMA-b-PBA with a dark resting period: polymer produced after 8 hours (red), the polymer produced after the dark period (black), and the polymer produced after additional monomer and 8 hours of irradiation (blue) (in increasing order to maximum elution volume: blue<red~black).
Figure 12:
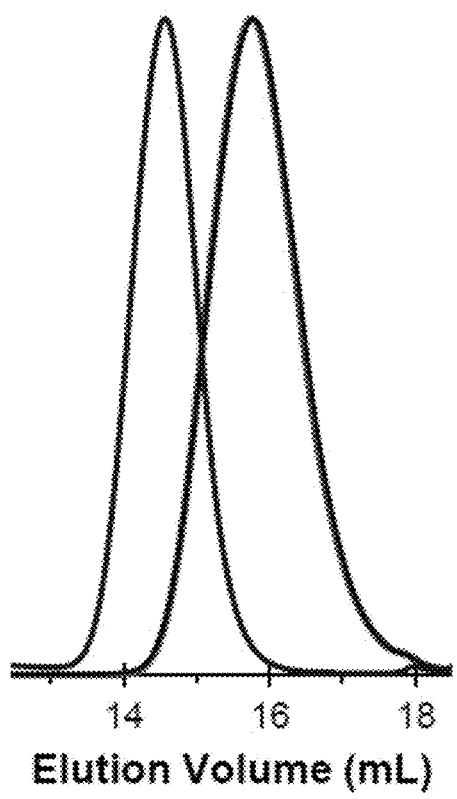
FIG. 12 is a GPC trace showing the results of the synthesis of PMMA-b-PBnMA with a dark resting period: the polymer produced after 8 hours (red), the polymer produced after the dark period (black), and the polymer produced after additional monomer 8 hours of irradiation (blue) (in increasing order to maximum elution volume: blue<red~black).

In one aspect, after initial polymerization of MMA proceeded for 12 h, more MMA was added to the reaction. GPC analysis revealed that the MW of the resulting polymer quantitatively increased (FIG. 9). In another aspect, after polymerization of MMA was allowed to proceed for 8 h, the reaction mixture was placed in the dark for 8 h and subsequently more MMA was added. This resulted in no polymerization during the dark period, while the subsequent addition of MMA and further illumination resulted in continued and controlled polymer chain growth (FIG. 10). In yet another aspect, an isolated polymer (Table 1, run 7) was reintroduced to polymerization conditions by adding monomer, catalyst, solvent, and light, and served as a macroinitiator for the synthesis of block polymers. This chain-extension proved successful with MMA, benzyl methacrylate, and butyl acrylate (FIG. 3). The chain-extension polymerization from an isolated polymer produced from this polymerization method strongly supports that this method proceeds through the ATRP mechanism.

DFT calculations were performed to gain insight into the differences in the performances of the PCs, all of which possess similar $E^0(^3PC*/PC^+.)$s and $E^0(PC^+./PC)$s that are sufficiently reducing and oxidizing, respectively, to drive the photocatalytic cycle. Without wishing to be limited by any theory, the performances of 4 and, in particular, 3 can be qualitatively different from that of 1 and 2 and result from a more complex effect.

Figure 4:
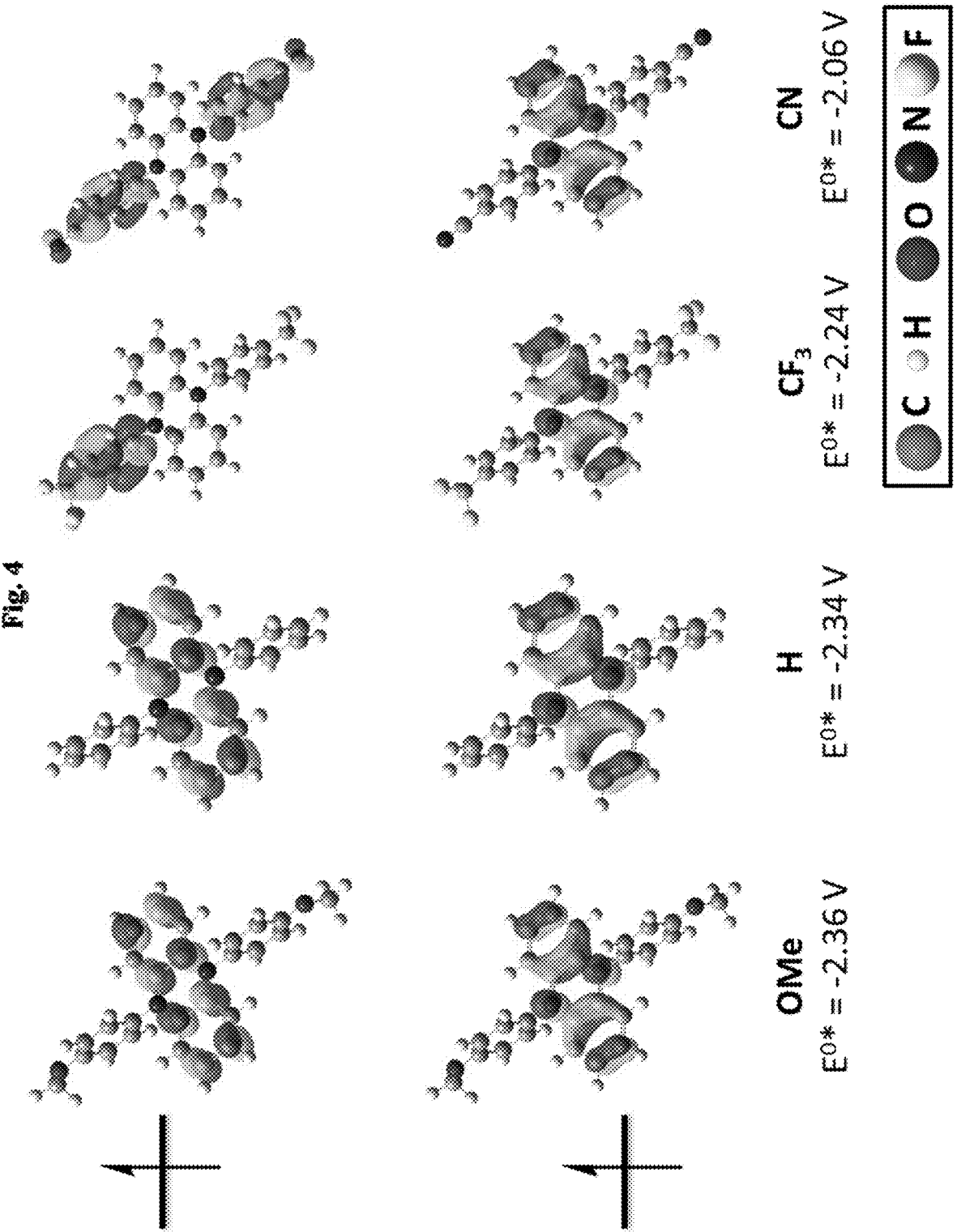
FIG. 4 is a scheme illustrating triplet state frontier orbitals of diphenyl dihydrophenazine photocatalysts contemplated within the invention. Top figures show the higher-lying singly occupied molecular orbital (SOMO) and bottom figures the low-lying SOMO. Phenyl functionalization with electron withdrawing groups ($CF_3$ and CN) localizes the high-lying SOMO on the phenyl group.

Inspection of the triplet state frontier orbitals reveals qualitative differences in these PCs (FIG. 4). The low-lying Singly Occupied Molecular Orbital (SOMO) of all the PCs are similar, with the electron localized over the phenazine π system. Similarly, for PCs 1 (OMe) and 2 (H), the high-lying SOMO is also localized on the phenazine rings. In contrast, for 3 ($CF_3$) and 4 (CN) the high-lying SOMO, occupied by the reducing triplet e-, resides on the phenyl ring(s). Without wishing to be limited by any theory, the $CF_3$ and CN EWGs stabilize the π* orbitals localized on the phenyl rings relative to the π* orbital that is the high-lying SOMO of 1 and 2. This reorders the energies of the π* orbitals such that a π* orbital localized on the phenyls becomes the high-lying SOMO of 3 and 4, although the low-lying SOMO localized on the phenazine moiety remains singly occupied. Thus, the reducing e- of the PC triplet excited state ($^3PC*$) of 3 and 4 is localized on the phenyl rings.

Furthermore, a comparison of 3 to 4 elucidates another significant distinction. For 3, the high-lying SOMO is localized on one of the phenyl rings, while in 4 the reducing e− is delocalized over both phenyl rings. One of the C—F bonds, containing the high-lying SOMO of 3, is lengthened from ~1.35 Å to 1.40 Å, indicating partial localization of electron density in this C—F's antibonding orbital. Thus, 3 and 4 differ from 1 and 2 in that the triplet electrons of 3 and 4 reside on both the phenazine and the phenyl ring(s) and are thus spatially separated.

As demonstrated herein, a series of diphenyl dihydrophenazines were synthesized and introduced as organic PCs in O-ATRP to efficiently polymerize MMA and other monomers to well-defined polymers. First principles calculations inspired the discovery of these PCs and initiated examination of PCs such as 3. The catalysts studied herein can be used in the synthesis of polymers using O-ATRP.

A survey of initiators commonly employed in traditional metal-catalyzed ATRP in conjunction with 6 (Table 3, run 11 and Table 4, runs 9-12) revealed that methyl 2-bromopropionate (MBP) provided the best overall results for the polymerization of MMA ($M_w$=10.6 kDa; Đ=1.28; I*=88.1%). Furthermore, temporal control was realized by employing a pulsed-irradiation sequence (FIGS. 20D-26E). Polymerization was observed only during irradiation, paused during dark periods, and the MW steadily increased with continued irradiation while producing a polymer with a low Đ of 1.17. Finally, efficient control over the polymerization by 6 is highlighted by the consistently high I* achieved over broad reaction conditions to produce polymers with tunable MWs through varying initiator (Runs 11-14) or monomer (Runs 15-17) ratios.

TABLE 1

Results for the Organocatalyzed Atom Transfer Radical Polymerization of Methyl Methacrylate Catalyzed by 3 Using White LEDs or Sunlight[a].

| Run No. | [MMA]:[EBP]:[3] | DMA (mL) | Time (h) | Conv. (%)[c] | $M_w$ (kDa) | Đ ($M_w/M_n$) |
|---|---|---|---|---|---|---|
| 1 | [1000]:[10]:[1] | 1.0 | 8 | 98.4 | 17.9 | 1.17 |
| 2[a] | [1000]:[10]:[1] | 1.0 | 7 | 33.8 | 7.54 | 1.10 |
| 3 | [1000]:[20]:[1] | 1.0 | 8 | 78.9 | 7.12 | 1.18 |
| 4 | [1000]:[15]:[1] | 1.0 | 8 | 67.8 | 8.74 | 1.18 |
| 5 | [1000]:[5]:[1] | 1.0 | 8 | 86.9 | 37.3 | 1.26 |
| 6 | [1000]:[2]:[1] | 1.0 | 8 | 95.2 | 85.5 | 1.54 |
| 7 | [5000]:[12]:[1] | 5.0 | 6.5 | 46.5 | 43.4 | 1.29 |
| 8 | [2000]:[10]:[1] | 2.0 | 6.5 | 57.1 | 19.5 | 1.31 |
| 9 | [750]:[10]:[1] | 1.25 | 6.5 | 53.2 | 7.75 | 1.30 |
| 10 | [500]:[10]:[1] | 0.75 | 6.5 | 64.0 | 4.83 | 1.12 |

TABLE 3

Results for the Organocatalyzed Atom Transfer Radical Polymerization of Methyl Methacrylate Catalyzed by 6 Using White LEDs.

| Run No. | [MMA]:[MBP]:[6] | Time (h) | Conv. (%) | $M_w$ (kDa) | Đ ($M_w/M_n$) | I* ($M_{n(theo)}/M_{n(exp)}$) |
|---|---|---|---|---|---|---|
| 11 | [1000]:[10]:[1] | 8 | 71.7 | 10.6 | 1.28 | 88.1 |
| 12 | [1000]:[20]:[1] | 8 | 73.1 | 5.24 | 1.29 | 94.5 |
| 13 | [1000]:[15]:[1] | 8 | 70.8 | 7.52 | 1.36 | 88.5 |
| 14 | [5000]:[10]:[1] | 8 | 69.5 | 46.9 | 1.32 | 98.7 |
| 15 | [2500]:[10]:[1] | 8 | 64.5 | 21.9 | 1.34 | 99.3 |
| 16 | [750]:[10]:[1] | 8 | 69.0 | 6.93 | 1.23 | 94.7 |
| 17 | [500]:[10]:[1] | 8 | 76.4 | 5.74 | 1.39 | 95.7 |

TABLE 2

Results for the Organocatalyzed Atom Transfer Radical Polymerization of Methyl Methacrylate.

| Run No. | PC | [MMA]:[EBP]:[PC] | DMA (mL) | Time (h) | Conv. (%)[c] | $M_w$ (kDa)[d] | $M_n$ (kDa)[d] | Đ ($M_w/M_n$)[d] | $M_n$(theo) (kDa)[e] | I* (%)[f] |
|---|---|---|---|---|---|---|---|---|---|---|
| 1 | 1 | [1000]:[10]:[1] | 1.0 | 8 | 69.6 | 36.3 | 24.7 | 1.47 | 7.21 | 29.2 |
| 2 | 2 | [1000]:[10]:[1] | 1.0 | 8 | 85.9 | 18.4 | 11.9 | 1.55 | 8.84 | 74.5 |
| 3 | 3 | [1000]:[10]:[1] | 1.0 | 8 | 98.4 | 17.9 | 15.3 | 1.17 | 10.1 | 65.9 |
| 4 | 4 | [1000]:[10]:[1] | 1.0 | 8 | 73.5 | 21.4 | 16.1 | 1.33 | 7.60 | 47.2 |
| 5[b] | 3 | [1000]:[10]:[1] | 1.0 | 7 | 33.8 | 7.54 | 6.85 | 1.10 | 3.63 | 52.9 |
| 6[b] | 4 | [1000]:[10]:[1] | 1.0 | 7 | 36.7 | 9.63 | 7.47 | 1.29 | 3.92 | 52.5 |
| 7 | 3 | [1000]:[20]:[1] | 1.0 | 8 | 78.9 | 7.12 | 6.03 | 1.18 | 4.19 | 69.5 |
| 8 | 3 | [1000]:[15]:[1] | 1.0 | 8 | 67.8 | 8.74 | 7.41 | 1.18 | 4.77 | 64.3 |
| 9 | 3 | [1000]:[5]:[1] | 1.0 | 8 | 86.9 | 37.3 | 29.6 | 1.26 | 17.6 | 59.6 |
| 10 | 3 | [1000]:[2]:[1] | 1.0 | 8 | 95.2 | 85.5 | 55.5 | 1.54 | 47.9 | 86.3 |
| 11 | 3 | [5000]:[12]:[1] | 5.0 | 6.5 | 46.5 | 43.4 | 33.6 | 1.29 | 19.6 | 58.5 |
| 12 | 3 | [2000]:[10]:[1] | 2.0 | 6.5 | 57.1 | 19.5 | 14.9 | 1.31 | 11.7 | 78.4 |
| 13 | 3 | [750]:[10]:[1] | 1.25 | 6.5 | 53.2 | 7.75 | 5.96 | 1.30 | 4.24 | 71.1 |
| 14 | 3 | [500]:[10]:[1] | 0.75 | 6.5 | 64.0 | 4.83 | 4.31 | 1.12 | 3.45 | 79.9 |

[a]Polymerizations were performed in dimethylacetamide using 9.35 μmol of PC and irradiated using white LED lights, except runs 5 and 6, which were irradiated with sunlight[b].

[c]Measured by $^1$H NMR.

[d]Measured by gel-permeation chromatography coupled with light-scattering.

[e]Theoretical number-average molecular weight, determined by the monomer to initiator ratio, the monomer conversion, and molecular weight of EBP.

[f]Calculated from the ratio of the theoretically predicted to experimentally observed number-average molecular weights.

TABLE 4

Computed photophysical properties of photocatalysts 1-6.

| PC | Triplet energy (eV) | $E^0(PC^{\bullet+}/{}^3PC^*)$ (V vs SCE) | $E^0(PC^{\bullet+}/PC)$ (V vs SCE) |
|---|---|---|---|
| 1 | 2.31 | −2.36 | −0.05 |
| 2 | 2.34 | −2.34 | 0.00 |
| 3 | 2.37 | −2.24 | 0.13 |
| 4 | 2.21 | −2.06 | 0.16 |
| 5 | 2.10 | −2.20 | −0.02 |
| 6 | 2.15 | −2.12 | 0.02 |

In conclusion, a series of computationally designed diaryl dihydrophenazines were synthesized and investigated as organic PCs in O-ATRP to efficiently polymerize MMA and other monomers to well-defined polymers, synthesizing polymers with dispersity as low as 1.03 and demonstrating quantitative initiator efficiency. Overall, organic PCs in O-ATRP rival metal ATRP catalysts in polymerization performance, able to polymerize a variety of methacrylates and acrylates. First principles calculations inspired the discovery of these PCs, provided insight into why 3 proved a highly efficient PC, and ultimately led to the design of 6, which proved to have outstanding properties.

In another aspect of the present invention, N-Aryl phenoxazines were synthesized and introduced as strongly reducing metal-free photoredox catalysts in organocatalyzed atom transfer radical polymerization for the synthesis of well-defined polymers. Experiments confirmed quantum chemical predictions that, like the dihydrophenazine analogs, the photoexcited states of phenoxazine photoredox catalysts are strongly reducing and achieve superior performance when they possess charge transfer character. Phenoxazines were compared to certain dihydrophenazines and phenothiazines as photoredox catalysts to gain insight into the performance of these catalysts and establish principles for catalyst design. Maintenance of a planar conformation of the phenoxazine catalyst during the catalytic cycle encourages the synthesis of well-defined macromolecules. Using these principles, a core substituted phenoxazine was shown to be a visible light photoredox catalyst that performed superior to UV-absorbing phenoxazines, as well as known organic photocatalysts in organocatalyzed atom transfer radical polymerization. Using this catalyst and irradiating with white LEDs resulted in the production of polymers with targeted molecular weights through achieving quantitative initiator efficiencies, which possess dispersities ranging from 1.13 to 1.31.

In various embodiments, the organic compound is at least one selected from the group consisting of:

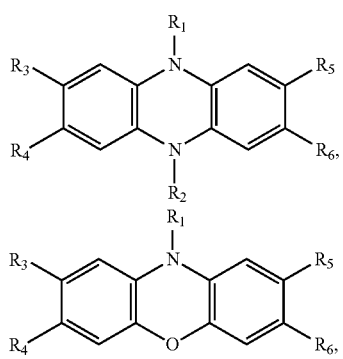

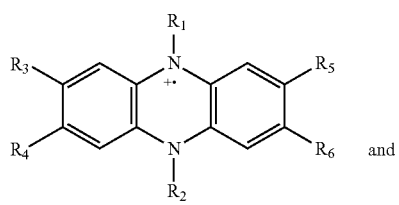

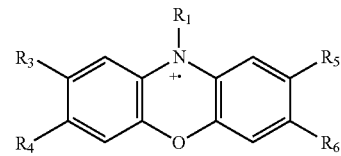

wherein: each occurrence of R is independently selected from the group consisting of H, $C_1$-$C_6$ alkyl, $C_1$-$C_6$ haloalkyl, optionally substituted phenyl, —OH, —O($C_1$-$C_6$ alkyl), —$NO_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O) ($C_1$-$C_6$ alkyl), —S(O)$_2$($C_1$-$C_6$ alkyl), —S(phenyl), —S(O) (phenyl), and —S(O)$_2$(phenyl); each occurrence of $R_1$ is independently selected from the group consisting of phenyl, 1-naphthyl and 2-naphthyl, each of which is independently substituted with at least one R; each occurrence of $R_2$ and $R_3$ is independently selected from phenyl and 4-phenyl-phenyl, each of which is independently substituted with at least one R; each occurrence of $R_3$, $R_4$, $R_5$, and $R_6$ is independently selected from the group consisting of phenyl, 4-phenyl-phenyl, 1-naphthryl, 2-naphthryl, triphenylamine, phenanthrenyl, and pyrenyl, each of which is independently substituted with at least one R; or a salt or solvate thereof.

In certain embodiments, $R_3$ and $R_5$ are H. In other embodiments, $R_4$ and $R_6$ are H. In yet other embodiments, $R_3$=$R_5$. In yet other embodiments, $R_4$=$R_6$. In yet other embodiments, $R_3$ is H and $R_5$ is not H. In other embodiments, $R_4$ is H and $R_6$ is not H.

In various embodiments, the quenching step is an oxidative quenching step. In various embodiments, the quenching step is a reductive quenching step.

In various embodiments, the organic compound is at least one selected from the group consisting of:

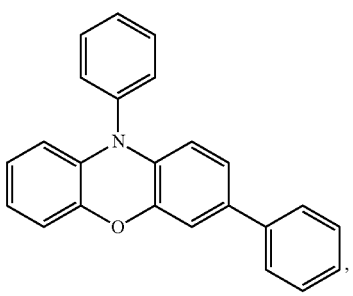

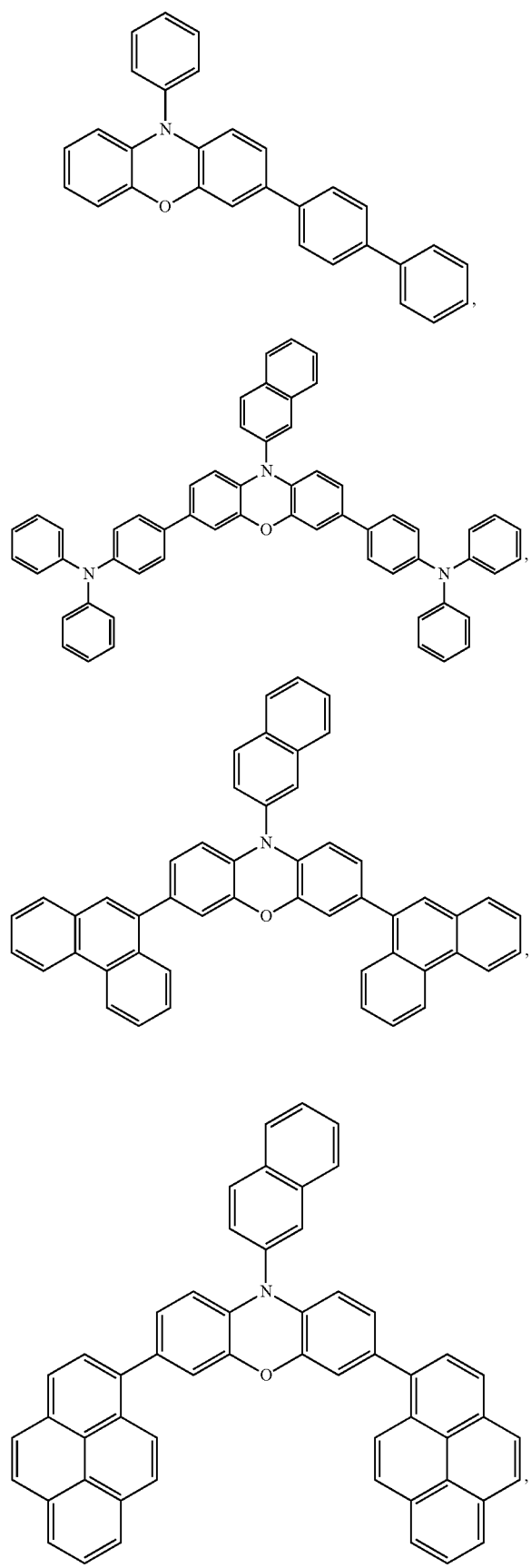

or a salt or solvate thereof. Although the bromine salts of the radical cations are illustrated herein, the claim encompasses other salts of these compounds.

In another aspect, the invention provides a method of promoting reaction of at least one reagent, wherein the reaction comprises an oxidative or reductive quenching step, wherein the method comprises irradiating the at least one reagent in the presence of an organic compound with an excited-state reduction potential that is equal to or more negative than about −1.0 V vs. SCE, or a salt or radical of an organic compound with an excited-state reduction potential that is equal to or more negative than about −1.0 V vs. SCE. In some embodiments, during the course of the reaction, the salt or radical of the organic compound may or may not form a compound with an excited-state reduction potential that is equal to or more negative than about −1.0 V vs. SCE in solution. In some embodiments, the salt or radical of the organic compound itself acts as the catalyst.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in cell culture, molecular genetics, organic chemistry, and peptide chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$) alkyl, such as, but not limited to, ethyl, methyl, isopropyl, isobutyl, n-pentyl, n-hexyl and cyclopropylmethyl.

As used herein, the term "electromagnetic radiation" includes radiation of one or more frequencies encompassed within the electromagnetic spectrum. Non-limiting examples of electromagnetic radiation comprise gamma radiation, X-ray radiation, UV radiation, visible radiation, infrared radiation, microwave radiation, radio waves, and electron beam (e-beam) radiation. In one aspect, electromagnetic radiation comprises ultraviolet radiation (wavelength from about 10 nm to about 380 nm), visible radiation (wavelength from about 380 nm to about 700 nm) or infrared radiation (radiation wavelength from about 700 nm to about 1 mm). Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In one embodiment, the UV light source emits light between about 350 nm and about 400 nm. In some embodiments, the UV light source emits light between about 400 nm and about 500 nm.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "instructional material" includes a publication, a recording, a diagram, or any other medium of expression that may be used to communicate the usefulness of the compositions of the invention. In one embodiment, the instructional material may be part of a kit useful for generating a polymer system of the invention. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

As used herein, the term "polymer" refers to a molecule composed of repeating structural units typically connected by covalent chemical bonds. The term "polymer" is also meant to include the terms copolymer and oligomers.

As used herein, the term "polymerization" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combination thereof. A polymerization reaction may consume between about 0% and about 100% of the at least one functional group available in the system. In one embodiment, polymerization of at least one functional group results in about 100% consumption of the at least one functional group. In another embodiment, polymerization of at least one functional group results in less than about 100% consumption of the at least one functional group.

As used herein, the term "reactive" as applied to a chemical group regarding a reaction indicates that this group, when submitted to appropriate conditions, may take part in the reaction in question.

As used herein, the term "scaffold" refers to a two-dimensional or a three-dimensional supporting framework. A scaffold can form a two- or three-dimensional structure of controlled mesh size. A monolayer is a non-limiting exemplary two-dimensional structure.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Although the description herein contains many embodiments, these should not be construed as limiting the scope of the invention but as merely providing illustrations of some of the presently preferred embodiments of the invention.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination.

All references throughout this application (for example, patent documents including issued or granted patents or equivalents; patent application publications; and non-patent literature documents or other source material) are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, light source, wavelength, flux, and irradiation procedure, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general the terms and phrases used herein have their art-recognized meaning, which can be found by reference to standard texts, journal references and contexts known to those skilled in the art. Any preceding definitions are provided to clarify their specific use in the context of the invention.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials and Methods (a) General

Phenoxazine was purchased from Beantown Chemical. 4-biphenyl boronic acid was purchased from TCI America. Glacial acetic acid was purchased from VWR. All other reagents were purchased from Sigma-Aldrich. Those chemicals used in polymerizations, including methyl methacrylate (MMA), isobutyl methacrylate (BMA), isodecyl methacrylate (IDMA), benzyl methacrylate (BnMA), n-butyl acrylate (BA), styrene (St), 2,2,2-trifluoroethyl methacrylate (TFEMA), di(ethylene glycol) methacrylate (DEGMA), vinyl acetate (VA), acrylonitrile (AN), ethyl α-bromophenylacetate (EBP), diethyl 2-bromo-2-methyl malonate (DBMM), dimethylformamide (DMF), trimethylsilylhydroxyethyl methacrylate (TMSHEMA), ethyl α-chlorophenylacetate (EClP), methyl α-bromoisobutyrate (MBriB), methyl bromopropionate (MBP), 2-bromopropionitrile (BrPN), and dimethylacetamide (DMA) were purified by vacuum distillation followed by three freeze-pump-thaw cycles and stored under a nitrogen atmosphere before use. Dioxane was purified using an mBraun MB-SPS-800 solvent purification system and kept under nitrogen atmosphere.

2-Dicyclohexylphosphino-2,6-diisopropoxybiphenyl (RuPhos) and Chloro-(2-Dicyclohexylphosphino-2,6-diisopropoxy-1,1-biphenyl) [2-(2-aminoethyl)phenyl] palladium (II)-methyl-t-butyl ether adduct (RuPhos precatalyst) were stored under nitrogen atmosphere. Aryl halides used in the catalyst synthesis were degassed and stored under nitrogen. All other reagents were used as received. The visible light source was a 16-inch strip of double-density white LEDs, purchased from Creative Lighting Solutions (item no. CL-FRS1210-5M-12V-WH), wrapped inside a 400 mL beaker. A VOGUE Professional Double Wide UV lamp light Nail Dryer (ND-562) was used for UV irradiation.

(b) Analytical Techniques $^1$H, $^{13}$C, and $^{19}$F NMR spectroscopy were performed in a Varian INOVA 300 MHz, 400 MHz, or 500 MHz spectrometer, as specified. Chemical shifts are referenced to the internal solvent resonance and reported as parts-per-million relative to tetramethylsilane. Analysis of polymer molecular weights was performed via gel permeation chromatography (GPC) coupled with multi-angle light scattering (MALS), using an Agilent HPLC fitted with one guard column and two PLgel 5 μm MIXED-C gel permeation columns, a Wyatt Technology TrEX differential refractometer, and a Wyatt Technology miniDAWN TREOS light scattering detector, using THF as the eluent at a flow rate of 1.0 mL/min. Ultraviolet-visible spectroscopy was performed on an Agilent spectrophotometer using DMF as the solvent. Emission spectroscopy was performed on a SLM 8000C spectrofluorimeter using DMF as the solvent. Samples were sparged with argon for 15 minutes prior to analysis. Cyclic voltammetry was performed with a CH Instruments electrochemical analyzer with a Ag/AgNO$_3$ (0.01 M in MeCN) reference electrode using MeCN as the solvent. Samples were sparged with argon for 5 minutes prior to analysis. ESI mass spectrometry analysis was performed on a Waters Synapt G2 HDMS Qtof using acetonitrile as the solvent. MALDI-TOF mass spectrometry analysis was performed on a Bruker Microflex-LRF mass spectrometer in positive ion, reflector mode using THF as the solvent

(c) General Polymerization Procedure

Figure 5:
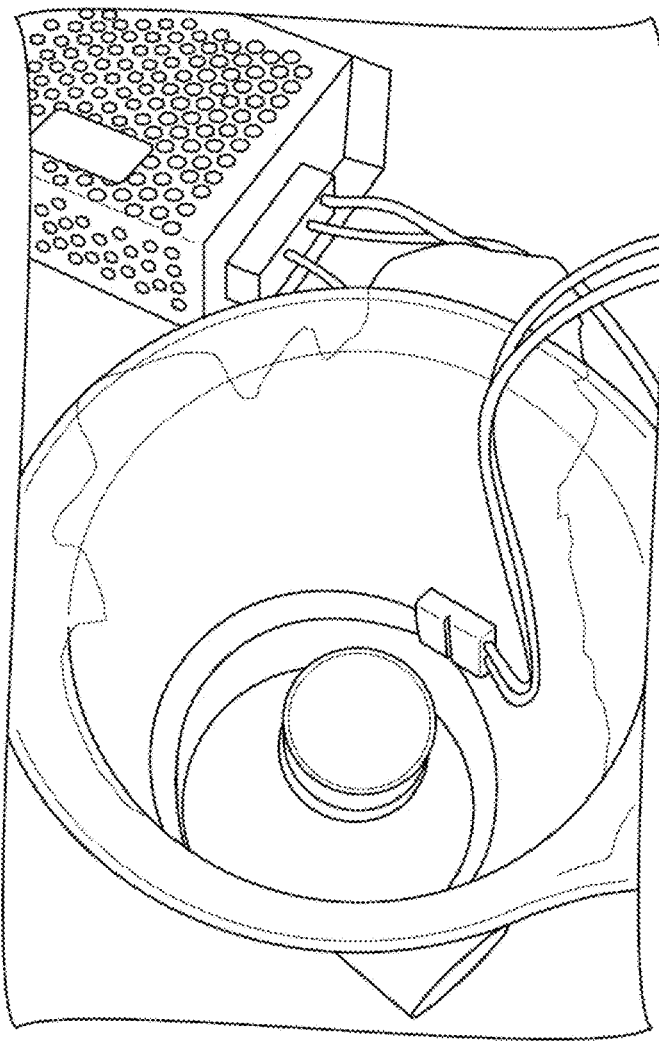
FIG. 5 is an exemplary photograph of the general reaction setup for polymerizations using LED irradiation.

A 20 mL vial was charged with a small stirbar and catalyst and transferred into a nitrogen-atmosphere glovebox. Solvent, monomer, and initiator were then added sequentially via pipette. The vial was then sealed, placed inside a beaker illuminated by white LED light, and stirred (FIG. 5). To analyze the progress of a polymerization at a given time point (e.g. for kinetic analysis or for the "on/off" irradiation experiment), a 0.2 mL aliquot of the reaction media was removed via syringe and injected into a vial containing 0.7 mL $CDCl_3$ with 250 ppm butylated hydroxytoluene (BHT). This aliquot was then analyzed by $^1$H NMR, subsequently allowed to dry, and then re-dissolved in THF for further analysis by SEC-MALS. After a polymerization was considered approximately complete (according to the time specified in the various data tables), the reaction was removed from the glovebox, poured into a 20-fold excess of methanol with respect to the total reaction volume, stirred, and the product polymer was then isolated by vacuum filtration and washed with excess methanol.

For copolymers specified as isolated, isolation was performed by pouring the reaction mixture into a 50-fold excess of $CH_3OH$, causing the polymer to precipitate. After 1 hour of stirring, the precipitate was collected via vacuum filtration and dried under reduced pressure. NMR analysis of poly(DEGMA) and poly(TFEMA) was performed by pouring their respective reaction mixtures into 50 mL water, stirring for 1 hour, and collecting the precipitate via vacuum filtration. NMR analysis of poly(TMSHEMA) was performed by pouring the reaction mixture into 50 mL $CH_2Cl_2$, stirring for 1 hour, and collecting the precipitate via vacuum filtration.

Control polymerizations revealed no polymerization occurred in the absence of any single component (i.e. light, PC, or initiator), or in the presence of oxygen or TEMPO, (supporting a radical polymerization mechanism).

(d) Procedure for Polymerizations Performed in Natural Sunlight

Figure 6:
FIG. 6 is an image of a reaction of the invention being run in natural sunlight.
Figure 7A:
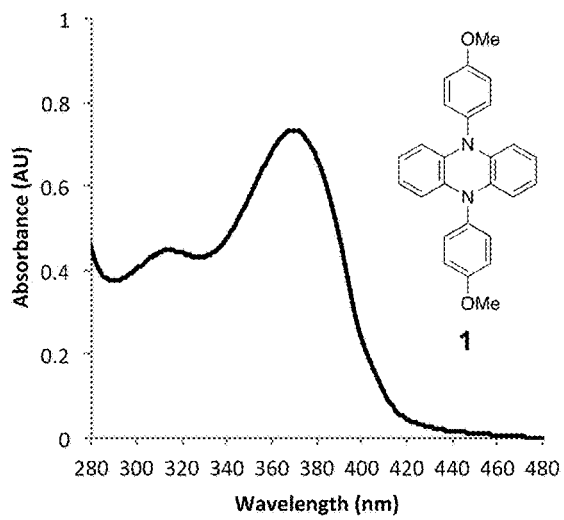
FIGS. 7A-7F are a set of graphs illustrating UV-Vis spectra of catalysts 1 (FIG. 7A), 2 (FIG. 7B), 3 (FIG. 7C), 4 (FIG. 7D), 5 (FIG. 7E), and 6 (FIG. 7F) at 0.15 mM in DMF.
Figure 7B:
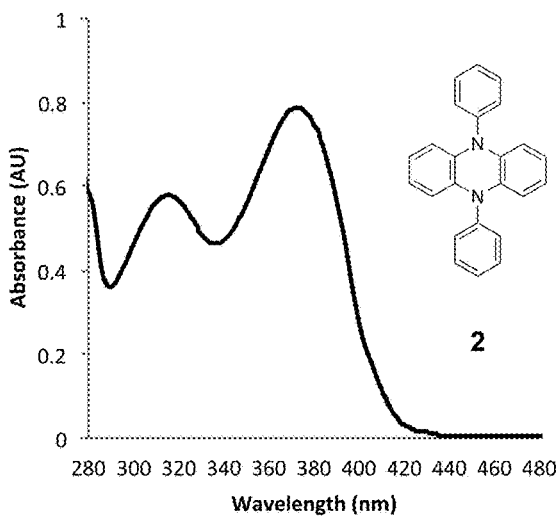
Figure 7C:
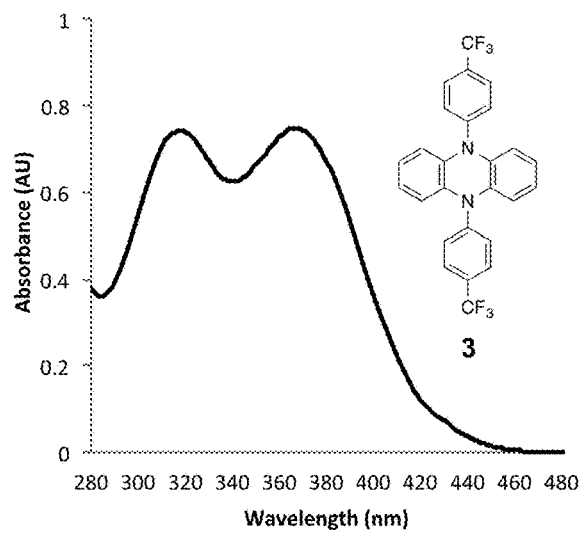
Figure 7D:
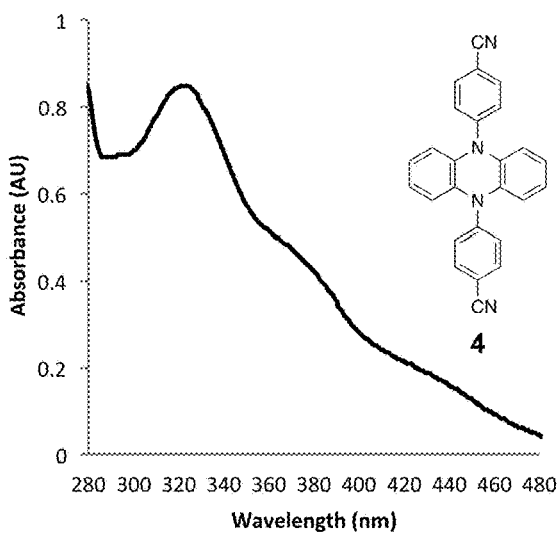
Figure 7E:
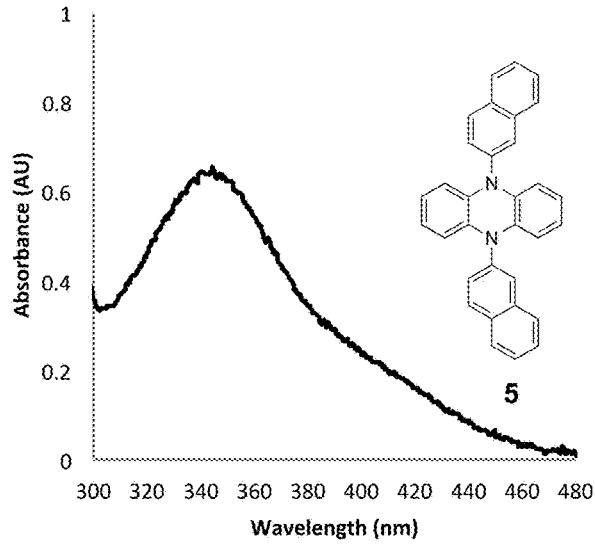
Figure 7F:
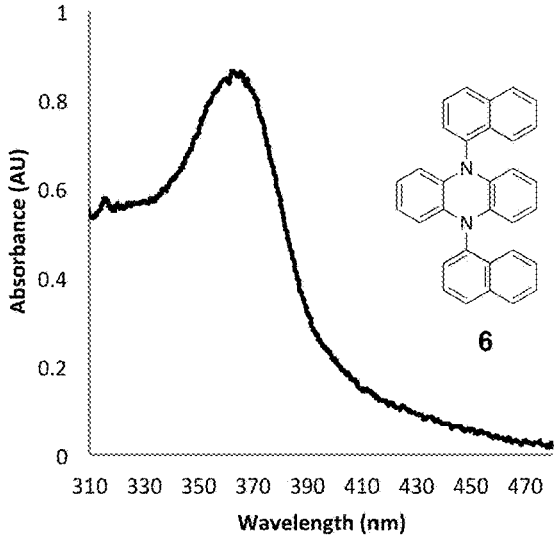
Figure 8A:
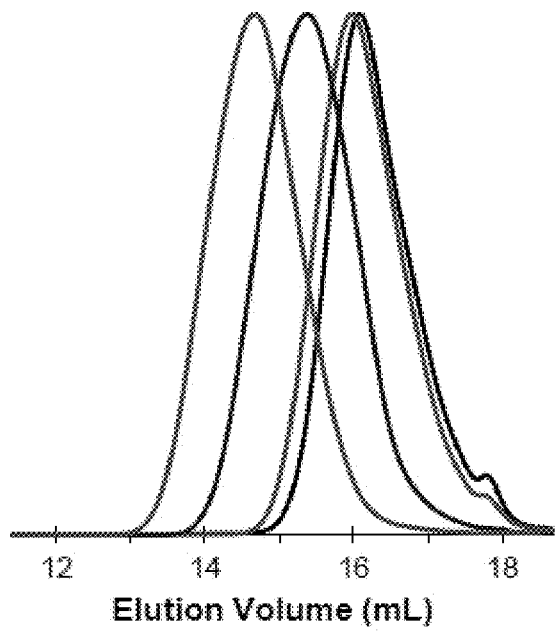
FIG. 8A illustrates GPC trace of runs 11 (green), 12 (blue), 13 (red), and 14 (black) (in increasing order to maximum elution volume: green<blue<red<black), Table 2.
Figure 8B:
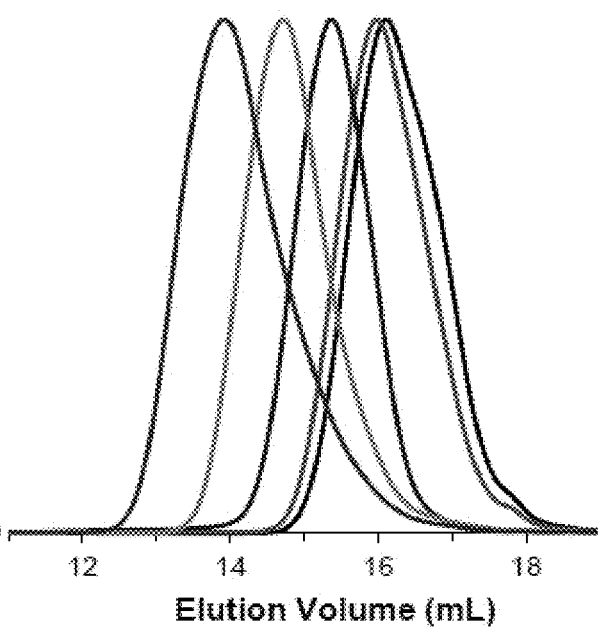
FIG. 8B illustrates GPC trace of runs 10 (purple) 9 (green), 3 (blue), 8 (red), and 7 (black) (in increasing order to maximum elution volume: purple<green<blue<red<black), Table 2.

A 20 mL vial was charged with a small stirbar and catalyst (9.35 μmol, 1.00 eq.) and transferred into a nitrogen-atmosphere glovebox. DMA (1.00 mL), MMA (1.00 mL, 9.35 mmol, 1000 eq.) and EBP (16.4 μL, 93.5 μmol, 10.0 eq.) were added sequentially via pipette. The vials were then removed from the glovebox, sealed with electrical tape, and placed in the sunlight from 9 AM to 4 PM (FIG. 6).

(e) Synthesis 5,10-dihydrophenazine

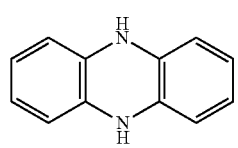 [SMILES: c1ccc2c(c1)Nc1ccccc1N2]

A 500 mL round bottom flask was charged with a mixture of $H_2O$ (200 mL), EtOH (50 mL), and a stir bar. The mixture was sparged with nitrogen for 30 minutes and then phenazine (2.00 g, 27.8 mmol, 1.00 eq.) and $Na_2S_2O_4$ (23.3 g, 278 mmol, 10.0 eq.) were then added. This mixture was subsequently heated at reflux under nitrogen atmosphere for 3 h. After cooling to RT, the product was isolated as a precipitate via cannula filtration, washed with excess deoxygenated $H_2O$, and dried under reduced pressure to yield a light green powder (1.35 g, 7.42 mmol, 67%). The product was stored under nitrogen until further use.

5,10-di(4-methoxyphenyl)-5,10-dihydrophenazine (1)

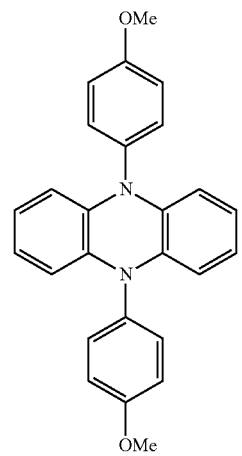 [SMILES: COc1ccc(N2c3ccccc3N(c3ccc(OC)cc3)c3ccccc32)cc1]

An oven-dried vacuum tube was charged with 5,10-dihydrophenazine (1.00 g, 5.50 mmol, 1.00 eq.), NaO$^t$Bu (2.11 g, 22.00 mmol, 4.00 eq.), RuPhos (103 mg, 0.22 mmol, 0.04 eq.), RuPhos precatalyst (180 mg, 0.22 mmol, 0.04 eq.), 4-bromoanisole (4.05 g, 22.0 mmol, 4.00 eq), and 8.00 mL dioxane. This flask was sealed under nitrogen and heated at 110° C. for 10 h. After cooling to room temperature, 200 mL $CH_2Cl_2$ was added to the reaction mixture and this was extracted three times with 200 mL $H_2O$. The organic layer was dried with $MgSO_4$, filtered, and the volatiles were removed under reduced pressure to reveal a brown solid. Purification by column chromatography (1:3 mixture of $CH_2Cl_2$ and hexanes) afforded the product 1 as a light yellow solid (1.00 g, 2.53 mmol, 46%). $^1$H NMR ($C_6D_6$, 500 MHz): δ 7.11-7.02 (m, 4H), 6.78-6.67 (m, 4H), 6.33 (dd, J=5.9, 3.4 Hz, 4H), 5.89 (dd, J=5.8, 3.5 Hz, 4H), 3.23 (s, 6H). $^{13}$C NMR ($C_6D_6$, 100 MHz): δ 54.53, 112.60, 116.33, 120.94, 127.52, 132.18, 137.24, 159.05. HRMS (ESI): calc'd for M+ $C_{26}H_{22}N_2O_2$, 394.1681. found 394.1675. UV/Vis: $\lambda_{max}$ 372 nm.

5,10-diphenyl-5,10-dihydrophenazine (2)

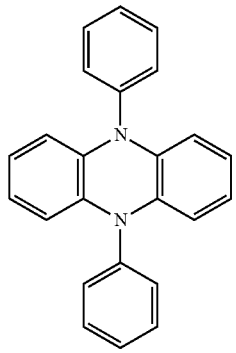 [SMILES: c1ccc(N2c3ccccc3N(c3ccccc3)c3ccccc32)cc1]

An oven-dried vacuum tube was charged with 5,10-dihydrophenazine (1.00 g, 5.50 mmol, 1.00 eq.), NaOtBu (2.11 g, 22.00 mmol, 4.00 eq.), RuPhos (103 mg, 0.22 mmol, 0.04 eq.), RuPhos precatalyst (180 mg, 0.22 mmol, 0.04 eq.), iodobenzene (4.49 g, 22.0 mmol, 4.00 eq), and 8.00 mL dioxane. This flask was sealed under nitrogen and heated at 110° C. for 10 h. After cooling to room temperature, 200 mL CH$_2$Cl$_2$ was added to the reaction mixture and this was extracted three times with 200 mL H$_2$O. The organic layer was dried with MgSO$_4$, filtered, and the volatiles were removed under reduced pressure to reveal a red-brown solid. Purification by column chromatography (1:3 mixture of CH$_2$Cl$_2$ and hexanes) afforded the product 2 as a light yellow solid (1.27 g, 3.80 mmol, 69%). Further purification by layering a solution of the product in CH$_2$Cl$_2$ with hexanes gave 2 as yellow needles. $^1$H NMR (C$_6$D$_6$, 400 MHz): δ 7.16 (could not be resolved from NMR solvent peak), 7.07-7.00 (m, 2H), 6.31-6.25 (m, 4H), 5.85-5.79 (m, 4H). $^{13}$C NMR (C$_6$D$_6$, 100 MHz): δ 112.69, 121.03, 127.69, 131.03, 131.22, 136.75, 140.38. HRMS (ESI): calc'd for M+ C$_{24}$H$_{18}$N$_2$, 334.1470. found 334.1482. UV/Vis: λ$_{max}$ 369 nm.

5,10-di(4-trifluoromethylphenyl)-5,10-dihydrophenazine (3)

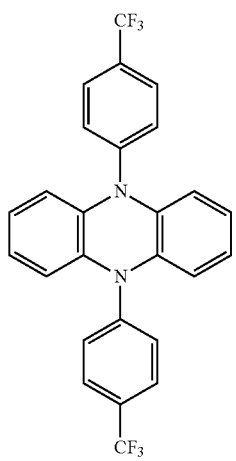 [SMILES: FC(F)(F)c1ccc(N2c3ccccc3N(c3ccc(C(F)(F)F)cc3)c3ccccc32)cc1]

An oven-dried vacuum tube was charged with 5,10-dihydrophenazine (1.01 mg, 5.55 mmol, 1.00 eq.), NaO$^t$Bu (2.13 g, 22.22 mmol, 4.00 eq.), RuPhos (102 mg, 0.22 mmol, 0.04 eq.), RuPhos precatalyst (180 mg, 0.22 mmol, 0.04 eq.), 4-bromobenzotrifluoride (5.00 g, 22.22 mmol, 4.00 eq), and 8.00 mL dioxane. This flask was sealed under nitrogen and heated at 110° C. for 10 h. After cooling to room temperature, 200 mL CH$_2$Cl$_2$ and 200 mL H$_2$O was added to the reaction flask, causing the product to precipitate. Filtration and washing with CH$_2$Cl$_2$ afforded 3 as a light yellow powder (1.65 g, 3.52 mmol, 63%). Further purification by layering a solution of the product in CH$_2$Cl$_2$ with hexanes gave 3 as light yellow needles. $^1$H NMR (C$_6$D$_6$, 400 MHz) δ 7.25 (d, J=8.1 Hz, 4H), 6.90 (d, J=8.0 Hz, 4H), 6.36-6.30 (m, 4H), 5.69-5.63 (m, 4H). $^{13}$C NMR (C$_6$D$_6$, 100 MHz): δ 113.26, 121.65, 128.17, 127.52, 128.21, 131.32, 135.91, 143.54. $^{19}$F NMR (C$_6$D$_6$, 376 MHz): δ -62.23. HRMS (ESI): calc'd for M+ C$_{26}$H$_{16}$F$_6$N$_2$, 470.1218. found 470.1216. UV/Vis: λ$_{max}$ 367 nm.

5,10-di(4-cyanophenyl)-5,10-dihydrophenazine (4)

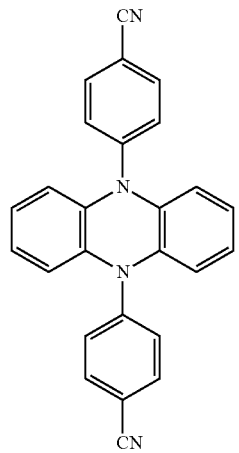 [SMILES: N#Cc1ccc(N2c3ccccc3N(c3ccc(C#N)cc3)c3ccccc32)cc1]

An oven-dried vacuum tube was charged with 5,10-dihydrophenazine (500 mg, 2.75 mmol, 1.00 eq.), NaO$^t$Bu (1.06 g, 11.00 mmol, 4.00 eq.), RuPhos (51 mg, 0.11 mmol, 0.04 eq.), RuPhos precatalyst (90 mg, 0.11 mmol, 0.04 eq.), 4-bromobenzonitrile (2.00 g, 11.0 mmol, 4.00 eq), and 3.00 mL dioxane. This flask was sealed under nitrogen and heated at 110° C. for 10 h. After cooling to room temperature, 200 mL CH$_2$Cl$_2$ was added to the reaction mixture and this was extracted three times with 200 mL H$_2$O. The organic layer was dried with MgSO$_4$, filtered, and the volatiles were removed under reduced pressure to reveal a brown solid. Purification by column chromatography (1:1 mixture of CH$_2$Cl$_2$ and hexanes) produced the product 4 as a brown powder (718 mg, 1.87 mmol, 68%). Further purification by layering a solution of the product in CH$_2$Cl$_2$ with hexanes gave 4 as dark gold needles. $^1$H NMR (C$_6$D$_6$, 400 MHz) δ 6.98-6.89 (m, 4H), 6.73-6.64 (m, 4H), 6.42-6.36 (m, 4H), 5.72-5.66 (m, 4H). $^{13}$C NMR (C$_6$D$_6$, 100 MHz): δ 111.56, 114.16, 117.82, 121.96, 130.35, 134.52, 135.69, 144.12. HRMS (ESI): calc'd for M+C$_{26}$H$_{16}$N$_4$, 384.1375. found 384.1370. UV/Vis: λ$_{max}$ 321 nm.

5,10-di(2-naphthyl)-5,10-dihydrophenazine (5)

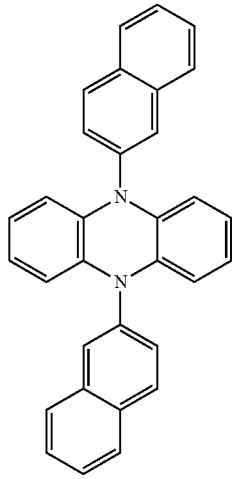 [SMILES: c1ccc2c(c1)N(c1ccc3ccccc3c1)c1ccccc1N2c1ccc2ccccc2c1]

An oven-dried vacuum tube was charged with 5,10-dihydrophenazine (911 mg, 5.00 mmol, 1.00 eq.), NaOtBu (1.92 g, 20.0 mmol, 4.00 eq.), RuPhos (46.7 mg, 0.10 mmol, 0.04 eq.), RuPhos precatalyst (81.7 mg, 0.10 mmol, 0.04 eq.), 2-bromonaphthalene (4.14 g, 20.0 mmol, 4.00 eq), and 10.0 mL dioxane. This flask was sealed under nitrogen and heated at 110° C. for 10 h. After cooling to room temperature, 250 mL $CH_2Cl_2$ and 250 mL $H_2O$ were added to the reaction flask, causing the product to precipitate. Filtration and washing with $CH_2Cl_2$ afforded 6 as a light yellow-green powder (1.95 g, 4.50 mmol, 90%). $^1$H NMR ($C_6D_6$, 300 MHz) δ 7.67 (dd, 4H), 7.63-7.47 (m, 4H), 7.36-7.16 (m, 8H), 6.33-6.21 (dd, 4H), 5.91-5.79 (dd, 4H). $^{13}$C NMR ($C_6D_6$, 75 MHz): δ 137.77, 136.91, 135.29, 132.99, 131.63, 130.54, 128.80, 127.83, 127.61, 126.53, 126.16, 121.30, 113.09. HRMS (ESI): calc'd for M+ $C_{32}H_{22}N_2$ 434.1783. found 434.1777. UV/Vis: λmax 340 nm.

5,10-di(1-naphthyl)-5,10-dihydrophenazine (6)

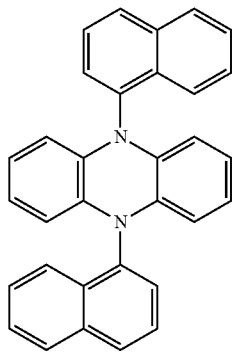 [SMILES: c1ccc2c(c1)N(c1cccc3ccccc13)c1ccccc1N2c1cccc2ccccc12]

6 was synthesized using a modified literature procedure (20). An oven-dried vacuum tube was charged with 5,10-dihydrophenazine (911 mg, 5.00 mmol, 1.00 eq.), NaO$^t$Bu (1.92 g, 20.0 mmol, 4.00 eq.), RuPhos (46.7 mg, 0.10 mmol, 0.04 eq.), RuPhos precatalyst (81.7 mg, 0.10 mmol, 0.04 eq.), 1-bromonaphthalene (4.14 g, 20.0 mmol, 4.00 eq), and 10.0 mL dioxane. This flask was sealed under nitrogen and heated at 110° C. for 48 h. After cooling to room temperature, 250 mL $CH_2Cl_2$ and 250 mL $H_2O$ was added to the reaction flask, causing the product to precipitate. Filtration and washing with $CH_2Cl_2$ afforded 6 as a yellow powder (0.06 g, 0.15 mmol, 3%). $^1$H NMR ($C_6D_6$, 400 MHz) δ 8.64-8.54 (m, 2H), 7.73-7.63 (m, 4H), 7.47 (m, 2H), 7.33-7.22 (m, 6H), 6.12-6.03 (dd, 4H), 5.70-5.63 (dd, 4H). $^{13}$C NMR ($C_6D_6$, 100 MHz): δ 136.65, 135.98, 129.27, 128.61, 128.41, 127.69, 127.46, 127.04, 126.94, 126.51, 123.89, 121.23, 112.97. HRMS (ESI): calc'd for M+ $C_{32}H_{22}N_2$, 434.1783. found 434.1771. UV/Vis: $\lambda_{max}$ 362 nm.

Synthesis of N-aryl Phenoxazine Catalyst (Example 7)

10-Phenylphenoxazine

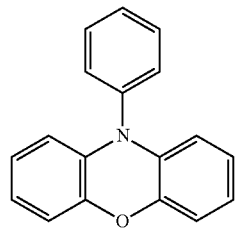 [SMILES: c1ccc(N2c3ccccc3Oc3ccccc32)cc1]

A 50 mL storage flask was charged with a stir bar, flame dried under vacuum and back filled with nitrogen three times. The flask was then charged with phenoxazine (183 mg, 1.0 mmol, 1.00 eq.), NaO$^t$Bu (192.2 mg, 2.0 mmol, 2.00 eq.), and RuPhos (12 mg, 0.03 mmol, 0.03 eq.). The flask was taken into a nitrogen filled glovebox where RuPhos Precat (21 mg, 0.03 mmol, 0.03 eq.), 1 mL dry dioxane and bromobenzene (0.11 mL, 2.0 mmol 2.00 eq.) were added. The flask was placed in an oil bath at 130° C. while stirring for 48 hours. The flask was then cooled to room temperature, diluted with $CH_2Cl_2$, and the solution was washed with water three times, brine once, dried over $MgSO_4$ and purified by recrystallization from $CH_2Cl_2$ layered with hexanes at −25° C. to give 60 mg of yellow crystals, 23% yield.

4-Trifluoromethylphenyl-10-phenoxazine, or 10-(4-(trifluoromethyl)phenyl)-10H-phenoxazine

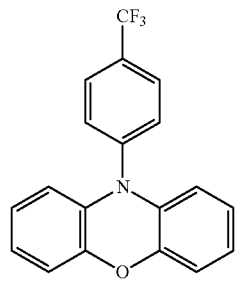 [SMILES: FC(F)(F)c1ccc(N2c3ccccc3Oc3ccccc32)cc1]

A 100 mL storage flask was charged with a stir bar, flame dried under vacuum and back filled with nitrogen three times. The flask was then charged with phenoxazine (800 mg, 4.37 mmol, 1.00 eq.), NaOtBu (840 mg, 8.74 mmol, 2.00 eq.), and RuPhos (52.4 mg, 0.13 mmol, 0.03 eq.). The flask was placed into a nitrogen filled glovebox where RuPhos Precat (91.77 mg, 0.13 mmol, 0.03 eq.), and 4 mL dry dioxane and 4-bromobenzotrifluoride (1.22 mL, 8.74 mmol, 2.00 eq.) were added. The flask was placed in an oil bath at 130° C. while stirring for 48 hours. The flask was then cooled to room temperature, diluted with CH$_2$Cl$_2$, and the solution was washed with water three times, brine once, dried over MgSO$_4$ and purified by recrystallization from CH$_2$Cl$_2$ layered with hexanes on top at −25° C. to yield 987 mg of yellow crystals, 69% yield. Final purification was conducted via sublimation at 100 mTorr at 175° C. $^1$H NMR (CDCl$_3$, 500 MHz) δ 7.87 (d, J=8.20 Hz, 2H), 7.51 (d, J=8.15 Hz, 2H), 6.73 (dd, J=7.85, 1.75 Hz, 2H), 6.68 (m, 2H), 6.62 (td, J=7.85, 1.75 Hz, 2H), 5.90 (d, J=8.20 Hz, 2H). 13C NMR (CDCl$_3$, 400 MHz) δ 144.10, 142.73, 133.89, 131.76, 130.97, 130.64, 128.44, 123.52, 122.09, 115.93, 113.39. 19F NMR (CDCl$_3$, 300 MHz) δ 62.55. HRMS (ESI): calculated for M$^+$ C$_{19}$H$_{12}$F$_3$NO, 327.0871; observed 327.0869.

1-Naphthalene-10-phenoxazine, or
10-(naphthalen-1-yl)-10H-phenoxazine

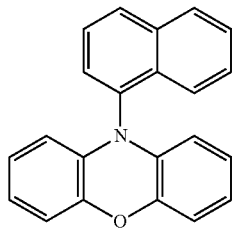 [SMILES: c1ccc2c(c1)Oc1ccccc1N2c1cccc2ccccc12]

A stir bar was placed into a 100 mL storage flask, flame dried under vacuum and then back filled with nitrogen three times. The flask was then charged with phenoxazine (1.00 g, 5.46 mmol, 1.00 eq.), NaO$^t$Bu (1.054 g, 10.92 mmol, 2.00 eq.), and RuPhos (65.6 mg, 0.16 mmol, 0.03 eq.). The flask was taken into a nitrogen filled glovebox where RuPhos Precat (114.75 mg, 0.16 mmol, 0.03 eq.), 6 mL dry dioxane and 1-bromonaphthalene (1.53 mL, 10.92 mmol, 2.00 eq.) were added. The flask was placed in an oil bath at 130° C. while stirring for 48 hours. The flask was then cooled to room temperature, diluted with CH$_2$Cl$_2$, and the solution was washed with water three times, brine once, dried over MgSO$_4$ and purified by recrystallization from CH$_2$Cl$_2$ layered with hexanes on top at −25° C. to yield 790 mg of yellow crystals, 47% yield. Final purification was conducted via sublimation at 100 mTorr at 190° C. $^1$H NMR (CDCl$_3$, 500 MHz) δ 8.08 (d, J=8.35 Hz, 1H), 7.99 (dd, J=8.20, 3.95 Hz, 2H), 7.66 (t, J=7.25 Hz, 1H), 7.56 (m, 2H), 7.48 (m, 1H), 6.74 (dd, J=7.90, 1.45 Hz, 2H), 6.63 (t, J=7.85 Hz, 2H), 6.49 (td, J=7.85, 1.45 Hz, 2H), 5.71 (dd, J=7.90, 1.45 Hz, 2H). $^{13}$C NMR (CDCl$_3$, 400 MHz) δ 144.09, 135.77, 135.24, 134.48, 131.56, 129.35, 129.14, 128.95, 127.50, 127.07, 127.04, 123.57, 123.53, 121.47, 115.58, 113.57. HRMS (ESI): calculated for M+ C$_{22}$H$_{15}$NO, 309.1154; observed 309.1152.

2-Naphthalene-10-phenoxazine, or
10-(naphthalen-2-yl)-10H-phenoxazine

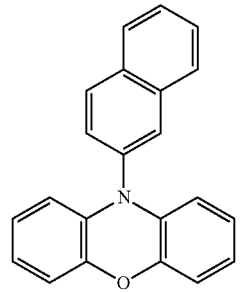 [SMILES: c1ccc2c(c1)Oc1ccccc1N2c1ccc2ccccc2c1]

A 100 mL storage flask was charged with a stir bar, flame dried under vacuum then back filled with nitrogen three times. The flask was then charged with phenoxazine (1.00 g, 5.46 mmol, 1.00 eq.), NaO$^t$Bu (1.054 g, 10.92 mmol, 2.00 eq.), and RuPhos (65.6 mg, 0.16 mmol, 0.03 eq.). The flask was taken into a nitrogen filled glovebox where RuPhos Precat (114.75 mg, 0.16 mmol, 0.03 eq.), 6 mL dry dioxane and 2-bromonaphthalene (2.26 mg, 10.92 mmol, 2.00 eq.) were added. The flask was placed in an oil bath at 130° C. while stirring for 48 hours. The flask was then cooled to room temperature, diluted with CH$_2$Cl$_2$, and the solution was washed with water three times, brine, dried over MgSO$_4$ and purified by recrystallization from CH$_2$Cl$_2$ at −25° C. to yield 890 mg of light yellow, flakey crystals, 53% yield. Final purification was conducted via sublimation at 100 mTorr at 195° C. $^1$H NMR (CDCl$_3$, 400 MHz) δ 8.08 (d, J=8.60 Hz, 1H), 7.95 (d, J=7.00 Hz, 1H), 7.88 (m, 2H), 7.57 (m, 2H), 7.42 (dd, J=8.64, 2.04 Hz, 1H), 6.73 (dd, J=7.84, 1.56 Hz, 2H), 6.66 (t, J=7.52, 2H), 6.57 (td, J=8.12, 1.60 Hz, 2H), 5.99 (d, J=7.96, 2H). $^{13}$C NMR (CDCl$_3$, 400 MHz) δ 144.42, 136.74, 135.06, 134.78, 133.28, 131.55, 130.29, 128.23, 128.15, 127.12, 126.78, 123.49, 121.66, 115.74, 113.78. HRMS (ESI): calculated for M+ C$_{22}$H$_{15}$NO, 309.1154; observed 309.1151.

1-Naphthalene-10-phenothiazine (or 10-(naphthalen-1-yl)-10H-phenothiazine)

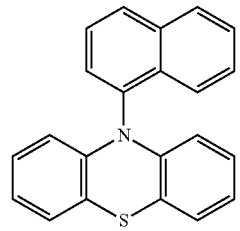 [SMILES: c1ccc2c(c1)Sc1ccccc1N2c1cccc2ccccc12]

A stir bar was placed in a 50 mL storage flask, flame dried under vacuum and then back filled with nitrogen three times. The flask was then charged with phenothiazine (0.600 g, 3.01 mmol, 1.00 eq.), NaO$^t$Bu (0.578 g, 6.02 mmol, 2.00 eq.), and RuPhos (42.2 mg, 0.09 mmol, 0.03 eq.). The flask was taken into a nitrogen filled glovebox where RuPhos Precat (73.8 mg, 0.09 mmol, 0.03 eq.), 3 mL dry Dioxane and 1-bromonaphthalene (0.84 mg, 6.02 mmol, 2.00 eq.) were added. The flask was placed in an oil bath at 130° C.

while stirring for 48 hours. The flask was then cooled to room temperature, diluted with CH$_2$Cl$_2$, and the solution was washed with water three times, brine once, dried over MgSO$_4$ and purified by recrystallization from CH$_2$Cl$_2$ layered with hexanes on top at −25° C. to yield 253 mg of a yellowish solid, 26% yield. Final purification was conducted via sublimation at 100 mTorr at 155° C.

3,7-Dibromo 1-Naphthalene-10-phenoxazine (or 3,7-dibromo-10-(naphthalen-1-yl)-10H-phenoxazine)

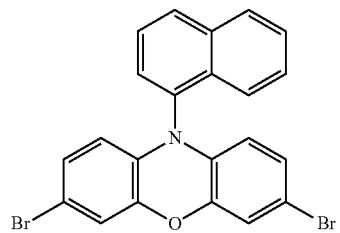 [SMILES: Brc1ccc2c(c1)Oc1cc(Br)ccc1N2c1cccc2ccccc12]

1-Naphthalene-10-phenoxazine (800 mg, 2.58 mmol, 1 eq.) was dissolved in 80 mL of chloroform. 80 mL of glacial acetic acid was then added to the stirring mixture. Aluminum foil was thoroughly wrapped around to cover the reaction vial, blocking out light. In the dark, powdered N-Bromosuccinimide (944 mg, 5.30 mmol, 2.05 eq.) was added in small portions over a 20 minute period. After 2 hours at room temperature the reaction mixture was concentrated under vacuum. The resulting solid was washed three times with water, brine, then dried with MgSO$_4$. A light tan powder (1.0 g, 2.14 mmol, 82.8% yield) was collected. This was used for the Suzuki coupling without further purification. $^1$H NMR (C$_6$D$_6$, 500 MHz) δ 7.82 (d, J=8.48 Hz, 1H), 7.57 (dd, J=25.02, 8.3 Hz, 2H), 7.19 (m, 1H), 7.12 (t, J=8.03 Hz, 2H), 6.88 (dd, J=7.32, 0.57 Hz, 3H), 6.84 (d, J=2.19 Hz, 2H), 6.36 (dd, J=8.54, 2.21 Hz, 2H). $^{13}$C NMR (CDCl$_3$, 400 MHz) δ44.27, 135.82, 134.22, 133.32, 130.91, 129.88, 129.15, 128.87, 127.83, 127.29, 127.06, 126.62, 123.02, 118.86, 114.74, 113.06.

3,7-Di(4-biphenyl) 1-Naphthalene-10-Phenoxazine, or 3,7-di([1,1'-biphenyl]-4-yl)-10-(naphthalen-1-yl)-10H-phenoxazine

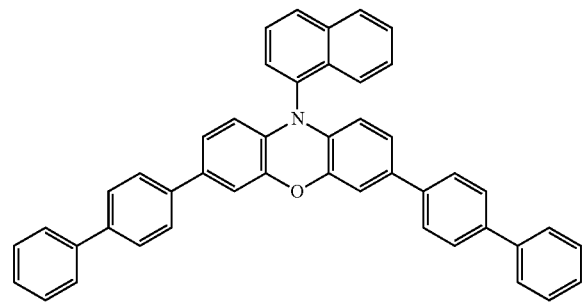 [SMILES: c1ccc(-c2ccc(-c3ccc4c(c3)Oc3cc(-c5ccc(-c6ccccc6)cc5)ccc3N4c3cccc4ccccc34)cc2)cc1]

A 200 mL schlenk flask was flame dried, filled with nitrogen, and equipped with a stir bar and reflux condenser before 3,7-Dibromo 1-Naphthalene-10-phenoxazine (225 mg, 0.48 mmol, 1 eq.), 4-biphenylboronic acid (381.8 mg, 1.9 mmol, 4 eq.) was added, then dissolved in 20 mL of THF. 6 mL of K$_2$CO$_3$ (2M) was syringed into the solution and then heated to 80° C. and stirred for 20 minutes. After which, Palladium tetrakis(triphenylphosphine) (93 mg, 15% mol) in a 20 mL solution of THF was added then heated to 100° C. and left to run for 24 hours. Once complete, the reaction was concentrated under vacuum, dissolved in DCM, and washed with water two times, brine, then dried with MgSO$_4$. A bright yellow powder was collected (270 mg, 0.44 mmol, 91.6% yield) after recrystallization in DCM/Methanol. $^1$H NMR (C$_6$D$_6$, 500 MHz) δ 8.18 (d, J=8.35 Hz, 1H), 7.69 (d, J=8.09 Hz, 2H), 7.66 (dd, J=7.21, 2.22 Hz, 2H), 7.51 (d, J=7.21 Hz, 4H), 7.46 (m, 8H), 7.37 (d, J=2.0 Hz, 2H), 7.25 (m, 8H), 6.73 (dd, J=2.03 Hz, 2H), 5.88 (d, J=8.28 Hz, 2H). $^{13}$C NMR (C$_6$D$_6$, 300 MHz) δ 144.49, 140.93, 139.74, 139.02, 135.69, 135.17, 134.49, 133.60, 131.47, 129.06, 128.82, 128.72, 127.52, 127.08, 126.95, 126.86, 126.76, 126.56, 123.38, 122.05, 114.23, 113.98.

Synthesis of 3-Phenyl Phenyl-10-Phenoxazine

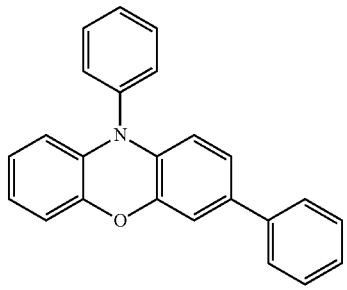 [SMILES: c1ccc(-c2ccc3c(c2)Oc2ccccc2N3c2ccccc2)cc1]

3-bromo phenyl-10-phenoxazine (0.170 g, 0.502 mmol, 1.00 equiv.) and phenyl boronic acid (0.122 g, 1.00 mmol, 2.00 equiv.) were added to a storage tube and cycled between vacuum and nitrogen three times before 4.00 mL of dried and degassed THF was added. Once all reagents were dissolved, 4.00 mL of a 2.00 M aqueous solution of K2CO3, which had been sparged with nitrogen, was added. In a separate Schlenk flask, palladiumtetrakis(triphenyl phosphine) (0.0464 g, 0.0402 mmol, 0.0800 equiv.) was dissolved in 4.00 mL of THF under inert atmosphere. The solution of Pd(PPh$_3$)$_4$ was then added to the reaction mixture and the reaction was heated at 100° C. for 48 h, before it was exposed to oxygen and allowed to cool to room temperature. The reaction mixture was concentrated under reduced pressure, diluted with DCM/hexanes, and passed through a short plug of silica. The solution was then moved to a separatory funnel, washed with de-ionized water once and brine twice. The solution was dried over magnesium sulfate, concentrated under vacuum, and recrystallized using DCM/methanol at −25° C. The product was collected via vacuum filtration as a white solid (0.127 g, 0.378 mmol, 75.2% yield). 1H NMR (C$_6$D$_6$, 400 MHz) δ 7.40-7.30 (m, 2H), 7.15-7.06 (m, 1H), 7.10-6.93 (m, 6H), 6.97-6.82 (m, 2H), 6.74 (ddd, J=13.5, 8.1, 1.8 Hz, 2H), 6.43 (dtd, J=31.9, 7.6, 1.5 Hz, 2H), 5.96-5.85 (m, 2H). 13C NMR (CDCl$_3$, 75 MHz) δ 144.53, 144.17, 140.19, 139.11, 134.72, 134.35, 133.84, 130.76, 130.64, 128.67, 128.05, 126.64, 126.17, 123.33, 121.69, 121.54, 115.63, 114.24, 113.63, 113.46. HRMS (ESI): calculated for M+ C24H17NO 335.1310; observed 335.1312.

Synthesis of 3-(4-biphenyl) Phenyl-10-Phenoxazine

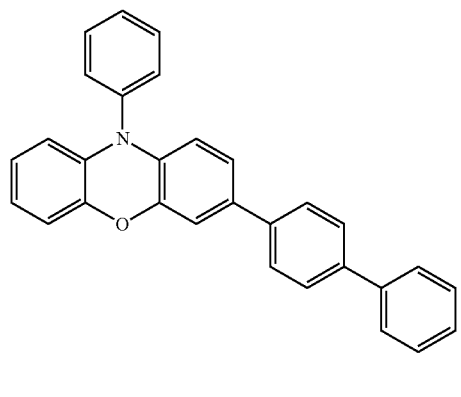 [SMILES: c1ccc(-c2ccc(-c3ccc4c(c3)Oc3ccccc3N4c3ccccc3)cc2)cc1]

3-bromo phenyl-10-phenoxazine (0.450 g, 0.133 mmol, 1.00 equiv.) and biphenyl boronic acid (0.395 g, 1.99 mmol, 1.50 equiv.) were added to a storage tube and cycled between vacuum and nitrogen three times before 30 mL of dried and degassed THF was added. Once all reagents were dissolved, 11.0 mL of a 2.00 M aqueous solution of K2CO3, which had been sparged with nitrogen, was added. In a separate Schlenk flask, palladiumtetrakis(triphenyl phosphine) (0.154 g, 0.133 mmol, 0.100 equiv.) was dissolved in 30.0 mL of THF under inert atmosphere. The solution of Pd(PPh$_3$)$_4$ was then added to the reaction mixture and the reaction was heated at 100° C. for 24 hours, before it was exposed to oxygen and allowed to cool to room temperature. The reaction mixture was concentrated under reduced pressure, diluted with DCM/hexanes, and passed through a short plug of silica. The solution was then moved to a separatory funnel, washed with de-ionized water once and brine twice. The solution was dried over magnesium sulfate, concentrated under vacuum, and recrystallized using DCM/methanol at −25° C. The product was collected via vacuum filtration as a light yellow solid (0.506 g, 1.23 mmol, 92.5% yield). 1H NMR (C6D6, 500 MHz) δ 7.54-7.49 (m, 2H), 7.46 (d, J=3.2 Hz, 4H), 7.25 (t, J=7.7 Hz, 2H), 7.21 (d, J=2.1 Hz, 1H), 7.13 (d, J=7.9 Hz, 2H), 7.08-7.02 (m, 1H), 7.00-6.96 (m, 2H), 6.84 (dt, J=8.2, 1.7 Hz, 2H), 6.51 (dtd, J=40.8, 7.6, 1.5 Hz, 2H), 6.01 (d, J=8.3 Hz, 1H), 5.97 (dd, J=7.9, 1.5 Hz, 1H). 13C NMR (C6D6, 75 MHz) δ 144.59, 144.19, 140.97, 139.68, 139.10, 139.02, 134.32, 134.18, 133.94, 130.79, 130.64, 128.71, 128.09, 127.48, 127.05, 126.95, 126.50, 123.37, 121.63, 121.60, 115.65, 114.10, 113.68, 113.50. HRMS (ESI): calculated for M+ C30H21NO 411.1623; observed 411.1627.

Synthesis of 3,7-Di(4-(diphenylamino)phenyl) 2-Naphthalene-10-Phenoxazine 3,7-Dibromo 2-Naphthalene-10-phenoxazine (0.350 g, 0.749 mmol, 1.00 equiv.) and 4-(diphenylamino) phenyl boronic acid (0.867 g, 3.00 mmol, 4.00 equiv.) were added to a 250 mL storage tube flask and cycled between vacuum and nitrogen three times. 30.0 mL of dried and degassed THF was added. Once all reagents were dissolved, 10.0 mL of a 2.00 M aqueous solution of K2CO3, which had been sparged with nitrogen, was added and the biphasic system was heated to 80° C. In a separate Schlenk flask, palladiumtetrakis(triphenyl phosphine) (0.130 g, 0.112 mmol, 0.150 equiv.) was dissolved in 30.0 mL of THF under inert atmosphere. The solution of Pd(PPh$_3$)$_4$ was then added to the reaction mixture and the temperature was raised to 100° C. for 24 h before it was allowed to cool to room temperature and exposed to oxygen. The reaction mixture was concentrated under reduced pressure, diluted with DCM/hexanes, and passed through a short plug of silica gel. The solution was then moved to a separatory funnel, washed with de-ionized water three times and brine one time. The solution was dried over magnesium sulfate, concentrated under vacuum, and recrystallized using DCM/methanol at −25° C. The product was collected as a yellow solid (0.453 mg, 0.569 mmol, 76.3% yield). $_1$H NMR (C$_6$D$_6$, 500 MHz) δ 7.60 (m, 2H), 7.53 (d, J=7.90 Hz, 1H), 7.26 (m, 11H), 7.05 (m, 24H), 6.81 (m, 6H), 5.97 (d, J=8.31 Hz, 2H). $_{13}$C NMR (C$_6$D$_6$, 300 MHz) δ 147.97, 146.92, 144.51, 136.21, 134.81, 134.51, 134.42, 133.30, 133.00, 131.23, 129.91, 129.25, 127.77, 127.00, 126.73, 126.35, 124.50, 124.30, 122.70, 121.36, 113.93, 113.88. HRMS (ESI): calculated for M+ C$_{58}$H$_{41}$N$_3$O, 795.3250; observed 795.3256.

39
Synthesis of 3,7-Di(9-phenanthracenyl) 2-Naphthalene-10-Phenoxazine

40
Synthesis of 3,7-Di(1-pyrenyl) 2-Naphthalene-10-Phenoxazine

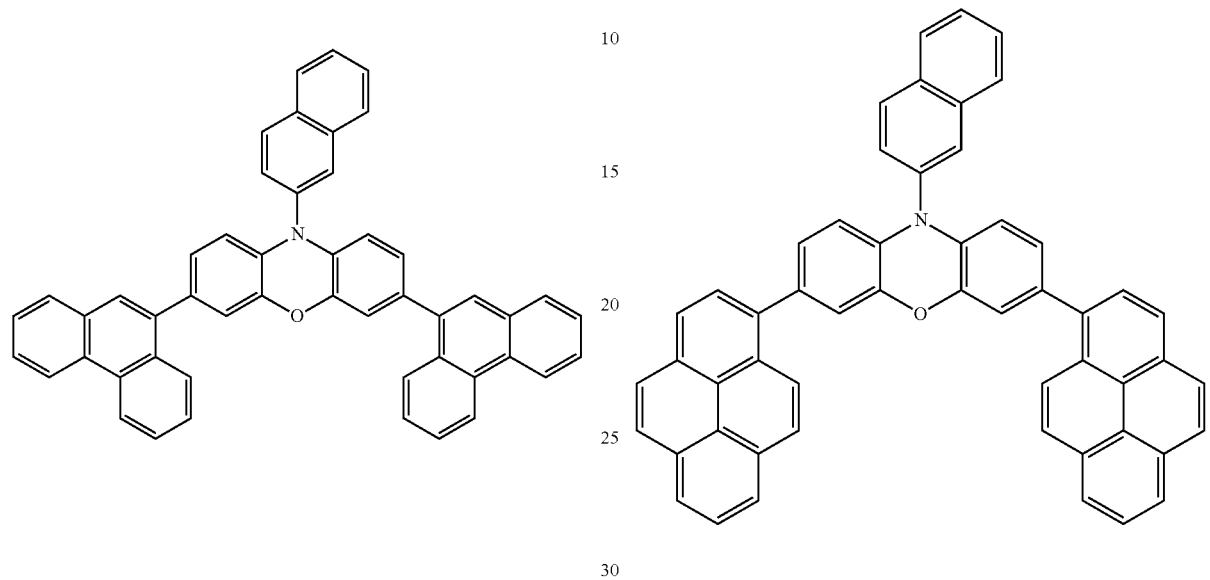

3,7-Dibromo 2-Naphthalene-10-phenoxazine (0.350 g, 0.749 mmol, 1.00 equiv.) and 9-phenanthracenyl boronic acid (0.569 g, 3.00 mmol, 4.00 equiv.) were added to a 250 mL storage tube flask and cycled between vacuum and nitrogen three times before 30.0 mL of dried and degassed THF was added. Once all of the reagents were dissolved, 10.0 mL of a 2.00 M aqueous solution of $K_2CO_3$, which had been sparged with nitrogen, was added and the biphasic system was heated to 80° C. In a separate Schlenk flask, palladiumtetrakis(triphenyl phosphine) (0.130 g, 0.112 mmol, 0.150 equiv.) was dissolved in 30.0 mL of THF under inert atmosphere. The solution of $Pd(PPh_3)_4$ was then added to the reaction mixture and the reaction was heated at 100° C. for 24 h before it was allowed to cool to room temperature and exposed to oxygen. The reaction mixture was concentrated under reduced pressure, diluted with DCM, and passed through a short plug of silica gel. The solution was then moved to a separatory funnel, washed with de-ionized water three times and brine one time. The solution was dried over magnesium sulfate, concentrated under vacuum, and recrystallized using DCM/methanol at −25° C. The product was collected via vacuum filtration as a yellow solid (0.408 g, 0.616 mmol, 82.2% yield). 1H NMR (C6D6, 500 MHz) δ 8.55 (d, J=8.13 Hz, 2H), 8.49 (d, J=8.03 Hz, 2H), 8.26 (d, J=8.18 Hz, 2H), 7.64 (m, 8H), 7.41 (m, 8H), 7.28 (m, 3H), 7.15 (d, J=1.82 Hz, 2H), 6.79 (dd, J=8.18, 1.86 Hz, 2H), 6.14 (d, J=8.19 Hz, 2H). 13C NMR (C6D6, 300 MHz) δ 144.15, 137.99, 136.31, 134.93, 134.59, 133.84, 133.09, 131.88, 131.46, 131.40, 130.98, 130.16, 130.00, 128.67, 127.82, 127.77, 127.27, 126.88, 126.80, 126.62, 126.44, 126.36, 126.34, 126.33, 125.25, 123.02, 122.54, 117.70, 113.52. HRMS (ESI): calculated for M+ C50H31NO, 661.2405; observed 661.2413.

3,7-Dibromo 2-Naphthalene-10-phenoxazine (0.350 g, 0.749 mmol, 1.00 equiv.) and 1-pyrene boronic acid (0.738 g, 3.00 mmol, 4.00 equiv.) were added to a 250 mL storage tube flask and cycled between vacuum and nitrogen three times before 30 mL of dried and degassed THF was added. Once all reagents were dissolved, 10.0 mL of a 2.00 M aqueous solution of $K_2CO_3$, which had been sparged with nitrogen, was added and the biphasic system was heated to 80° C. In a separate schlenk flask, palladiumtetrakis(triphenyl phosphine) (0.130 g, 0.112 mmol, 0.150 equiv.) was dissolved in 30.0 mL of THF under inert atmosphere. The solution of $Pd(PPh_3)_4$ was then added to the reaction mixture and the reaction was heated to 100° C. for 24 h before it was allowed to cool to room temperature and exposed to oxygen. The reaction mixture was concentrated under reduced pressure, diluted with DCM/Hexanes, and passed through a short plug of silica gel. The solution was then moved to a separatory funnel, washed with de-ionized water three times and brine one time. The solution was dried over magnesium sulfate, concentrated under vacuum, and recrystallized using DCM/methanol at −25° C. The product was collected via vacuum filtration as a yellow solid (0.376 g, 0.530 mmol, 70.8% yield). $_1$H NMR (C$_6$D$_6$, 500 MHz) δ 7.86 (d, J=8.34 Hz, 1H), 7.37 (m, 2H), 7.24 (m, 5H), 7.06 (d, J=2.05 Hz, 2H), 6.90 (m, 17H), 6.43 (dd, J=8.30, 2.11 Hz, 2H), 5.57 (d, J=8.32 Hz, 2H). $_{13}$C NMR (C$_6$D$_6$, 300 MHz) δ 144.30, 136.93, 136.24, 135.05, 134.95, 133.79, 133.12, 131.65, 131.48, 131.23, 130.64, 13.02, 128.85, 128.73, 127.83, 127.79, 127.47, 127.26, 126.85, 126.47, 125.98, 125.85, 125.43, 125.29, 125.28, 125.11, 125.01, 124.84, 124.80, 124.58, 118.09, 113.65. HRMS (ESI): calculated for M+ $C_{54}H_{35}NO$, 709.2405; observed 709.2407.

Synthesis of 3,7-Di(2-naphthyl) 2-Naphthalene-10-Phenoxazine

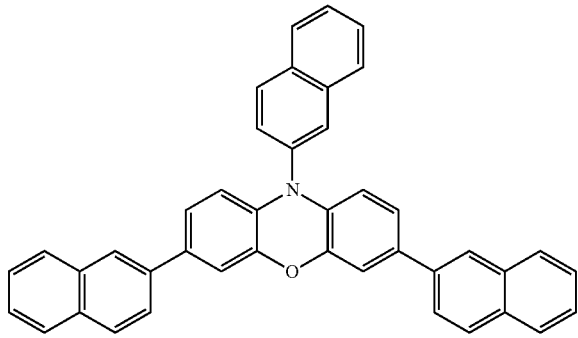 [SMILES: c1ccc2cc(-c3ccc4c(c3)Oc3cc(-c5ccc6ccccc6c5)ccc3N4c3ccc4ccccc4c3)ccc2c1]

3,7-Dibromo 2-Naphthalene-10-phenoxazine (0.400 g, 0.856 mmol, 1.00 equiv.) and 2-naphthalene boronic acid (0.589 g, 3.43 mmol, 4.00 equiv.) were added to a 250 mL storage tube flask and cycled between vacuum and nitrogen three times before 37.0 mL of dried and degassed THF was added. Once all reagents were dissolved, 11.0 mL of a 2.00 M aqueous solution of $K_2CO_3$, which had been sparged with nitrogen, was added and the biphasic system was heated to 80° C. In a separate Schlenk flask, palladiumtetrakis(triphenyl phosphine) (0.148 g, 0.128 mmol, 0.150 equiv.) was dissolved in 37.0 mL of THF under inert atmosphere. The solution of $Pd(PPh_3)_4$ was then added to the reaction mixture and the reaction was heated at 100° C. for 24 h before it was allowed to cool to room temperature and exposed to oxygen. The reaction mixture was concentrated under reduced pressure, diluted with DCM/Hexanes, and passed through a short plug of silica gel. The solution was then moved to a separatory funnel, washed with de-ionized water three times and brine one time. The solution was dried over magnesium sulfate, concentrated under vacuum, and recrystallized using DCM/methanol at −25° C. The product was collected via vacuum filtration as a yellow solid (0.481 g, 0.281 mmol, 32.8% yield). $_1$H NMR ($C_6D_6$, 500 MHz) δ 7.93 (d, J=1.20 Hz, 2H), 7.63 (m, 12H), 7.42 (d, J=2.06 Hz, 2H), 7.28 (m, 7H), 6.94 (dd, J=8.31, 2.06 Hz, 2H), 6.10 (d, J=8.31 Hz, 2H). $_{13}$C NMR ($C_6D_6$, 300 MHz) δ 149.68, 137.60, 136.23, 134.98, 134.90, 134.13, 133.78, 133.12, 132.79, 131.41, 129.98, 128.57, 128.25, 127.89, 127.65, 126.88, 126.52, 126.16, 125.62, 124.97, 124.82, 122.36, 114.73, 114.10. HRMS (ESI): calculated for M+ $C_{42}H_{27}NO$, 661.2405; observed 661.2413.

Synthesis of 3-(4-methoxyphenyl) Phenyl-10-Phenoxazine

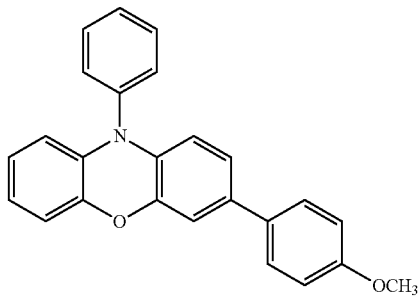 [SMILES: COc1ccc(-c2ccc3c(c2)Oc2ccccc2N3c2ccccc2)cc1]

3-bromo phenyl-10-phenoxazine (0.170 g, 0.502 mmol, 1.00 equiv.) and 4-methoxyphenyl boronic acid (0.153 g, 1.00 mmol, 2.00 equiv.) were added to a storage tube and cycled between vacuum and nitrogen three times before 4.00 mL of dried and degassed THF was added. Once all reagents were dissolved, 4.00 mL of a 2.00 M aqueous solution of $K_2CO_3$, which had been sparged with nitrogen, was added. In a separate Schlenk flask, palladiumtetrakis(triphenyl phosphine) (0.0464 g, 0.0402 mmol, 0.0800 equiv.) was dissolved in 4.00 mL of THF under inert atmosphere. The solution of $Pd(PPh_3)_4$ was then added to the reaction mixture and the reaction was heated at 100° C. for 48 h, before it was exposed to oxygen and allowed to cool to room temperature. The reaction mixture was concentrated under reduced pressure, diluted with DCM/hexanes, and passed through a short plug of silica. The solution was then moved to a separatory funnel, washed with de-ionized water once and brine twice. The solution was dried over magnesium sulfate, concentrated under vacuum, and recrystallized using DCM/methanol at −25° C. The product was collected via vacuum filtration as a white solid (0.140 g, 0.378 mmol, 76.0% yield). $_1$H NMR ($C_6D_6$, 500 MHz) δ 7.37-7.31 (m, 2H), 7.13 (td, J=7.4, 6.7, 1.2 Hz, 2H), 7.07-7.01 (m, 1H), 7.00-6.94 (m, 2H), 6.83 (dd, J=7.8, 1.5 Hz, 1H), 6.80-6.76 (m, 3H), 6.54 (td, J=7.6, 1.5 Hz, 1H), 6.46 (td, J=7.7, 1.5 Hz, 1H), 6.00 (d, J=8.3 Hz, 1H), 5.97 (dd, J=7.9, 1.5 Hz, 1H), 3.31 (s, 3H). $_{13}$C NMR ($C_6D_6$, 75 MHz) δ 159.08, 144.53, 144.20, 139.25, 134.61, 134.46, 133.30, 132.77, 130.75, 130.69, 127.22, 123.32, 121.45, 121.24, 115.63, 114.23, 113.92, 113.69, 113.44, 54.46. HRMS (ESI): calculated for M+$C_{25}H_{19}NO_2$ 365.1416; observed 365.1418.

Synthesis of 3-(4-trifluoromethylphenyl) Phenyl-10-Phenoxazine

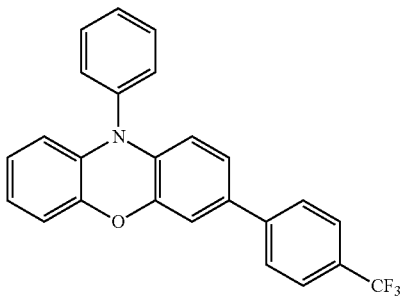 [SMILES: FC(F)(F)c1ccc(-c2ccc3c(c2)Oc2ccccc2N3c2ccccc2)cc1]

3-bromo phenyl-10-phenoxazine (0.170 g, 0.502 mmol, 1.00 equiv.) and 4-methoxyphenyl boronic acid (0.191 g, 1.00 mmol, 2.00 equiv.) were added to a storage tube and cycled between vacuum and nitrogen three times before 4.00 mL of dried and degassed THF was added. Once all reagents were dissolved, 4.00 mL of a 2.00 M aqueous solution of K2CO3, which had been sparged with nitrogen, was added. In a separate Schlenk flask, palladiumtetrakis(triphenyl phosphine) (0.0464 g, 0.0402 mmol, 0.0800 equiv.) was dissolved in 4.00 mL of THF under inert atmosphere. The solution of $Pd(PPh_3)_4$ was then added to the reaction mixture and the reaction was heated at 100° C. for 48 h, before it was exposed to oxygen and allowed to cool to room temperature. The reaction mixture was concentrated under reduced pressure, diluted with DCM, and passed through a short plug of silica. The solution was then moved to a separatory funnel, washed with de-ionized water once and brine twice. The solution was dried over magnesium sulfate, concentrated under vacuum, and recrystallized using DCM/methanol at −25° C. The product was collected via vacuum filtration as a white solid (0.0916 g, 0.378 mmol, 45.0% yield). 1H NMR ($C_6D_6$, 500 MHz) δ 7.32 (d, J=8.1 Hz, 2H), 7.13 (dd, J=8.0, 6.2 Hz, 4H), 6.98 (d, J=2.0 Hz, 1H), 6.96-6.93 (m, 3H), 6.83 (dt, J=7.8, 1.2 Hz, 1H), 6.61 (dd, J=8.3, 2.0 Hz, 1H), 6.54 (tt, J=7.7, 1.2 Hz, 1H), 6.46 (tt, J=7.8, 1.2 Hz, 1H), 5.97-5.91 (m, 2H). 13C NMR ($C_6D_6$, 75 MHz) δ 144.58, 144.03, 143.36, 138.81, 134.68, 134.04, 132.70, 130.86, 130.51, 128.62, 128.25, 128.20, 126.62, 126.16, 125.54, 123.50, 121.93, 121.84, 115.62, 114.19, 113.60, 113.57. 19F NMR ($C_6D_6$, 300 MHz) δ 62.01. HRMS (ESI): calculated for M+ $C_{25}H_{16}F_3NO$ 403.1184; observed 403.1184.

5,10-di(4-trifluoromethylphenyl)-5,10-dihydrophenazine Radical

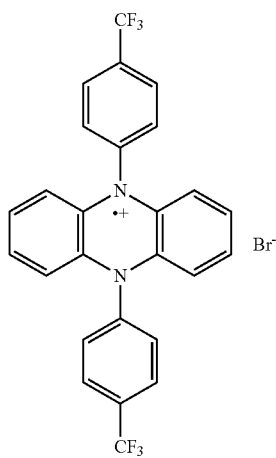 [SMILES: FC(F)(F)c1ccc(N2c3ccccc3N(c3ccc(C(F)(F)F)cc3)c3ccccc32)cc1 ; [Br-]]

5,10-di(4-trifluoromethylphenyl)-5,10-dihydrophenazine was synthesized according to established procedure. An oven-dried round bottom flask was charged with 5,10-di(4-trifluoromethylphenyl)-5,10-dihydrophenazine (1.00 g, 2.13 mmol, 1.00 eq.), 400 mL of benzene, and a small magnetic stir bar. Liquid bromine (403 mg, 2.55 mmol, 1.20 eq.) was added to the flask. A dark precipitate was observed almost immediately. The flask was sealed, vented, and left to stir overnight. The precipitate was collected via vacuum filtration and rinsed with approximately 50 mL of benzene three consecutive times to afford an army green powder (1.12 g, 96%). This powder was then dissolved in hot methanol, filtered, and placed in a freezer. After three days, the solution was filtered to obtain 377 mg dark green crystals of 20. HRMS (ESI+): calc'd for M.+$C_{26}H_{16}F_6N_2$, 470.1218. found 470.1218. UV/Vis: λmax 481 nm (DMAc). E0=0.28 V vs. SCE (0.29 V vs. SCE reported for 5,10-di(4-trifluoromethylphenyl)-5,10-dihydrophenazine).

3,7-Di(4-biphenyl) 1-Naphthalene-10-Phenoxazine, or 3,7-di([1,1'-biphenyl]-4-yl)-10-(naphthalen-1-yl)-10H-phenoxazine Radical

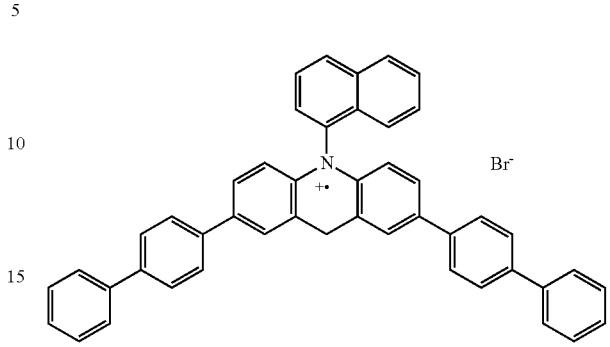

3,7-Di(4-biphenyl) 1-Naphthalene-10-Phenoxazine was synthesized according to established procedure. An oven-dried round bottom flask was charged with 3,7-Di(4-biphenyl) 1-Naphthalene-10-Phenoxazine (1.31 g, 2.13 mmol, 1.00 eq.), 400 mL of benzene, and a small magnetic stir bar. Liquid bromine (10.2 g, 63.9 mmol, 30 eq.) was added to the flask. The solution immediately turned green with a precipitate was observed almost immediately. The precipitate was filtered, then dissolved in DCM and precipitated with ether 3 times.

(f) Copolymerization Experiments (Examples 1-6)

Synthesis of PMMA-b-PMMA

MMA (1.00 mL, 9.35 mmol, 1000 eq.), EBP (16.4 µL, 93.5 µmol, 10 eq.), and 3 (4.4 mg, 9.35 µmol, 1 eq.) were dissolved in 1.00 mL DMA and reacted according to the above general polymerization procedure for 12 hours. At this time, an aliquot was taken for analysis (conv.=76.2%, $M_w$=14.3 kDa, Đ=1.21) and an additional 1.00 mL MMA and 1.00 mL DMA were added to the reaction mixture. After an additional 6 h, the resulting polymer was isolated according to the above general polymerization procedure and analyzed (isol. yield=72%, %, Mw=40.7 kDa, Đ=1.16).

Synthesis of PMMA-b-PMMA with a Dark Resting Period

MMA (1.00 mL, 9.35 mmol, 1000 eq.), EBP (16.4 µL, 93.5 µmol, 10.0 eq.), and 3 (4.4 mg, 9.35 µmol, 1.00 eq.) were dissolved in 1.00 mL DMA and reacted according to the above general polymerization procedure for 8 h. At this time, an aliquot was taken for analysis (conv.=61.2%, Mw=12.0 kDa, Đ=1.25). The reaction was then covered and left in the dark for 8 h. At this time, an aliquot was taken for analysis (conv.=61.0%, Mw=12.0 kDa, Đ=1.26) and an additional 1.00 mL MMA and 1.00 mL DMA were added to the reaction mixture and irradiated. After 8 h, the resulting polymer was isolated according to the above general polymerization procedure and analyzed (isol. yield=70%, Mw=40.7 kDa, Đ=1.16).

Synthesis of PMMA-b-PMMA from Isolated Macroinitiator

MMA (130 µL, 1.20 mmol, 2000 eq.), a sample of isolated polymer from Table 2, Run No. 11 (200 mg, 6.00 µmol, 10.0 eq.), and 3 (0.3 mg, 0.6 µmol, 1.0 eq.) were dissolved in 0.87 mL DMA and reacted according to the above general polymerization procedure for 12 h. The resulting polymer was isolated according to the above general polymerization procedure and analyzed (isol. yield=62%, Mw=72.9 kDa, Đ=1.44).

Synthesis of PMMA-b-PBA with a Dark Resting Period

MMA (1.00 mL, 9.35 mmol, 1000 eq.), EBP (16.4 µL, 93.5 µmol, 10.0 eq.), and 3 (4.4 mg, 9.35 µmol, 1.00 eq.) were dissolved in 1.00 mL DMA and reacted according to the above general polymerization procedure for 8 h. At this time, an aliquot was taken for analysis (conv.=72.0%, Mw=13.7 kDa, Đ=1.24). The reaction was then covered and left in the dark for 8 h. At this time, an aliquot was taken for analysis (conv.=71.4%, Mw=13.3 kDa, Đ=1.32) and an additional 1.30 mL BA and 1.00 mL DMA were added to the reaction mixture. After 8 h, the resulting polymer was isolated according to the above general polymerization procedure and analyzed (isol. yield=27%, Mw=84.5 kDa, Đ=1.33).

Synthesis of PMMA-b-PBA from Isolated Macroinitiator

BA (130 µL, 0.90 mmol, 2000 eq.), a sample of isolated polymer from Table 2, Run No. 11 (150 mg, 4.50 µmol, 10.0 eq.), and 3 (0.23 mg, 0.45 µmol, 1.00 eq.) were dissolved in 0.87 mL DMA and reacted according to the above general polymerization procedure for 12 h. The resulting polymer was isolated according to the general polymerization procedure described above and analyzed (isol. yield=71%, Mw=92.9 kDa, Đ=1.38).

Synthesis of PMMA-b-PBnMA with a Dark Resting Period

MMA (1.00 mL, 9.35 mmol, 1000 eq.), EBP (16.4 µL, 93.5 µmol, 10.0 eq.), and 3 (4.4 mg, 9.35 µmol, 1.00 eq.) were dissolved in 1.00 mL DMA and reacted according to the above general polymerization procedure for 8 h. At this time, an aliquot was taken for analysis (conv.=66.0%, Mw=11.2 kDa, Đ=1.34). The reaction was then covered and left in the dark for 8 h. At this time, an aliquot was taken for analysis (conv.=66.0%, Mw=11.1 kDa, Đ=1.34) and an additional 1.50 mL BnMA and 1.00 mL DMA were added to the reaction mixture. After 8 h, the resulting polymer was isolated according to the above general polymerization procedure and analyzed (isol. yield=69%, Mw=62.5 kDa, Đ=1.32).

Synthesis of PMMA-b-PBnMA from Isolated Macroinitiator

BnMA (150 µL, 0.90 mmol, 2000 eq.), a sample of isolated polymer from Table 2, Run No. 11 (150 mg, 4.50 µmol, 10.0 eq.), and 3 (0.23 mg, 0.45 µmol, 1.00 eq.) were dissolved in 0.85 mL DMA and reacted according to the above general polymerization procedure for 12 h. The resulting polymer was isolated according to the above general polymerization procedure and analyzed (isol. yield=81%, Mw=146.5 kDa, Đ=1.57).

General Experimented Procedure for the Polymerization of Methyl Methacrylate Using Acridine-Based Compounds A 20 mL disposable Scintillation vial was charged sequentially with N,N-dimethylacetamide (2 mL), methyl methacrylate (0.8 mL, 0.75 g, 7.5 mmol), photocatalyst (0.1 mol %) under the atmosphere of $N_2$. After the photocatalyst was dissolved, ethyl α-bromophenylacetate (13.1 pL, 0.075 mmol) was introduced. The reaction was vigorously stirred in front of white LEDs. Aliquots were taken and analyzed using $^1H$ NMR to give the molecular weight (Mn) and GPC to give the molecular weight distribution (Mw/Mn) of the polymer.

General Experimental Procedure for the Polymerization of Methyl Methacrylate Using Coronene Polymerizations were performed in a glovebox with a nitrogen atmosphere. A 20 mL vial was loaded with a stir bar and coronene, which was dissolved in solvent, as specified in the polymerization tables. The initiator was added by syringe. This solution was allowed to stir for 1 minute before 1 mL of the monomer was added at which point the timer was started.

General Experimental Procedure for the Polymerization of Methyl Methacrylate Using Perylene Derivatives All polymerization reactions were conducted within a glove box under a Nitrogen atmosphere in 20 nit scintillation vials. To a stirred solution of a photocatalyst in the desired solvent, ethyl α-bromophenylacetate (EBP) followed by Methyl methacrylate (MMA) were added in the amounts specified in the polymerization tables. The scintillation vial was then placed in the centre of a beaker of a 3 In. radius with a double layer of Flex LED strip of the desired wavelength surrounding the vial. The polymerizations were run for 24 hours with 0.1 mL aliquots taken every hour for the first 5 hours and at 24 hours. Each aliquot was quenched in a seal vial containing 0.7 with 250 ppm of BHT. An $^1H$ NMR was taken to track the conversion prior to removing the volatiles and redissolving the residues in THF for GPC analyses.

(g) Computational Details (Examples 1-7)

Standard reduction potentials ($E^0$) were calculated following previously reported procedures (Tossell, 2011, Comput. Theor. Chem. 977:123-127; Winget, et al., 2004, Theor. Chem. Acc. 112:217-227; He, et al., 2010, J. Phys. Chem. C. 114:21474-21481; Zhao & Truhlar, 2008, Theor. Chem. Acc. 120:215-241).

A value of –100.5 kcal/mol was assumed for the reduction free energy of the standard hydrogen electrode (SHE). Thus, $E^0$=(–100.5–$\Delta G_{red}$)/23.06 (V vs. SHE); for $E^0$ ($^3PC^*/PC.^+$), $\Delta G_{red}$=G($^3PC^*$)–G($PC.^+$) while for $E^0$ ($PC.^+/PC$), $\Delta G_{red}$=G(PC)–G($PC.^+$). The Gibbs free energies of $^3PC^*$, $PC.^+$, and PC were calculated at the unrestricted M06/6-31+G** level of theory in CPCM-$H_2O$ solvent. To reference to the Saturated Calomel Electrode (SCE), $E^0$ (vs. SHE) is converted to $E^0$ (vs. SCE) using $E^0$ (vs. SCE)=$E^0$ (vs. SHE)–0.24 V. Triplet energies (in eV) of PCs were obtained by [G($^3PC^*$)–G(PC), in kcal/mol]/23.06.

Population analysis was performed using electrostatic potential-derived charges with the CHELPG method$_8$ performed at the unrestricted M06/6-31G** level of theory in CPCM-$H_2O$ solvent.

Geometry optimization of PC (3,7-Di(4-biphenyl) 1-Naphthalene-10-Phenoxazine) was performed at the unrestricted M06/Lanl2dz level of theory in CPCM-$H_2O$ solvent; the smaller Lanl2dz basis sets was employed for computational efficiency due to its extensive structure. Singlet point calculation at the converged M06/Lanl2dz geometry was then performed at the unrestricted M06/6-31+G** level of theory in CPCM-$H_2O$ solvent.

(h) Experimental Conditions for Example 7

Control Experiments

Control polymerizations revealed negligible or no polymerization in the absence of any of the components pertinent to the O-ATRP system (light, PC, or initiator) or in the presence of oxygen.

General Procedure for O-ATRP of MMA Using a UV Light Source

A 20 mL scintillation vial equipped with a small stirbar was transferred into a nitrogen-atmosphere glove box. To this vial DMA, methyl methacrylate (MMA), photocatalyst from a stock solution in DMA and initiator were added in that order via pipette. The vial was tightly sealed and wrapped in aluminum foil. The vial was transferred out of the glove box, the aluminum foil was removed, then placed under UV irradiation while stirring (FIGS. 26A-26D). Timing of the polymerization started once the vial was placed under irradiation. To analyze the progress of the polymerization at a given time point, aluminum foil was wrapped around the vial, the timer was stopped and the sample was taken back into the glove box where a 0.1 mL aliquot of the reaction was removed via syringe and injected into a vial containing 0.7 mL CDCl$_3$ with 250 ppm butylated hydroxytoluene (BHT) to quench the reaction. The reaction vessel was then transferred back under UV irradiation where the timer was once again started. This aliquot was then analyzed via NMR for conversion. After NMR, the volatiles were removed from the sample, redissolved in THF and passed through a syringe filter for analysis by gel permeation chromatography coupled with multi-angle light scattering.

Monomer Scope

The polymerization of different monomers—BMA, BnMA and DMA—were carried out using the general polymerization conditions described above. A ratio of [1000]:[10]:[1], [monomer]:[initiator]:[catalyst] was used with 9.35 mmol of monomer used in each trial. An equal volume of DMA to monomer was used. After the polymerization was allowed to run for 8 hours an aliquot was taken for analysis of monomer conversion by $^1$H NMR, after which, methanol was immediately added to the reaction mixture to precipitate out the polymer. The resulting solid polymer was filtered then dried and used for analysis by gel permeation chromatography coupled with multi-angle light scattering. The results from these polymerizations are given in Table 12.

General Procedure for Chain Extension of Poly Methyl Methacrylate with Various Monomers by Photocatalyzed O-ATRP Synthesis of PMMA Macroinitiator Catalyst 3 (23.2 mg, 0.0748 mmol, 8 eq.) was dissolved in 8.00 mL DMA and stirred with MMA (8.00 mL, 74.8 mmol, 1000 eq.), and DBMM (143 μL, 0.748 mmol, 10 eq.) in a 20 mL scintillation vial in a nitrogen-filled glove box. The reaction mixture was then wrapped in aluminum foil, removed from the glove box and placed into the aforementioned UV apparatus. The reaction ran for 4 hours before the reaction media was poured into 800 mL of stirring room temperature methanol. The resulting polymer was stirred for an hour before being dissolved in a minimal amount of dichloromethane. The polymer was dissolved with dichloromethane and re-precipitated into stirring methanol a total of three times to remove unreacted monomer, initiator or catalyst (Mn=8.83 kDa, Mw=9.85 kDa, Đ=1.12).

Synthesis of Block Copolymers from Isolated Macroinitiator

Block copolymers were synthesized using a ratio of [1500]:[10]:[1], [monomer]:[initiator]:[catalyst] using 0.100 g of macroinitiator in each trial, and catalyst 3. Each reaction was set up using the same method as the general polymerization procedure described above. The polymerizations were all run for 10 hours before the reaction media was poured into 100 mL of stirring, room temperature methanol. The resulting polymers were collected via vacuum filtration and dried under vacuum. The results from these polymerizations are given in Table 13.

General Procedure for O-ATRP of MMA Using a Visible Light Source

A 20 mL scintillation vial equipped with a small stirbar was transferred into a nitrogen-atmosphere glove box. To this vial DMA, methyl methacrylate (MMA), photocatalyst from a stock solution in DMA and initiator were added in that order via pipette. Timing of the polymerization started once the vial was placed into an LED-lined beaker (FIG. 5). To analyze the progress of the polymerization at a given time point, a 0.1 mL aliquot of the reaction was removed via syringe and injected into a vial containing 0.7 mL CDCl$_3$ with 250 ppm butylated hydroxytoluene (BHT) to quench the reaction. This aliquot was then analyzed via NMR for conversion. After NMR, the volatiles were removed from the sample, redissolved in THF and passed through a syringe filter for analysis by gel permeation chromatography coupled with multi-angle light scattering.

Characterization photoredox properties of certain catalysts in Example 7 are illustrated in FIGS. 30A-30D, 31-32, 33A-33E, 34 and 35A-35B.

In non-limiting examples, the polymerization of methyl methacrylate was demonstrated using the various dyes as organic photocatalysts and ethyl-α-bromophenylacetate as the initiator. The results are illustrated herein.

Figure 16:
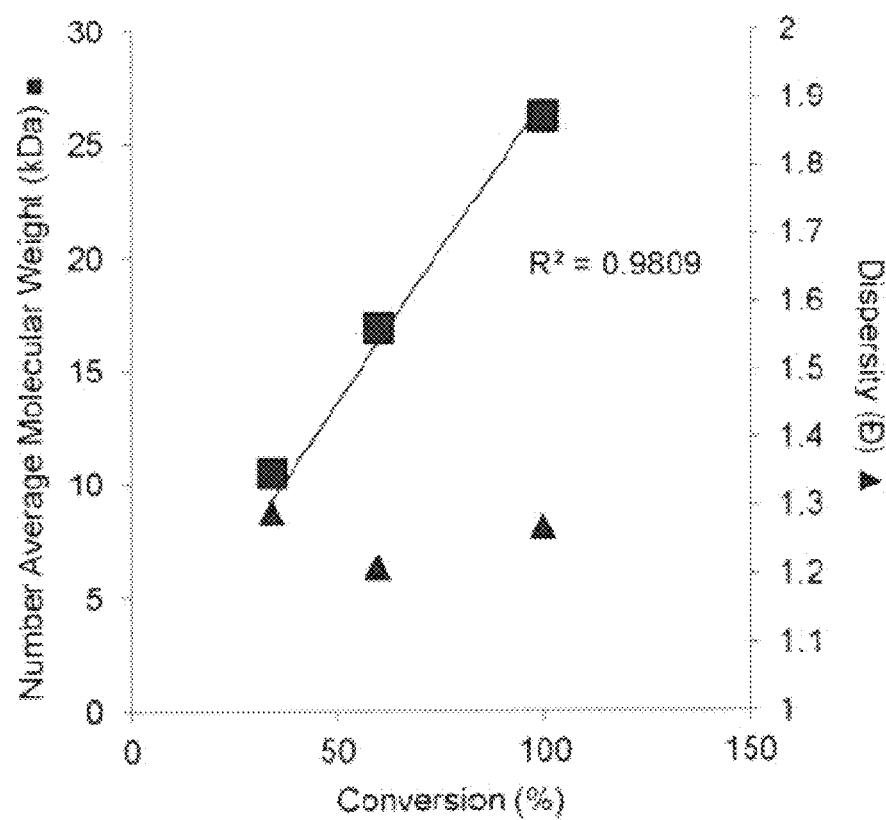
FIG. 16 is a graph illustrating polymer molecular weight and dispersity vs conversion for 3.
Figure 17:
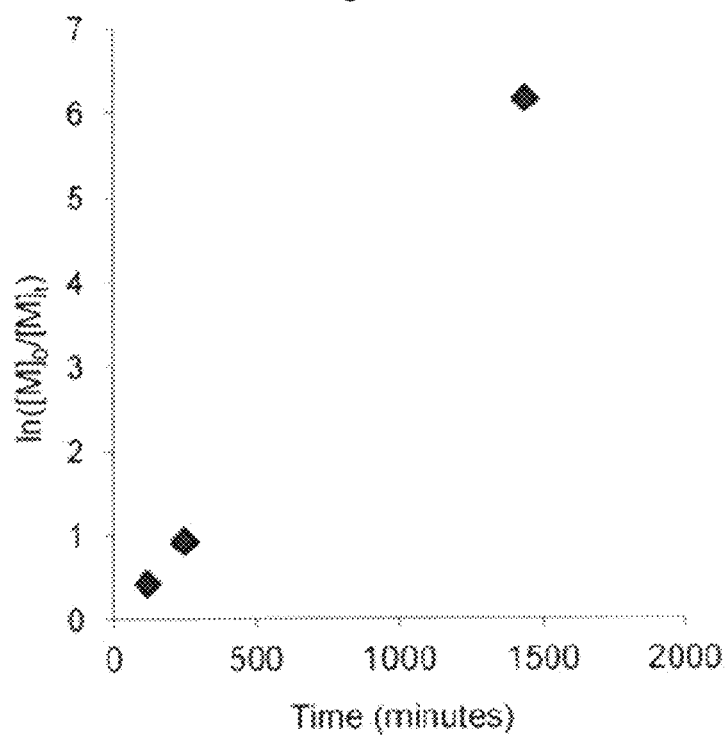
FIG. 17 is a graph illustrating first order kinetic plot of monomer conversion vs time for coronene as a photocatalyst.
Figure 18:
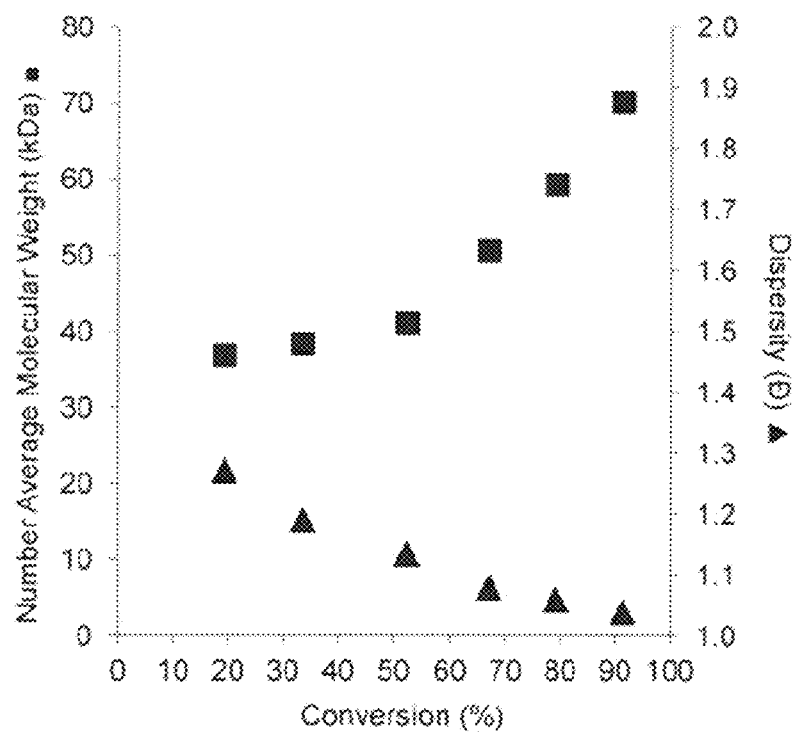
FIGS. 18-19 illustrate experimental results obtained within the invention.
Figure 19:
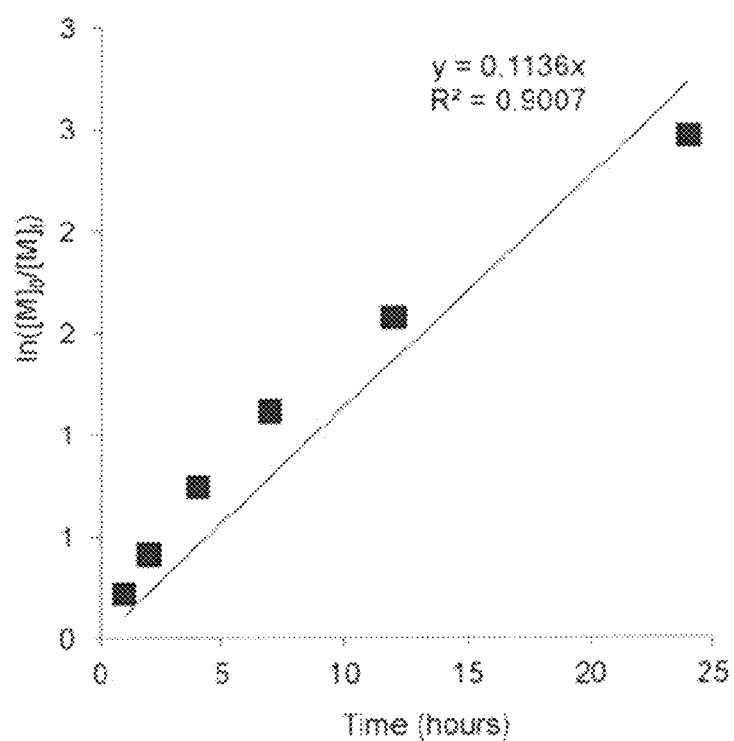
Figure 20A:
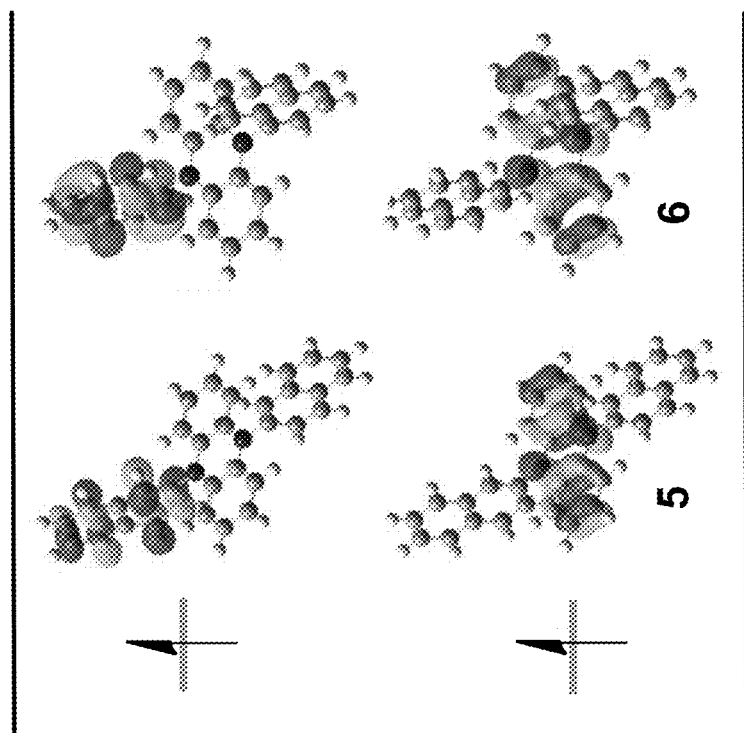
FIG. 20A illustrates (Top) Computed and experimentally measured properties of 5 and 6. (Bottom) Structures of 5, 6, and MBP (methyl 2-bromopropionate).
Figure 20B:
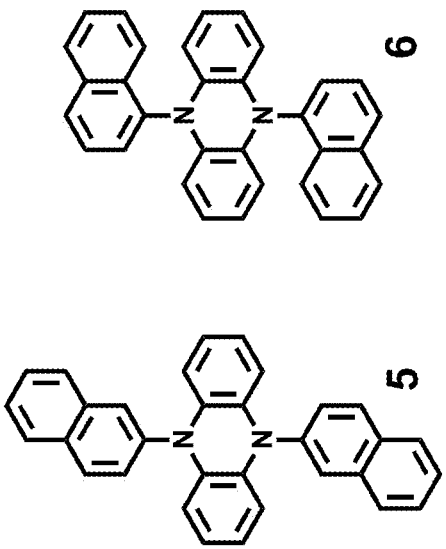
FIG. 20B illustrates triplet state frontier orbitals of 5 and 6. Top figures show the higher-lying SOMO and bottom figures the low-lying SOMO.
Figure 21:
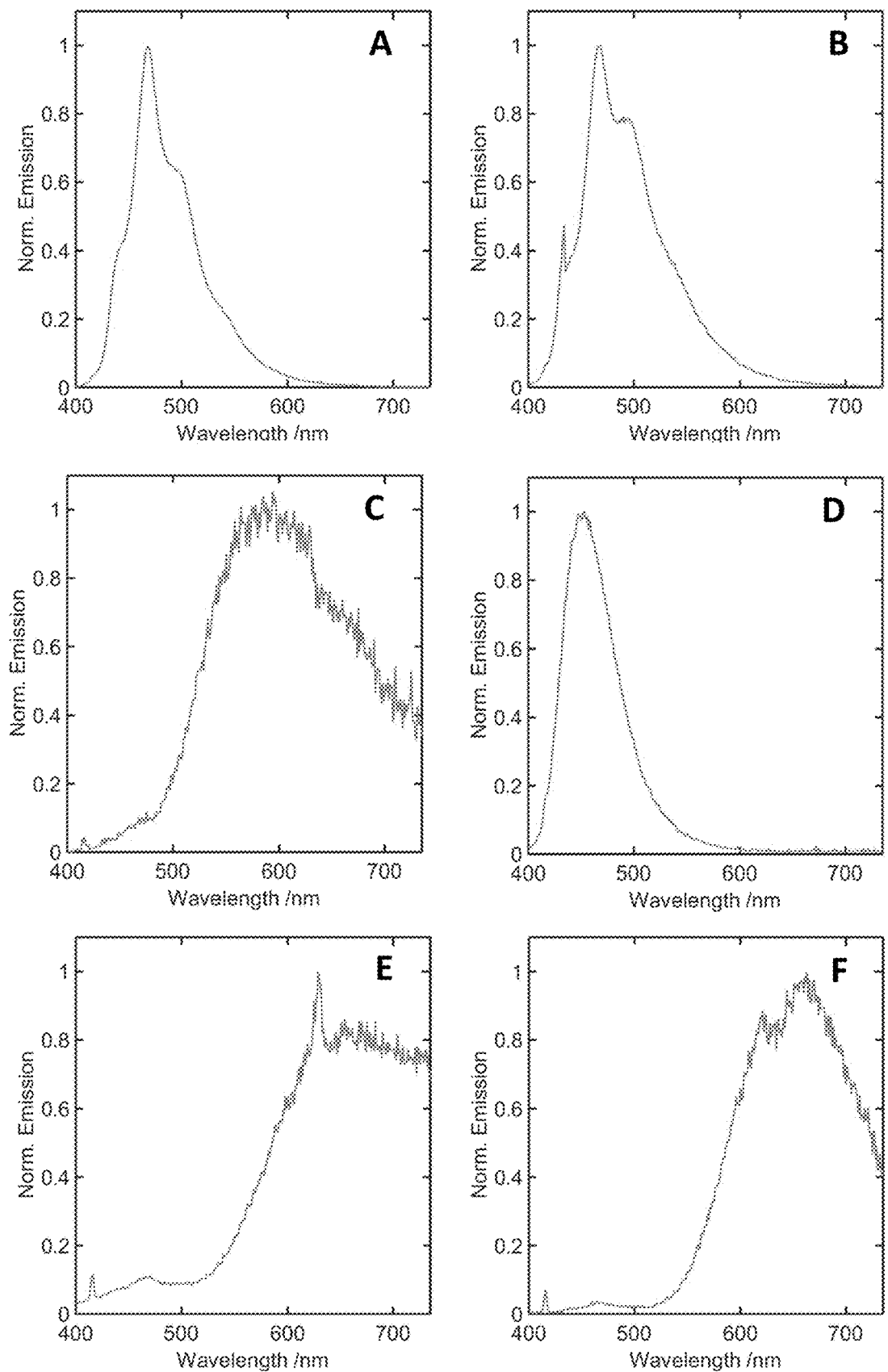
FIG. 21 illustrates emission spectra of catalysts 1 (A), 2 (B), 3 (C), 4 (D), 5 (E), and 6 (F) in DMF.
Figure 22A:
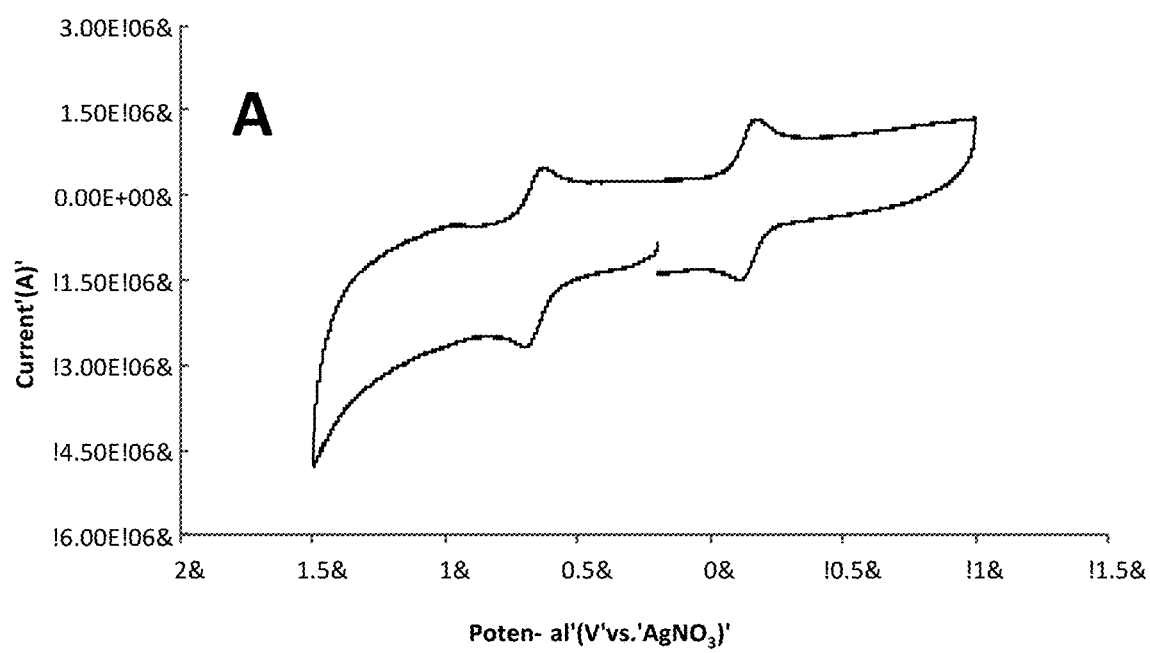
FIGS. 22A-22F illustrate cyclic voltammograms (vs. $Ag/AgNO_3$) of catalysts 1 (FIG. 22A), 2 (FIG. 22B), 3 (FIG. 22C), 4 (FIG. 22D), 5 (FIG. 22E), and 6 (FIG. 22F) in MeCN.
Figure 22B:
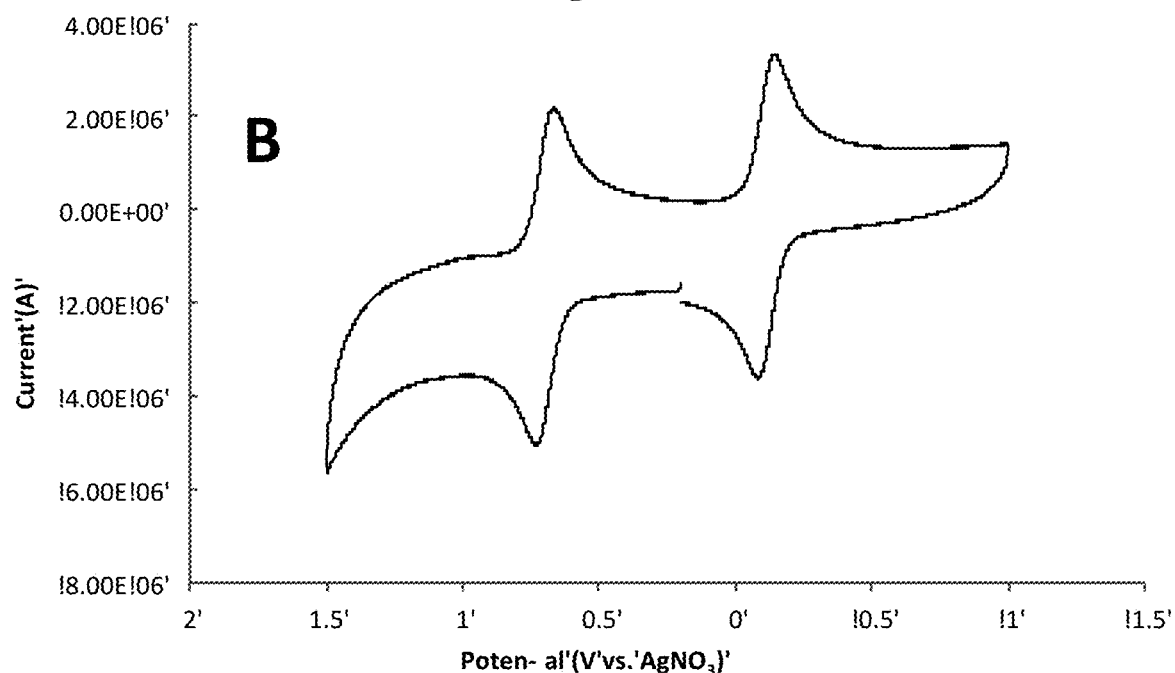
Figure 22C:
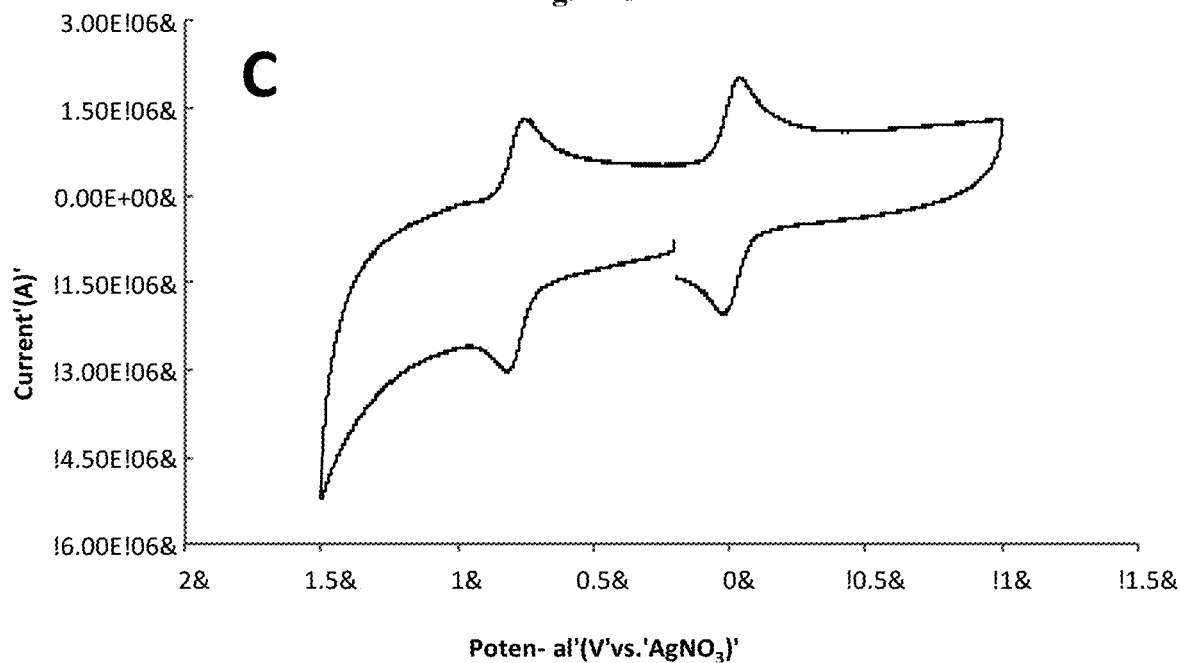
Figure 22D:
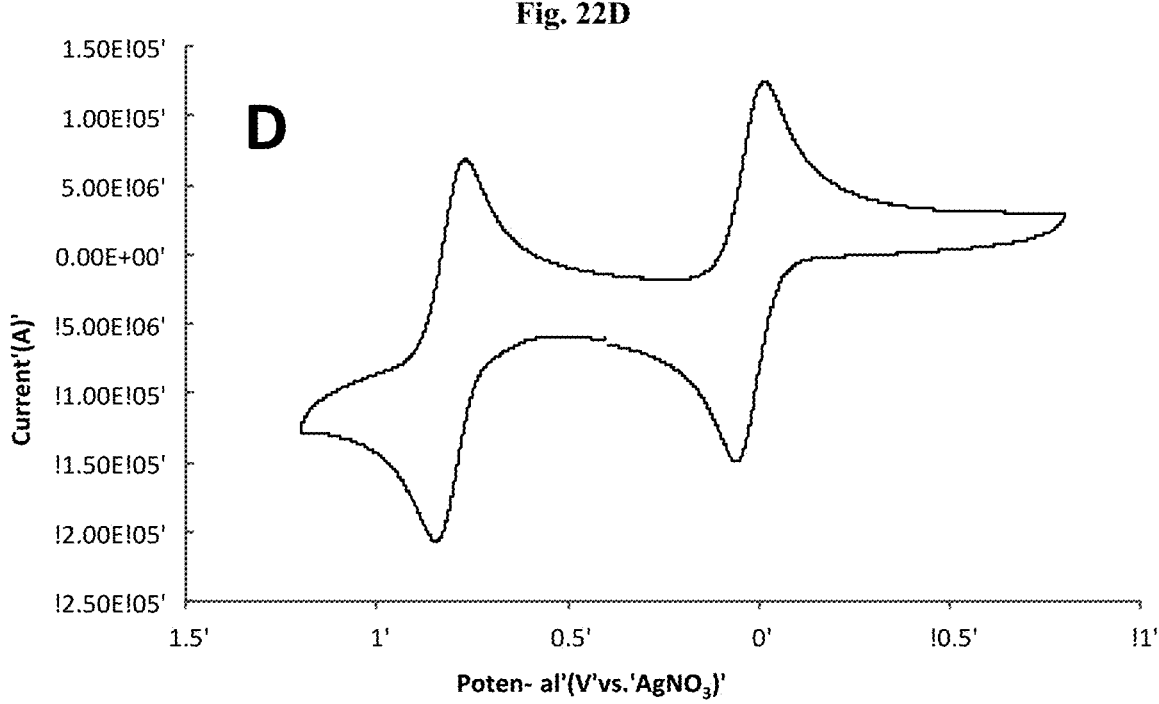
Figure 22E:
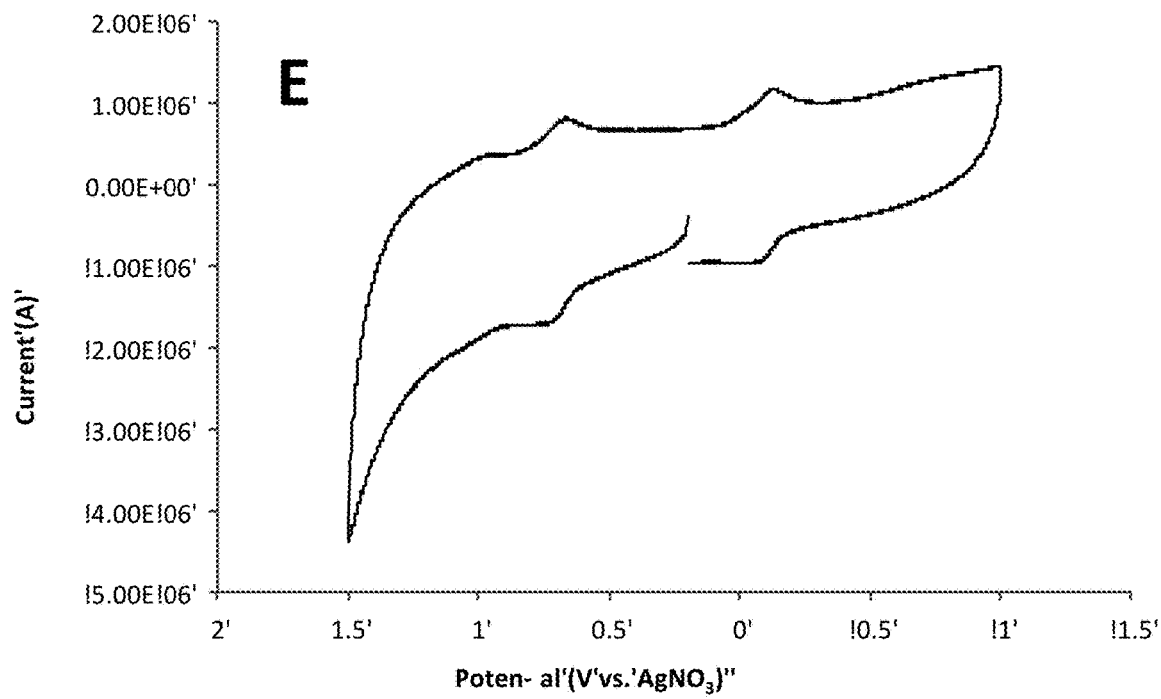
Figure 22F:
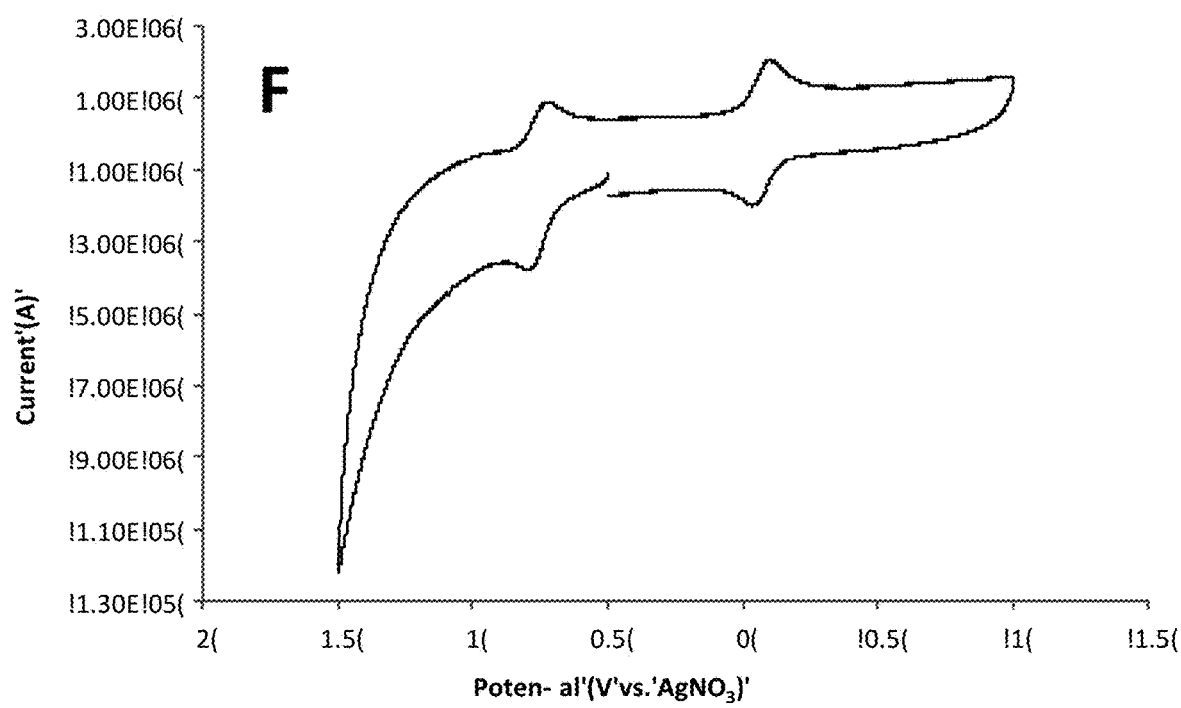

Example 1: Representative Results of the Polymerization of Methyl Methacrylate Using Phenazine Dyes The results are summarized in Tables 1-2. The results represent that these organic molecules can serve as organic photocatalysts that operate through an oxidative quenching pathway in the polymerization of methyl methacrylate. A controlled radical polymerization was mediated by the CN functionalized diphenyl phenazine, as evidenced by the linear increase in polymer molecular weight and constant dispersity as a function of monomer conversion (FIG. 16). A first-order dependence on monomer conversion as a function of time was observed (FIG. 17). The y-intercept of the Mn vs. conversion plot was 3.46 kDa, suggesting an uncontrolled chain-growth period adding ~32 MMA equivalents during the onset of polymerization before precise control is attained; whereas, an ideal polymerization would have a y-intercept, equal to the mass of the initiator (MW of EBP=243 Da).

Example 2: Representative Results of the Polymerization of Methyl Methacrylate to Using Acridine Dyes as Photocatalysts The results are summarized in Table 5.

TABLE 5

Representative Results for the Polymerization of Methyl Methacrylate Acridine Dyes.

| entry | catalyst | light source | solvent | time | conversion (%) | $M_w$ (kDa) | $M_n$ (kDa) | Đ ($M_w/M_n$) | I* |
|---|---|---|---|---|---|---|---|---|---|
| 7 | 5 | white LED | DMAc | 1 h | 17.5 | 50.6 | 23.2 | 1.75 | 7.56 |
| 8 | 6 | white LED | DMaC | 1 h | 10.5 | 62.9 | 41.8 | 1.51 | 8.87 |
| 9 | 7 | white LED | DMAc | 1 h | 17.2 | 21.6 | 11.1 | 1.94 | 15.5 |
| 10 | 8 | 365 nm | DMAc | 1 h | 5.4 | 12.7 | 7.7 | 1.70 | 5.40 |

TABLE 5-continued

Representative Results for the Polymerization of Methyl Methacrylate Acridine Dyes.

| entry | catalyst | light source | solvent | time | conversion (%) | $M_w$ (kDa) | $M_n$ (kDa) | Đ ($M_w/M_n$) | I* |
|---|---|---|---|---|---|---|---|---|---|
| 11 | 9 | 365 nm | DMAc | 1 h | 60.0 | 20.4 | 16.8 | 1.21 | 35.7 |
| 12 | 10 | 365 nm | DMAc | 1 h | 29.9 | 31.3 | 15.4 | 2.00 | 19.4 |
| 13 | 11 | 365 nm | DMAc | 1 h | 15.9 | 21.6 | 11.2 | 1.60 | 14.3 |

Conversion measured by $^1$H NMR. Molecular weight and dispersity measured by gel-permeation chromatography coupled with a light-scattering detector. Initiator efficiency (/*) = theoretical molecular weight/experimental number average molecular weight * 100.

Example 3 Representative Results of the Polymerization of Methyl Methacrylate Using Coronene The results are summarized in Table 6.

TABLE 6

Representative Results for the Polymerization of Methyl Methacrylate Using Coronene as a Phototocatalyst.

| entry | light source | solvent | solvent volume (mL) | time | conversion (%) | $M_w$ (kDa) | $M_n$ (kDa) | Đ ($M_w/M_n$) | I* |
|---|---|---|---|---|---|---|---|---|---|
| 14 | white LED | DMAc | 4 | 1 h | 19.5 | 47 | 37 | 1.27 | 5.4 |
| 14 | white LED | DMAc | 4 | 2 h | 33.7 | 46 | 38 | 1.19 | 9.0 |
| 14 | white LED | DMAc | 4 | 4 h | 52.4 | 47 | 41 | 1.13 | 13.1 |
| 14 | white LED | DMAc | 4 | 7 h | 67.2 | 55 | 51 | 1.08 | 13.6 |
| 14 | white LED | DMAc | 4 | 12 h | 79.2 | 63 | 59 | 1.06 | 13.7 |
| 14 | white LED | DMAc | 4 | 24 h | 91.5 | 73 | 70 | 1.04 | 13.4 |

Ratio: [MMA]:[EBP]:[coronene] = 1000:10:4; 1.0 ml MMA. Conversion measured by $^1$H NMR. Molecular weight and dispersity measured by gel-permeation chromatography coupled with a light-scattering detector. Initiator efficiency (/*) = theoretical molecular weight/experimental number average molecular weight * 100.

Example 4: Representative Results of the Polymerization of Methyl Methacrylate Using Perylene Dyes The results are summarized in Table 7.

TABLE 7

Representative Results for the Polymerization of Methyl Methacrylate Using Perylene Dyes as Phototocatalysts.

| entry | Catalyst | light source | solvent | time | conversion (%) | $M_w$ (kDa) | $M_n$ (kDa) | Đ ($M_w/M_n$) | I* |
|---|---|---|---|---|---|---|---|---|---|
| 15 | 12B | violet LED | DMAc | 2 h | 20.3 | 14.9 | 10.6 | 1.4 | 19.2 |
| 16 | 12D | violet LED | DMAc | 2 h | 17.4 | 19.9 | 13.4 | 1.50 | 13.0 |
| 17 | 12E | violet LED | DMAc | 2 h | 20.9 | 27.9 | 10.9 | 2.60 | 19.21 |
| 18 | 12G | violet LED | DMAc | 2 h | 10.2 | 209 | 97.4 | 2.15 | 1.04 |
| 19 | 12F | violet LED | DMAc | 2 h | 29.8 | 60.5 | 24.8 | 2.40 | 12.0 |
| 20 | 12A | violet LED | DMAc | 2 h | 20.8 | 16.4 | 9.3 | 1.60 | 19.5 |

Conversion measured by $^1$H NMR. Molecular weight and dispersity measured by gel-permeation chromatography coupled with a light-scattering detector. Initiator efficiency (I*) = theoretical molecular weight/experimental number average molecular weight * 100.

Example 5

Polymerization data, including information for PCs 1, 2, 4, and 5, and an initiator screen for PCs 3 and 6. Polymerizations were performed according to the above general polymerization procedure using 9.35 mmol (1000 eq.) monomer, 9.35 µmol (1 eq.) catalyst, and 93.5 µmol initiator.

| Run No. | PC | Initiator | DMA | Time (h) | Conv. (%) | $M_w$ | $M_n$ | Đ ($M_n/M_w$) | I* |
|---|---|---|---|---|---|---|---|---|---|
| S1  | 1 | EBP    | 1 mL | 8 | 69.6 | 36.3 | 24.7 | 1.47 | 29.2 |
| S2  | 2 | EBP    | 1 mL | 8 | 85.9 | 18.4 | 11.9 | 1.55 | 74.5 |
| S3  | 4 | EBP    | 1 mL | 8 | 73.5 | 21.4 | 16.1 | 1.33 | 47.2 |
| S4  | 4 | EBP    | 1 mL | 7 | 36.7 | 9.63 | 7.47 | 1.29 | 52.5 |
| S5  | 3 | MBriB  | 1 mL | 8 | 94.0 | 18.8 | 15.0 | 1.25 | 63.5 |
| S6  | 3 | MBP    | 1 mL | 8 | 86.0 | 9.80 | 7.37 | 1.33 | 118  |
| S7  | 3 | EClP   | 1 mL | 4 | 96.0 | 21.9 | 8.62 | 2.54 | 111  |
| S8  | 5 | EBP    | 1 mL | 5 | 39.4 | 9.35 | 9.08 | 1.03 | 46.1 |
| S9  | 6 | EBP    | 1 mL | 5 | 54.1 | 12.3 | 11.4 | 1.08 | 47.5 |
| S10 | 6 | BrPN   | 2 mL | 8 | 73.3 | 15.8 | 12.8 | 1.24 | 58.1 |
| S11 | 6 | EClP   | 2 mL | 8 | 93.7 | 24.3 | 18.0 | 1.35 | 53.2 |
| S12 | 6 | MBriB  | 2 mL | 8 | 90.2 | 14.4 | 10.7 | 1.35 | 85.9 |

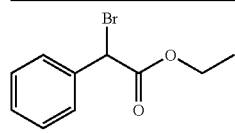

EBP

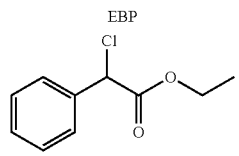

ECP

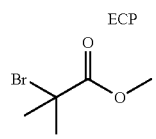

MBriB

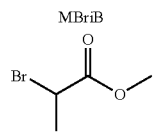

MBP

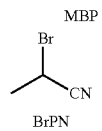

BrPN

Example 6

Monomer scope of catalysts 3 and 6. Polymerizations were performed according to the above general polymerization procedure using 9.35 mmol (1000 eq.) monomer, 9.35 µmol (1 eq.) catalyst, 93.5 µmol initiator, and 1.00 mL DMA.

| Run No. | PC | Monomer | Initiator | Conv. (%) | $M_w$ | $M_n$ | Đ ($M_n/M_w$) | I* |
|---|---|---|---|---|---|---|---|---|
| S13 | 3 | TMSHEMA | EBP | 83.3 | 25.3 | 20.0 | 1.26 | 85.5 |
| S14 | 3 | TFEMA   | EBP | 77.4 | 58.2 | 54.7 | 1.06 | 24.2 |
| S15 | 3 | DEGMA   | EBP | 94.7 | 30.1 | 21.3 | 1.41 | 84.6 |
| S16 | 3 | BA      | EBP | 98.5 | 26.6 | 16.4 | 1.62 | 60.0 |
| S17 | 3 | St      | EBP | 0.0  | n/a  | n/a  | n/a  | n/a  |
| S18 | 3 | VA      | EBP | 0.0  | n/a  | n/a  | n/a  | n/a  |
| S19 | 3 | AN      | EBP | 71.3 | 40.3* | 23.7* | 1.70 | 15.6 |
| S20 | 6 | TMSHEMA | MBP | 90.8 | 18.7 | 16.0 | 1.17 | 116  |
| S21 | 6 | TFEMA   | MBP | 79.4 | 53.9 | 32.9 | 1.64 | 41.3 |
| S22 | 6 | DEGMA   | MBP | 92.6 | 22.8 | 18.4 | 1.24 | 96.0 |
| S23 | 6 | BA      | MBP | 99.9 | 30.1 | 21.2 | 1.42 | 60.3 |
| S24 | 6 | BnMA    | MBP | 96.6 | 53.4 | 43.1 | 1.24 | 79.0 |

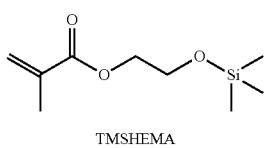

TMSHEMA

| Run No. | PC | Monomer | Initiator | Conv. (%) | $M_w$ | $M_n$ | Đ ($M_n$/$M_w$) | I* |
|---|---|---|---|---|---|---|---|---|

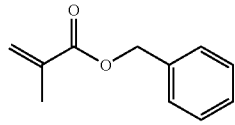

BnMA

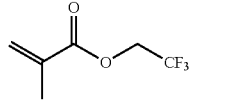

TFEMA

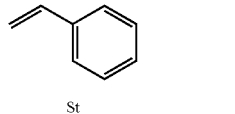

St

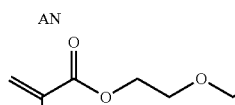

AN

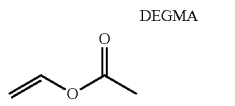

DEGMA

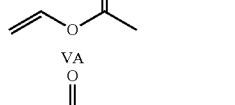

VA

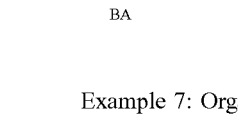

BA

Example 7: Organocatalyzed Atom Transfer Radical Polymerization Using N-Aryl Phenoxazines as Photoredox Catalysts Although controlled radical polymerizations exist that are mediated by organic catalysts and which thus entirely circumvent the issue of metal contamination, organic catalysts capable of mediating an organocatalyzed ATRP (O-ATRP) are limited because of the required significant reducing power required to reduce alkyl bromides commonly used for ATRP (~−0.6 to −0.8 V vs SCE).

Figure 23A:
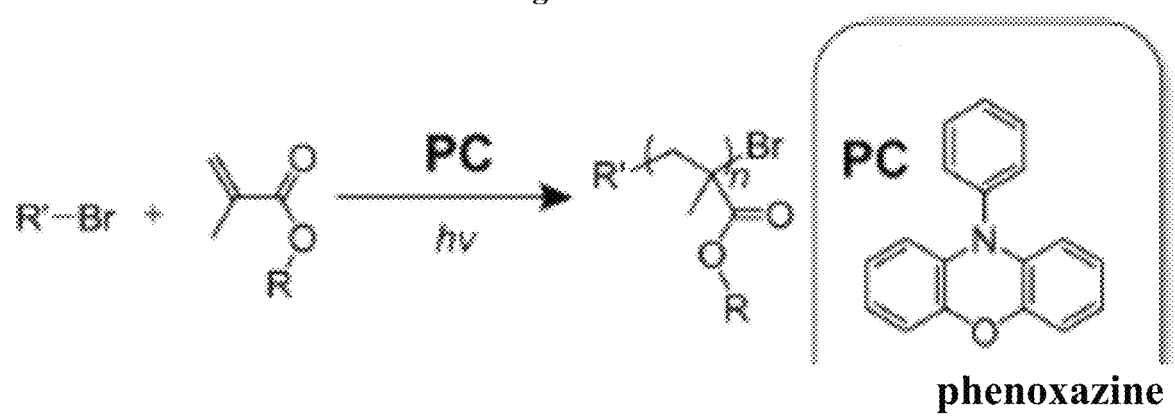
FIG. 23A illustrates O-ATRP mediated by organic PCs using alkyl bromide initiators and aryl phenoxazines.
Figure 23B:
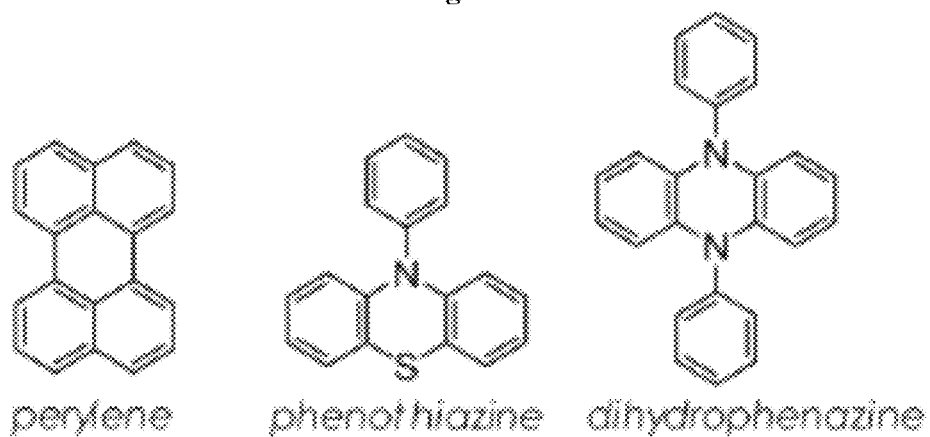
FIG. 23B illustrates additional organic PCs.
Figure 23C:
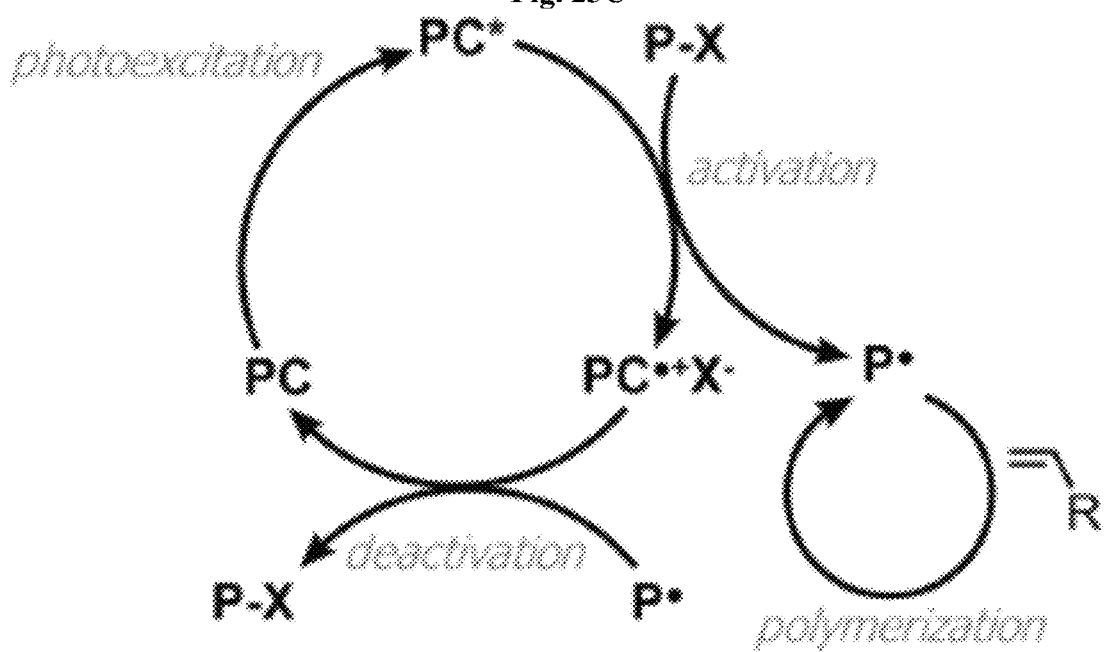
FIG. 23C illustrates non-limiting general photoredox catalytic cycle of O-ATRP.

Photoredox catalysis presents a strategy to drive chemical transformations under mild conditions through the generation of reactive open-shell catalysts via photoexcitation. However, most photoredox catalysts (PCs) do not possess the reducing power to directly reduce an alkyl bromide through an outer sphere electron transfer mechanism. Strongly reducing organic catalysts, including perylene, N-aryl phenothiazines, and N,N-diaryl dihydrophenazines have been demonstrated as organic PCs capable of mediating O-ATRP (FIGS. 23A-23C). Continued progress in this field is required to further understand the mechanism of this polymerization to realize even more efficient PCs and access a broader application landscape.

A proposed general photoredox O-ATRP mechanism involves photoexcitation of the PC to an excited state PC (PC*) that is capable of reducing alkyl bromides via an oxidative quenching pathway to generate the active radical for polymerization propagation, while yielding the radical cation PC (PC.$^+$) and Br$^-$ ion pair complex, PC.$^+$Br$^-$ (FIG. 23C). Efficient deactivation is important to the production of well-defined polymers. Deactivation requires the PC.$^+$Br$^-$ complex to be sufficiently oxidizing relative to the propagating radical to regenerate the alkyl bromide and ground state PC; subsequent photoexcitation of the PC reinitiates the catalytic cycle. The present studies demonstrate that N-aryl phenoxazines are a new class of PCs for O-ATRP, producing well-defined polymers with low dispersities. The present studies provide a visible light phenoxazine PC that produces polymers with Đ ranging from 1.13 to 1.31 over a range of polymer MWs while achieving quantitative initiator efficiency (I*).

In certain embodiments, photoexcitation of the PC delivers—through intersystem crossing (ISC) from the singlet excited state PC ($^1$PC*)—a triplet excited state PC ($^3$PC*), which is responsible for the alkyl bromide reduction. In other embodiments, the photoexcited species possesses a sufficiently long lifetime for photoredox catalysis.

Reported elsewhere herein are strong excited state reduction potentials ($E^{0*}=E^0(^2PC.^+/PC*)$) of N,N-diaryl dihydrophenazines and N-aryl phenothiazines (~−2 V vs SCE), which are even more reducing than commonly used metal PCs, such as fac-Ir(ppy)$_3$ (~1.73 V vs SCE). In certain embodiments, N-aryl phenoxazines are also a class of organic PCs for O-ATRP.

DFT calculations predict that N-aryl phenoxazines possess similarly strong $E^{0*}$s (~−2 V vs. SCE) in their lowest lying triplet excited state as dihydrophenazines and phenothiazines. Although dihydrophenazines are stronger excited state reductants, the radical cations of phenoxazines and phenothiazines [$E^0(^2PC.^+/PC)$=~−0.5 V vs SCE] are more oxidizing than those of dihydrophenazines [$E^0(^2PC.^+/PC)$=~−0.0 V vs SCE]; all three classes of PCs possess an oxidation potential capable of deactivating the propagating radical (e.g. ~−0.8 V vs SCE for methyl methacrylate), as required for a successful O-ATRP. Lastly, the phosphorescence quantum yield of 10-phenylphenoxazine (1) at 77 K is 94% with a lifetime as long as 2.3 seconds. These properties highlight the efficient ISC to the triplet manifold and slow non-radiative decay attributed to small Franck-Condon vibrational overlap factors between $^3$PC* and the ground state.

Figure 24:
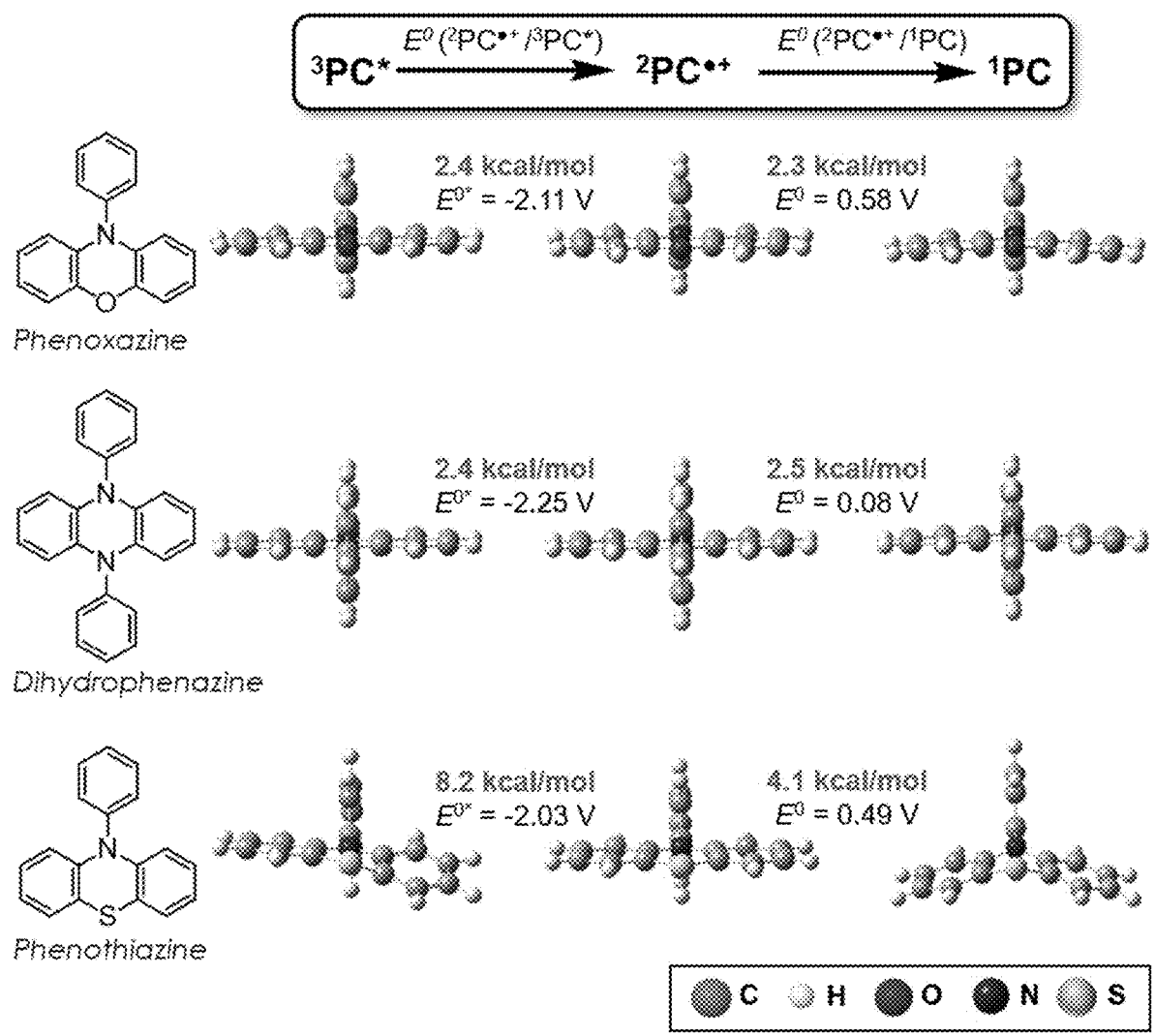
FIG. 24 illustrates geometric reorganization energies and reduction potentials (vs SCE) for 10-phenylphenoxazine, diphenyl dihydrophenazine, and 10-phenylphenothiazine (bottom) transitioning from the $^3PC^*$ to $^2PC.^+$ to $^1PC$ species involved in an illustrative mechanism for photoredox O-ATRP.

The analysis of exchanging the sulfur in phenothiazines with the oxygen in phenoxazines identified several distinct phenomena that alter the physical properties of these molecules and which manifest in improvements in PC performance for O-ATRP, qualitatively assessed through analysis of the polymer product. One distinction between these two systems is the conformation of their heterocyclic rings. The smaller van der Waals radius of oxygen (1.52 Å) relative to sulfur (1.80 Å) permits the ground state phenoxazine (e.g. PC 1) to access a planar geometry similarly to dihydrophenazines (nitrogen, 1.55 Å). In contrast, phenothiazine adopts a bent boat conformation in its ground state, observable in crystal structures and predicted by the presently performed computations (FIG. 24). However, upon oxidation to the radical cation state $^2$PC.$^+$, all three PCs adopt a planar conformation.

The consequences of phenothiazine adopting bent conformations in the ground and triplet states, but a planar geometry in the radical cation state, introduce larger structural reorganizations during electron transfer (ET) as compared to the isoelectronic, but consistently planar, phenoxazines and dihydrophenazines. A structural reorganization penalty associated with oxidation of the bent 10-phenylphenothiazine triplet state to the planar radical cation was calculated to be 8.2 kcal/mol. In contrast, the triplet and radical cation states of 1 are both planar—analogous to diaryl dihydrophenazines—which results in a lower reorganization energy of only 2.4 kcal/mol. As phenoxazine, dihydrophenazine, and phenothiazine derivatives possess similar E's (−2.20 V, −2.34 V, and −2.10 V, respectively), a kinetically faster activation (reduction of the alkyl bromide) in O-ATRP by phenoxazines and dihydrophenazines is expected because of their lower reorganization energies for ET.

Polymerization deactivation involves reduction of the planar phenylphenothiazine radical cation to regenerate the bent ground state. A reorganization energy for this ET was calculated as being 4.1 kcal/mol. For 1 or diphenyl dihydrophenazine, the same reduction process requires lower reorganization energies of 2.3 or 2.5 kcal/mol, respectively consistent with the conservation of the planarity of the cation radical and ground states. Given the similar ground state oxidation potentials for the phenoxazine and phenothiazine (0.50 and 0.43 V), the radical cation of 1 is likely kinetically faster in deactivation, which imparts better control in O-ATRP (vide infra).

Figure 25A:
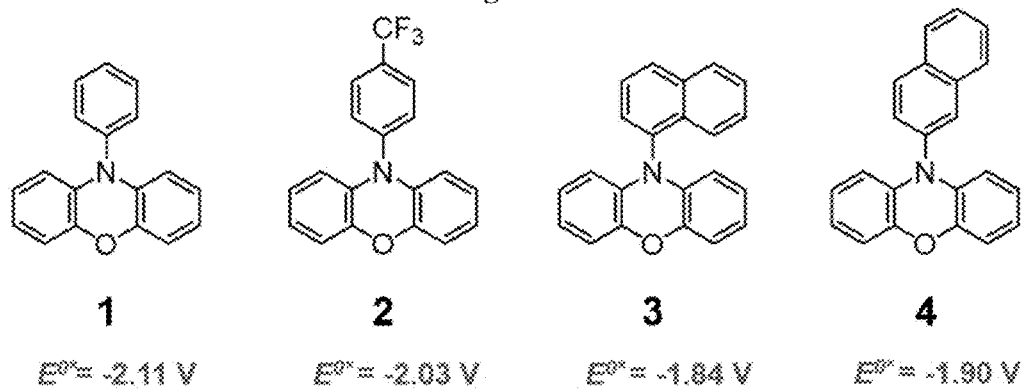
FIG. 25A illustrates N-aryl phenoxazines along with computed triplet state reduction potentials.
Figure 25B:
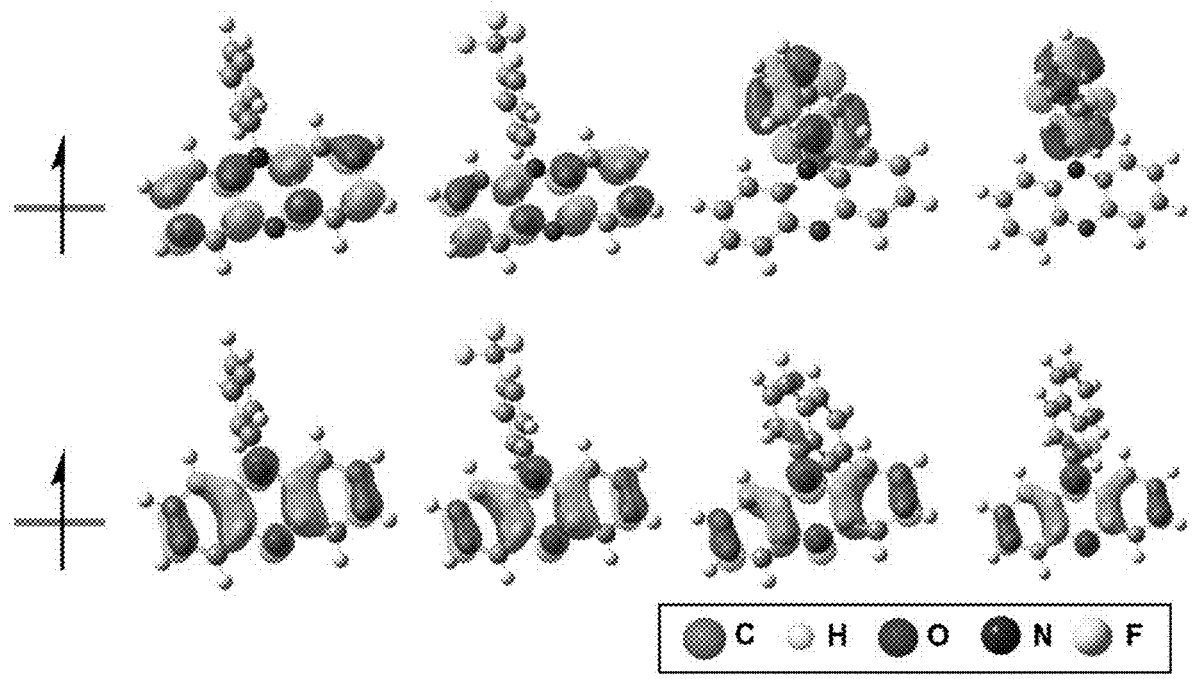
FIG. 25B illustrates computed triplet state SOMOs of phenoxazine derivatives.

Studies described elsewhere herein revealed that PCs with spatially separated singly occupied molecular orbitals (SOMOs) in their $^3$PC* state yielded PCs with superior performance in O-ATRP in regards to achieving the highest I* and producing polymers with the lowest Đ. As such, strongly reducing N-aryl phenoxazines with spatially separated SOMOs (with the lower lying SOMO localized on the phenoxazine core and the higher lying SOMO localized on the aryl substituent) and localized SOMOs (with both SOMOs localized on the phenoxazine core) were investigated to evaluate their performance as O-ATRP PCs and determine if this concept extends to phenoxazines (FIGS. 25A-25B).

In the cases of diphenyl dihydrophenazine and 1, it was calculated that neither exhibits spatially separated SOMOs. In contrast, incorporation of electron withdrawing trifluoromethyl functionalization on the para position of the N-phenyl substituents of the dihydrophenazine yielded spatially separated SOMOs whereas this substitution on phenoxazine (2) results in both SOMOs localized on the phenoxazine core. However, for both dihydrophenazines and phenoxazines, N-aryl functionalization(s) with 1- or 2-naphthalene yielded molecules with spatially separated SOMOs, and thus predicted intramolecular charge transfer from the heterocyclic ring to the naphthalene substituent upon photoexcitation and subsequent intersystem crossing to the triplet state.

All four phenoxazine derivatives were synthesized through C—N cross-couplings from commercially available reagents and employed in the polymerization of MMA. A screen of common ATRP alkyl bromide initiators revealed that diethyl 2-bromo-2-methylmalonate (DBMM) served as the superior initiator to produce polymers with the lowest Đ while achieving the highest I* (Table 14). To evaluate the PCs, polymerizations using DBMM as the initiator were conducted in dimethylacetamide and irradiated with a 365 nm UV nail curing lamp (54 watts) (Table 8). In accord with diaryl dihydrophenazines, N-aryl phenoxazines possessing localized SOMOs (PCs 1 and 2) did not perform as well as the PCs with separated SOMOs (PCs 3 and 4). Specifically, 1 and 2 produced poly(methyl methacrylate) (PMMA) with a relatively high Đ of 1.48 and 1.45, respectively (runs 1 and 2). Polymerization results with PCs 3 and 4 were superior, and produced PMMA with lower dispersities (Đ=1.22 and 1.11, respectively) while achieving high I*s of 92.6 and 77.3%, respectively (runs 3 and 4).

TABLE 8

Results of the O-ATRP of MMA using PCs 1 through 4.[a]

| Run No. | PC | Conv. (%) | $M_w$ (kDa) | $M_n$ (kDa) | Dispersity (Đ) | I* (%) |
|---|---|---|---|---|---|---|
| 1 | 1 | 95.6 | 10.6 | 7.2 | 1.48 | 137 |
| 2 | 2 | 55.3 | 9.5 | 6.5 | 1.45 | 85.5 |
| 3 | 3 | 78.8 | 10.8 | 8.8 | 1.22 | 92.6 |
| 4 | 4 | 80.2 | 11.9 | 10.8 | 1.11 | 77.3 |

[a][MMA]:[DBMM]:[PC] = [1000]:[10]:[1]; 9.35 μmoles PC, 1.00 mL dimethylacetamide, and irradiated with a 54 watt 365 nm light source for 8 hours.

Further, molecular weight control could be obtained using either PC through modulation of the monomer (runs 5 to 9 for PC 3; runs 13 to 17 for PC 4) or initiator (runs 10 to 12 for PC 3; runs 18 to 20 for PC 4) ratios (Table 9). Overall, PC 3 produced PMMA through higher I* (~80-100%) while PC 4 produced PMMA with lower Đ (as low as 1.07). This 1-naphthalene versus 2-naphthalene substitution effect influencing high I* or low Đ, respectively was also observed with diaryl dihydrophenazines.

Figure 26:
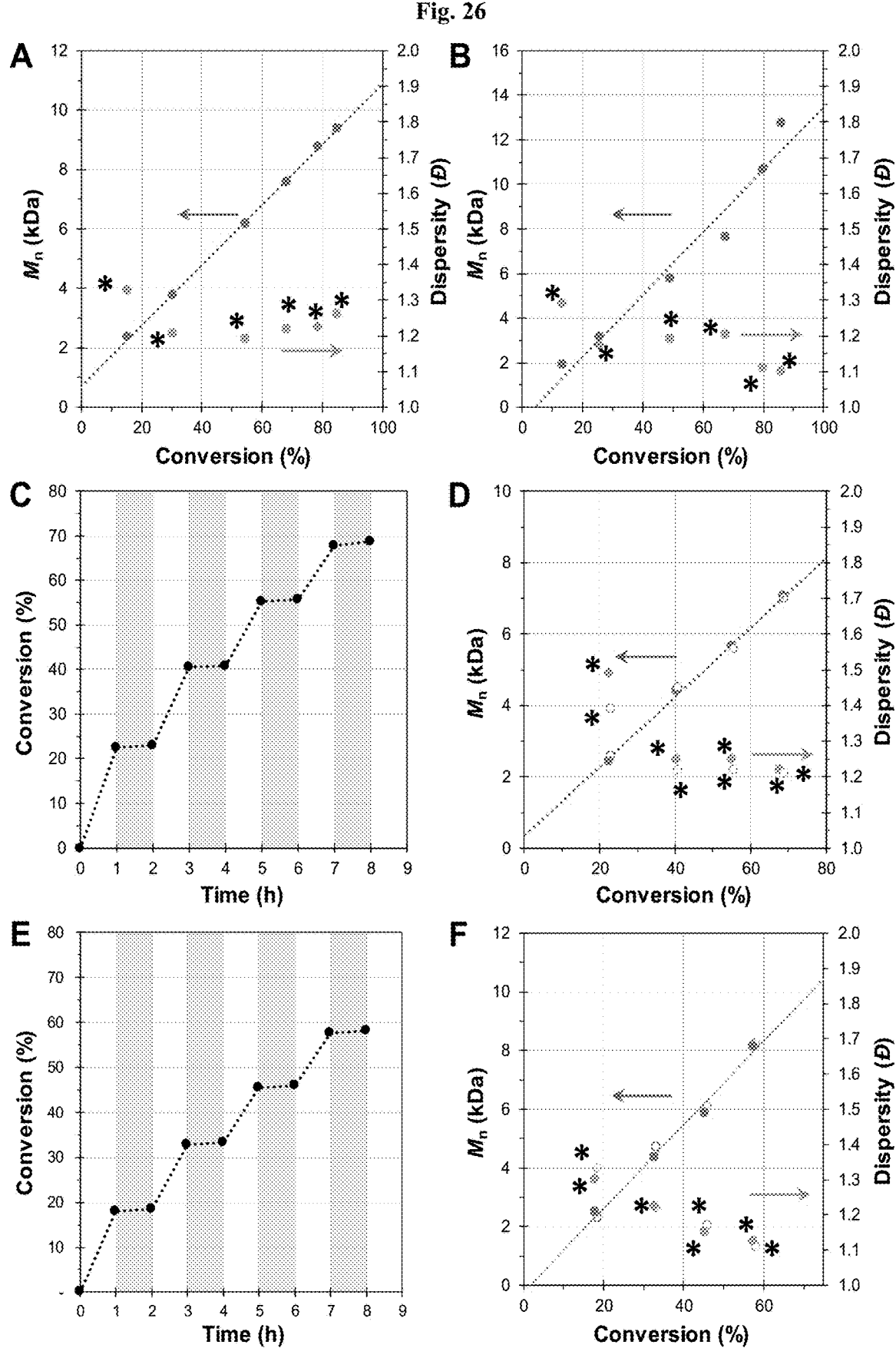
FIG. 26, which relates to Example 7, illustrates plots of molecular weight ($M_n$, blue) and dispersity (Ð, orange) as a function of monomer conversion for the polymerization of MMA catalyzed by 3 (Panel A) and 4 (Panel B). Plots of conversion vs time using 3 (Panel C) or 4 (Panel E) (irradiation in white and dark periods in gray) and plots of molecular weight ($M_n$, blue) and dispersity (Ð, orange; marked as "*") as a function of MMA conversion using a pulsed-irradiation sequence and PC 3 (Panel D) or 4 (Panel F) (filled markers are data directly after irradiation while open markers are data directly after the dark period). Conditions for all plots: [MMA]:[DBMM]:[PC]=[1000]:[10]:[1]; 9.35 µmoles PC, 1.00 mL dimethylacetamide, and irradiated with UV-light.

Our analysis of the polymerization of MMA by 3 and 4 showed that both PCs imparted control over the polymerization that is becoming expected from O-ATRP. Specifically, a linear growth in polymer molecular weight as well as a low dispersity during the course of polymerization was attained (FIG. 26, Panels A-B). Additionally, temporal control was demonstrated using a pulsed irradiation sequence (FIG. 26, Panels C-F). Monomer conversion was only observed during irradiation, which resulted in a linear increase in number-average MW (Me) while producing PMMA with low Đ.

TABLE 9

Results of the O-ATRP of MMA using PCs 3 and 4.

| Run No. | PC | [MMA]:[DBMM]:[PC] | Conversion (%) | $M_w$ (kDa) | $M_n$ (kDa) | Dispersity (Đ) | I* (%) |
|---|---|---|---|---|---|---|---|
| 5 | 3 | [500]:[10]:[1] | 80.8 | 5.8 | 4.9 | 1.16 | 86.1 |
| 6 | 3 | [1000]:[10]:[1] | 78.8 | 10.8 | 8.8 | 1.22 | 92.6 |
| 7 | 3 | [1500]:[10]:[1] | 72.2 | 11.4 | 9.5 | 1.19 | 116 |
| 8 | 3 | [2000]:[10]:[1] | 76.5 | 18.4 | 14.6 | 1.26 | 107 |
| 9 | 3 | [2500]:[10]:[1] | 78.4 | 25.9 | 19.8 | 1.31 | 101 |
| 10 | 3 | [1000]:[5]:[1] | 74.6 | 26.4 | 19.1 | 1.38 | 79.6 |
| 11 | 3 | [1000]:[15]:[1] | 74.5 | 8.3 | 6.9 | 1.20 | 75.7 |
| 12 | 3 | [1000]:[20]:[1] | 80.7 | 5.5 | 4.6 | 1.19 | 92.9 |
| 13 | 4 | [500]:[10]:[1] | 85.1 | 5.9 | 5.4 | 1.09 | 84.1 |

TABLE 9-continued

Results of the O-ATRP of MMA using PCs 3 and 4.

| Run No. | PC | [MMA]:[DBMM]:[PC] | Conversion (%) | $M_w$ (kDa) | $M_n$ (kDa) | Dispersity (Đ) | I* (%) |
|---|---|---|---|---|---|---|---|
| 14 | 4 | [1000]:[10]:[1] | 80.2 | 11.9 | 10.7 | 1.11 | 77.3 |
| 15 | 4 | [1500]:[10]:[1] | 68.9 | 12.2 | 9.8 | 1.25 | 109 |
| 16 | 4 | [2000]:[10]:[1] | 58.2 | 14.7 | 112.5 | 1.17 | 95.2 |
| 17 | 4 | [2500]:[10]:[1] | 65.9 | 21.2 | 17.3 | 1.23 | 96.6 |
| 18 | 4 | [1000]:[5]:[1] | 70.5 | 22.3 | 16.8 | 1.35 | 85.3 |
| 19 | 4 | [1000]:[15]:[1] | 70.9 | 9.3 | 8.3 | 1.12 | 60.6 |
| 20 | 4 | [1000]:[20]:[1] | 76.1 | 6.8 | 6.1 | 1.07 | 64.0 |

Figure 27:
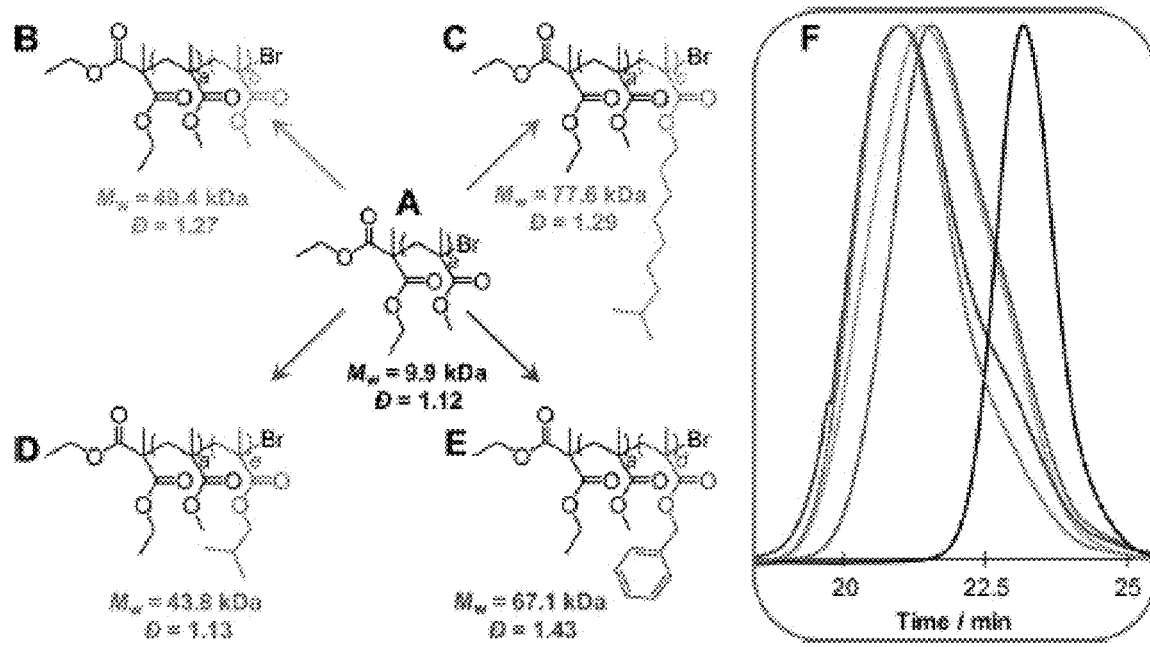
FIG. 27, which relates to Example 7, illustrates chain extension polymerizations from a PMMA macroinitiator (A) with MMA (B), IDMA (C), BMA (D), BnMA (E). Gel permeation chromatography traces of the polymers depicted by the chemical structures with corresponding color schemes (F).

Both PCs also efficiently polymerized other methacrylates, including benzyl methacrylate (BnMA), isobutyl methacrylate (BMA), and isododecyl methacrylate (IDMA) (Table 12). As such, 3 was used to perform chain extension polymerizations from an isolated PMMA ($M_w$=9.9 kDa, Đ=1.12) macroinitiator because the ATRP mechanism inherently reinstalls the bromine chain end group onto the growing polymer chain (FIG. 27). Chain extensions from this PMMA macroinitiator with MMA, DMA, BnMA, and BMA were successful, both confirming high bromine chain end group fidelity and allowing the synthesis of block polymers.

Figure 37A:
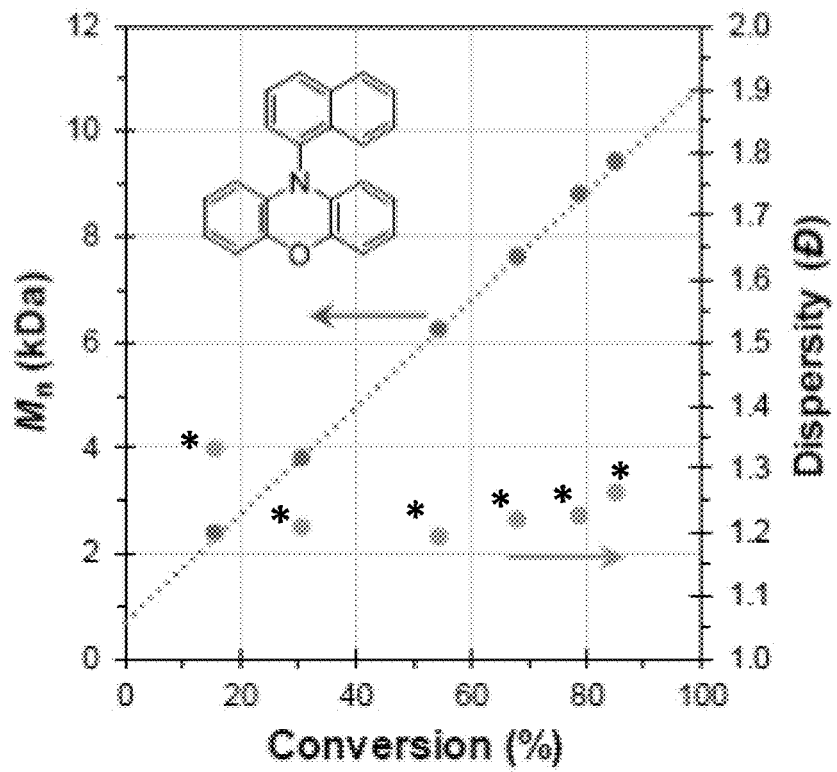
FIGS. 37A-37B, which relate to Example 7, illustrate plots of number average molecular weight (blue) and dispersity (orange; marked with "*") as a function of monomer conversion in the polymerization of methyl methacrylate catalyzed by 1-naphthylene-10-phenoxazine (FIG. 37A) and 1-naphthylene-10-phenothiazine (FIG. 37B). Conditions: [MMA]:[DBMM]:[PC]=[1000]:[10]:[1]; 9.35 μmoles PC, 1.00 mL dimethylacetamide, and irradiated with 365 nm light.
Figure 37B:
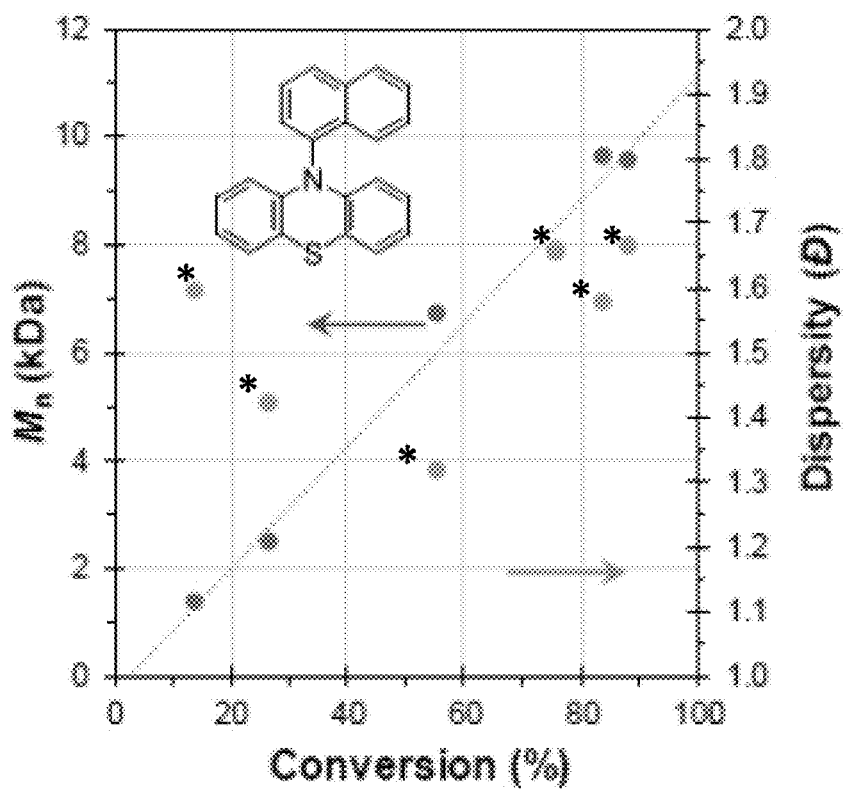

To further establish these naphthalene phenoxazines as efficient PCs, 3 and 1-naphthylene-10-phenothiazine were directly compared as PCs for O-ATRP under the polymerization conditions (FIGS. 37A-37B). Both catalysts exhibited nearly identical rates of polymerization, achieving 85.1% and 88.4% monomer conversion after 10 hours for 3 and the phenothiazine, respectively. Additionally, both PCs achieved high I*s of 93.5% and 95.6%, respectively. However, a significant difference in polymerization performance was observed when comparing the Đ of the resulting PMMA. When using 3, PMMA was produced with Đ=1.26, while the phenothiazine produced PMMA with comparatively higher Đ=1.66.

As inferred above, the higher Đ of the PMMA produced by the phenothiazine is attributed to the larger reorganization energies of the phenothiazines. Incorporation of O versus S in the core of phenoxazines versus the core of phenothiazines imparts distinct quantitative differences in the electronic and geometric structures of these molecules that affect their performance as PCs for O-ATRP. As such, the planarity of phenoxazines throughout the photoexcitation and ET processes causes them to perform more closely to diaryl dihydrophenazines as PCs for O-ATRP. Without wishing to be limited by any theory, differences between these PCs specifically manifest in each of their abilities to balance the rates of activation and deactivation, which results in differences observed in the Đ of the resulting PMMA produced by each PC.

Figure 28A:
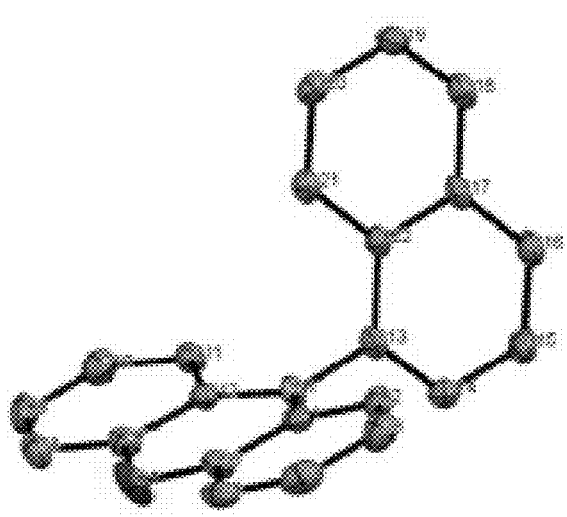
FIGS. 28A-28B illustrate X-ray crystal structures of 1-naphthalene substituted planar phenoxazine (FIG. 28A) and bent phenothiazine (FIG. 28B). Hydrogen atoms omitted for clarity. Thermal ellipsoids are drawn at the 50% probability level (C gray, N blue, O red, S yellow).
Figure 28B:
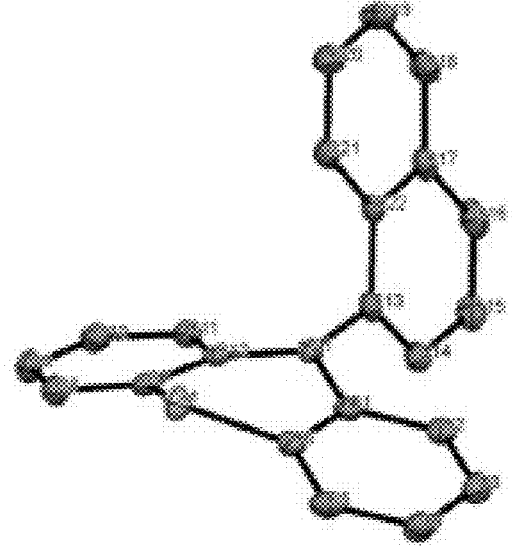
Figure 29A:
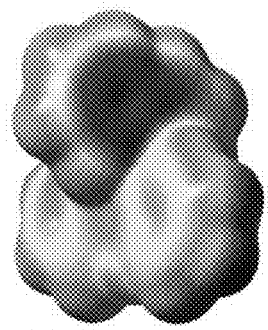
FIGS. 29A-29C illustrate ESP mapped electron density of $^3$PC* and $^1$PC of 1-naphthalene substituted phenoxazine (FIG. 29A), dihydrophenazine (FIG. 29B), and phenothiazine (FIG. 29C).
Figure 29A:
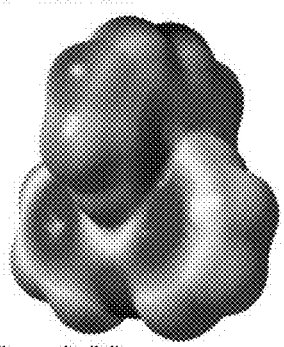
Figure 29B:
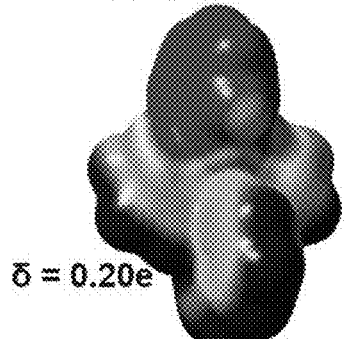
Figure 29B:
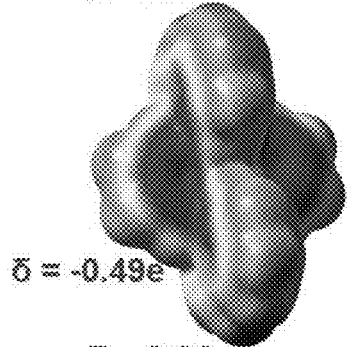
Figure 29C:
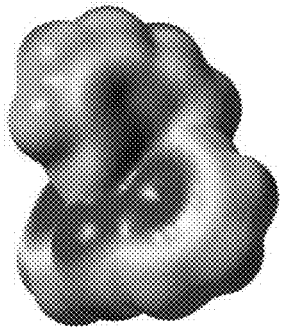
Figure 29C:
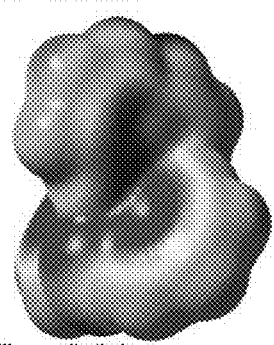

An additional consideration when comparing phenoxazines, dihydrophenazines, and phenothiazines is that the planar core of phenoxazines and dihydrophenazines promotes intramolecular charge transfer to charge separated SOMOs while the bent phenothiazine core limits electronic coupling between the heterocyclic ring and the N-aryl substituent and consequently the ability to form an intramolecular charge transfer complex. The planar phenoxazine core versus the bent phenothiazine core can be visualized in the X-ray crystal structures of the PCs (FIGS. 28A-28B). The electrostatic potential (ESP) mapped electron density of the $^3$PC* state of these compounds reveal that electron density is transferred to the naphthalene substituent (red region) in phenoxazine upon photoexcitation and ISC, even more so with dihydrophenazines, while electron density remains localized on the phenothiazine core (FIGS. 29A-29C).

In certain embodiments, a visible light absorbing phenoxazine derivative provides an even more efficient polymerization catalyst, as irradiation of the reaction with high energy UV-light can initiate non-desirable reaction pathways, which may increase the Đ of the produced polymer and lower I*. To realize a visible light absorbing PC, a core substituted phenoxazine derivative was explored. Computations predicted that PC 5, possessing 4-biphenyl core substitutions, would be an excellent target PC with $^3$PC* possessing a strong reduction potential and spatially separated SOMOs, while $^1$PC would exhibit an absorbance profile in the visible spectrum. The visible light absorbing PC 5 was synthesized in high yield from PC 3 through selective bromination at the 3- and 7-positions on the phenoxazine core using N-bromosuccinimide followed by Suzuki cross-coupling. The absorbance profile of PC 5 was not only red-shifted ($\Delta\lambda_{max}$=65 nm versus non-core substituted PC 3) into the visible spectrum ($\lambda_{max}$=388 nm), but also exhibited an extremely enhanced molar extinction coefficient ($\varepsilon$=26635 $M^{-1}cm^{-1}$ at $\lambda_{max}$=388 nm), making it significantly more efficient at absorbing visible light than the non-core substituted 1-napthalene functionalized phenoxazine, dihydrophenazine, or phenothiazine (FIGS. 30A-30D).

Figure 30A:
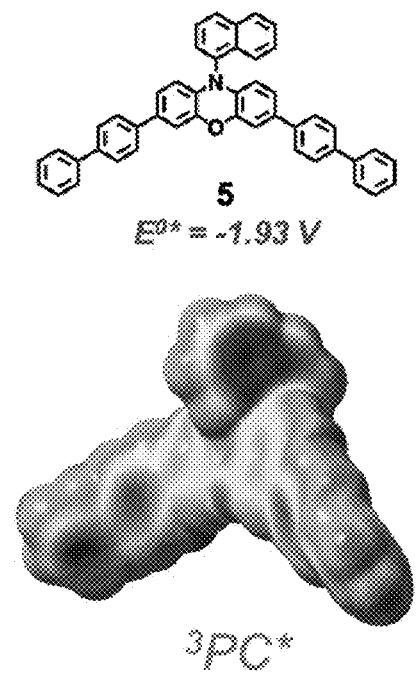
FIGS. 30A-30D, which relate to Example 7, illustrate properties of PC 5.
Figure 30B:
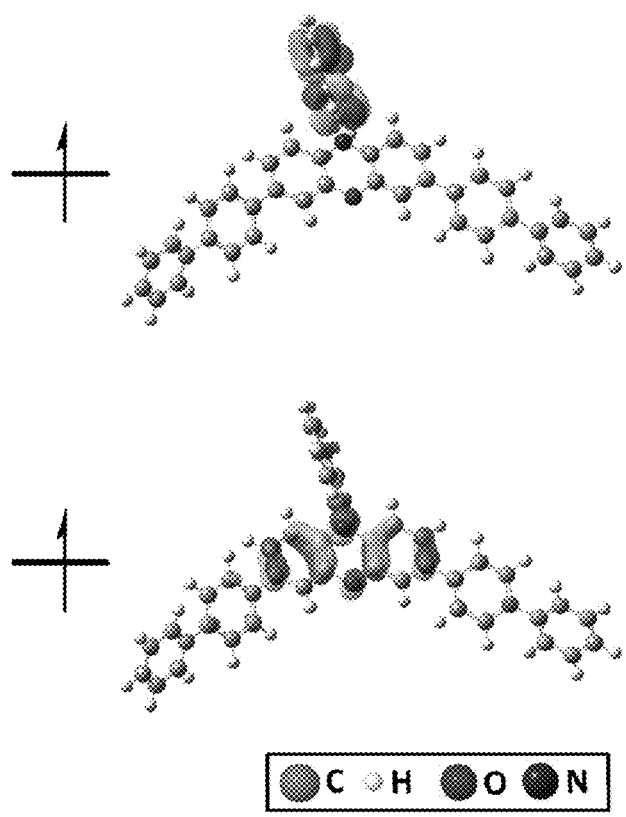
Figure 30C:
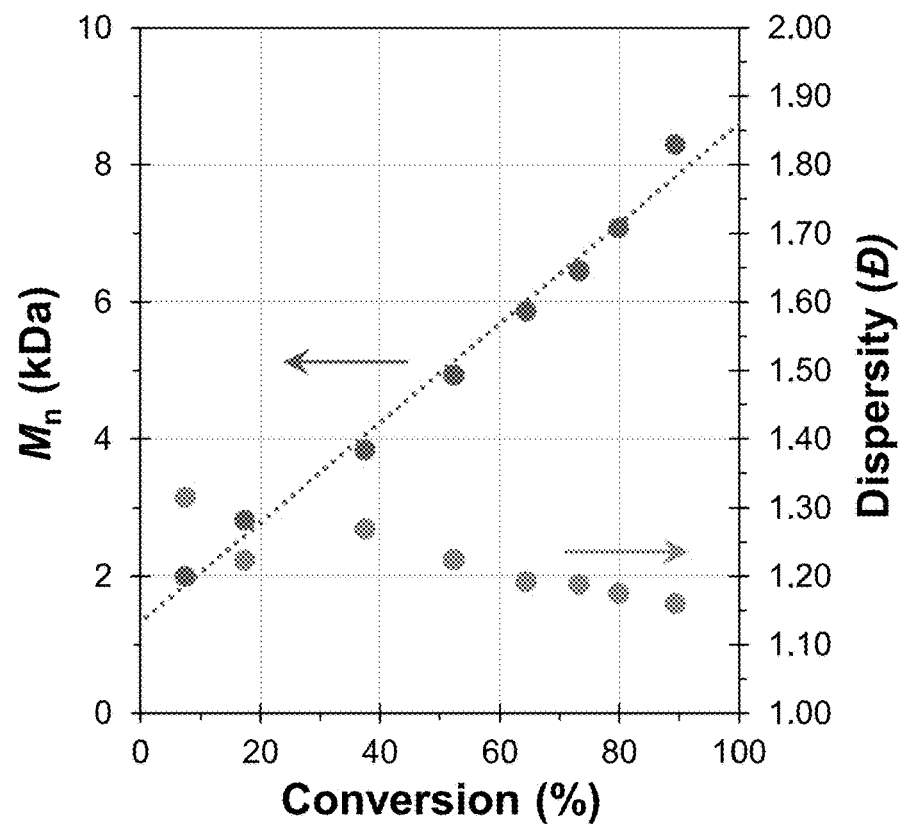
Figure 30D:
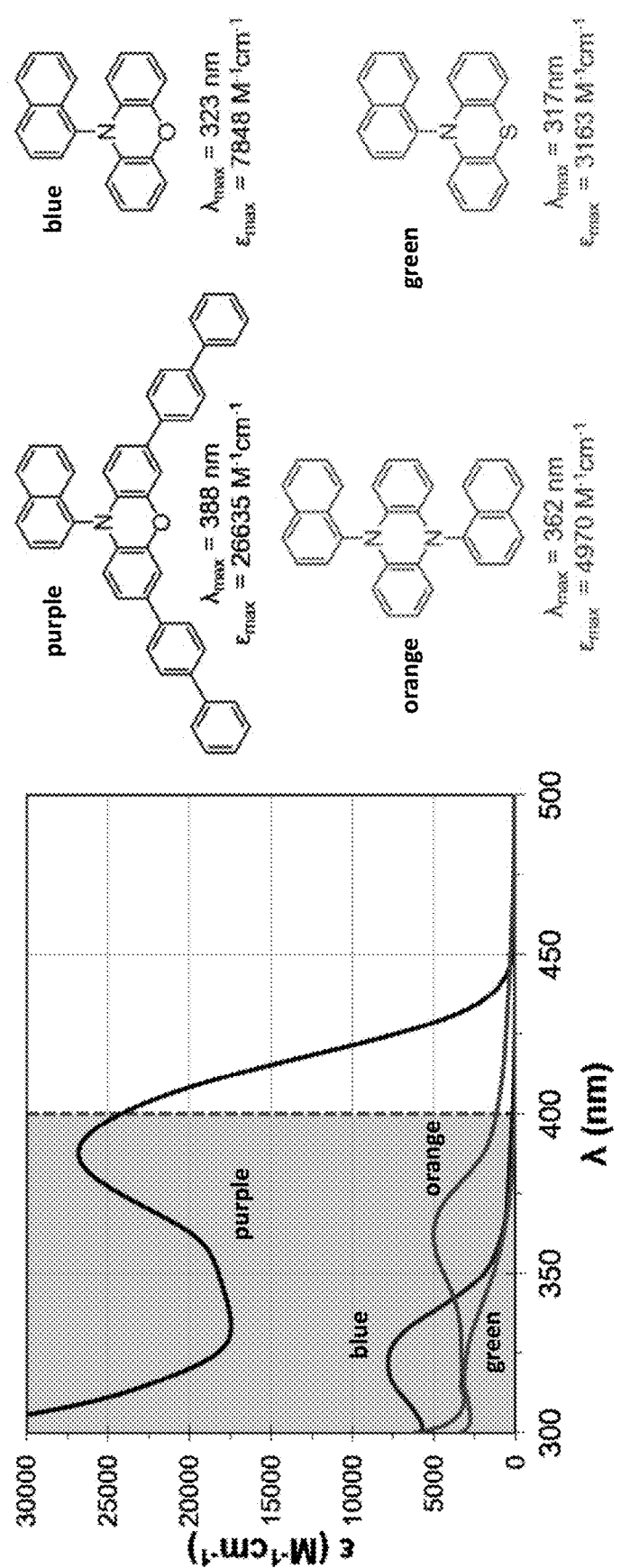
Figure 31:
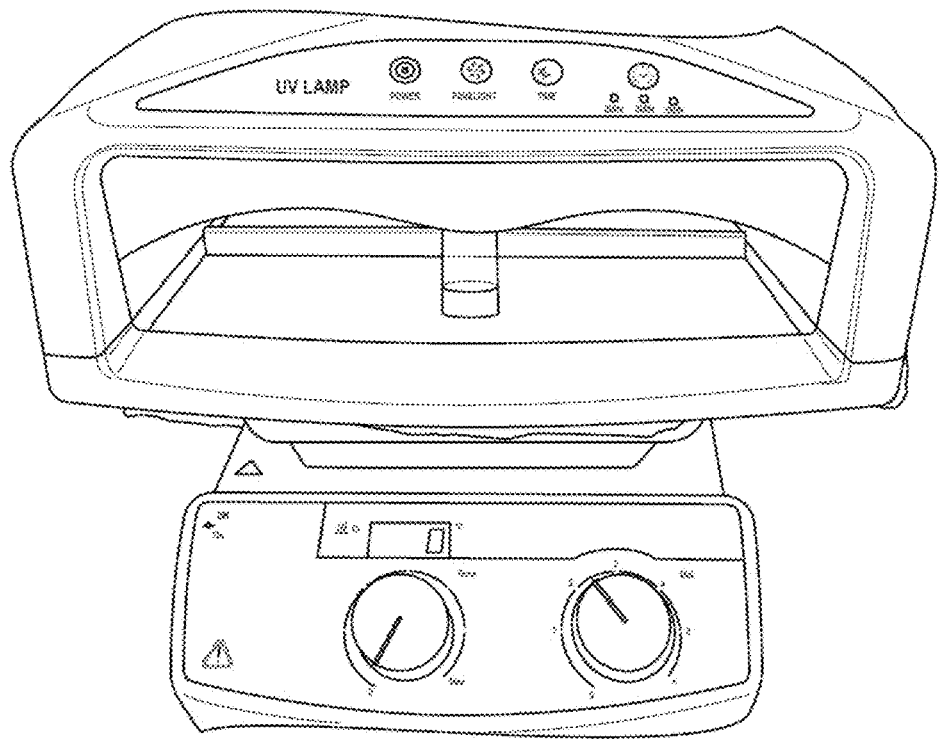
FIG. 31 illustrates a photograph of the reaction setup for O-ATRP using UV irradiation.
Figure 32:
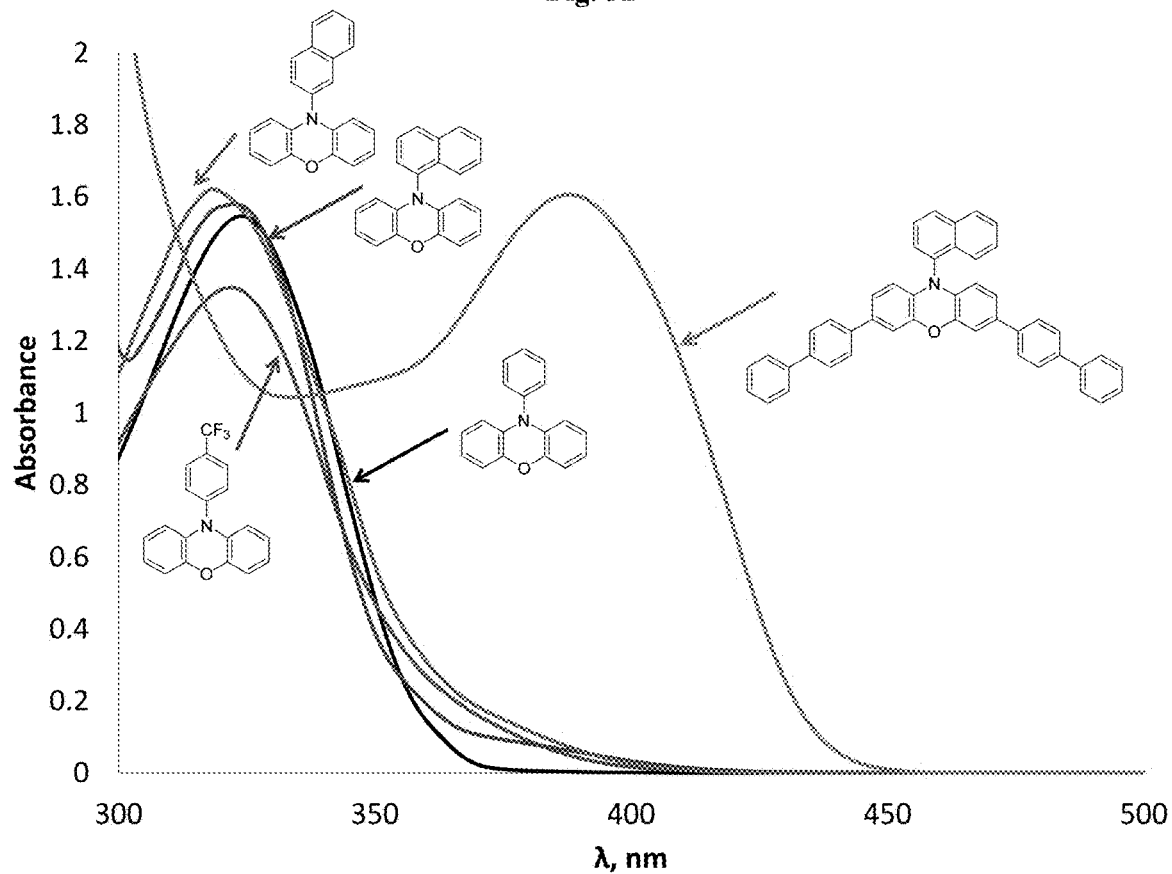
FIG. 32, which relates to Example 7, illustrates UV-vis absorption spectrums of the phenoxazine photocatalysts. PC 1-4 were taken at 0.20 mM and PC 5 was taken at 0.06 mM. Solvent=DMA. Path length=1 cm.
Figure 33A:
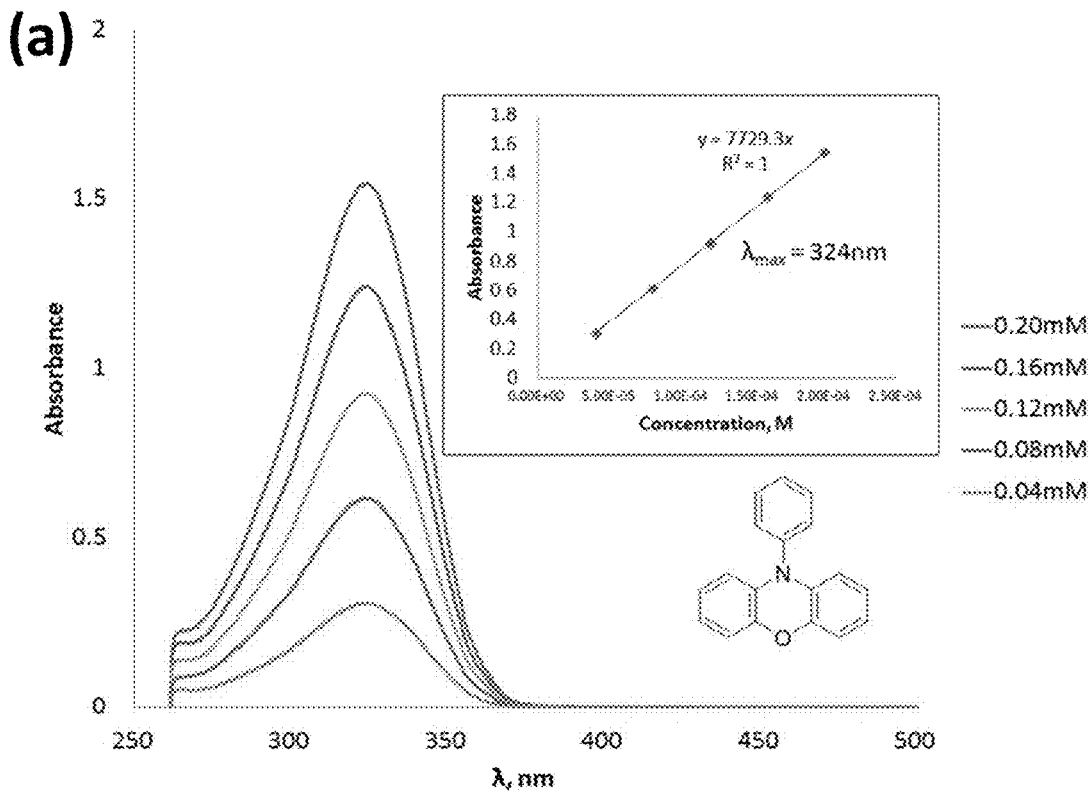
FIGS. 33A-33E, which relate to Example 7, illustrate UV-vis absorption of the phenoxazine catalysts taken at different concentrations in DMA. Path length=1 cm.
Figure 33B:
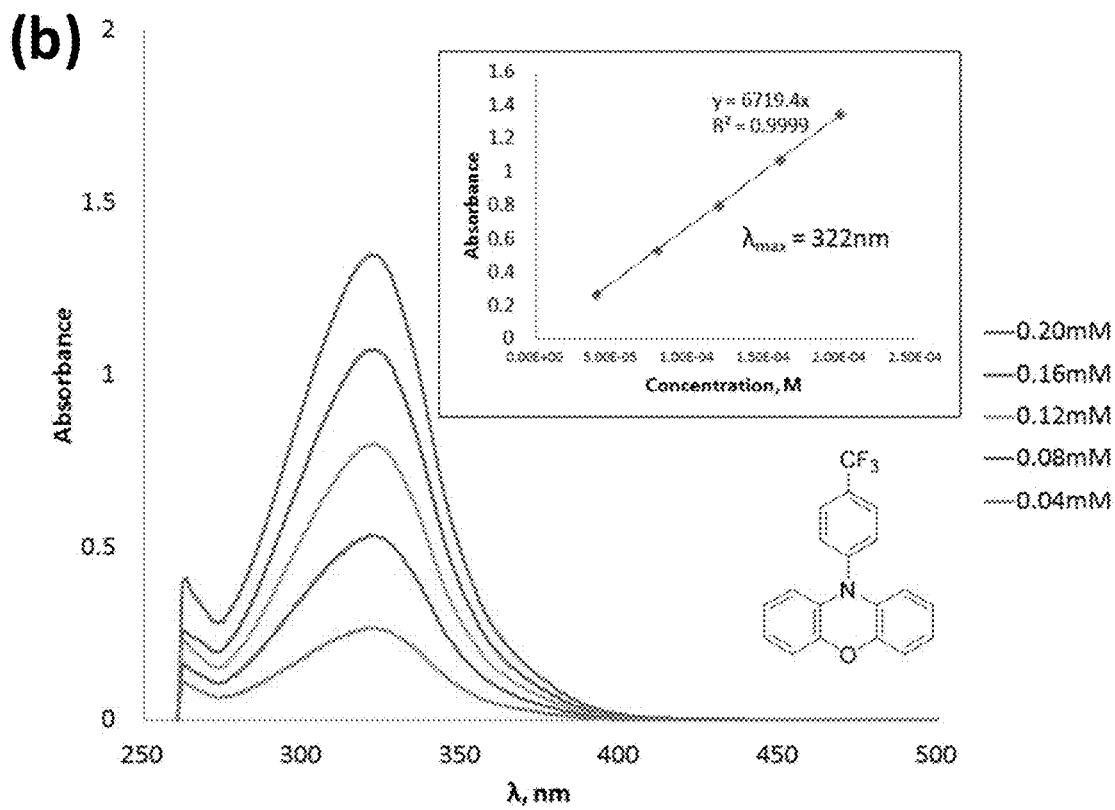
Figure 33C:
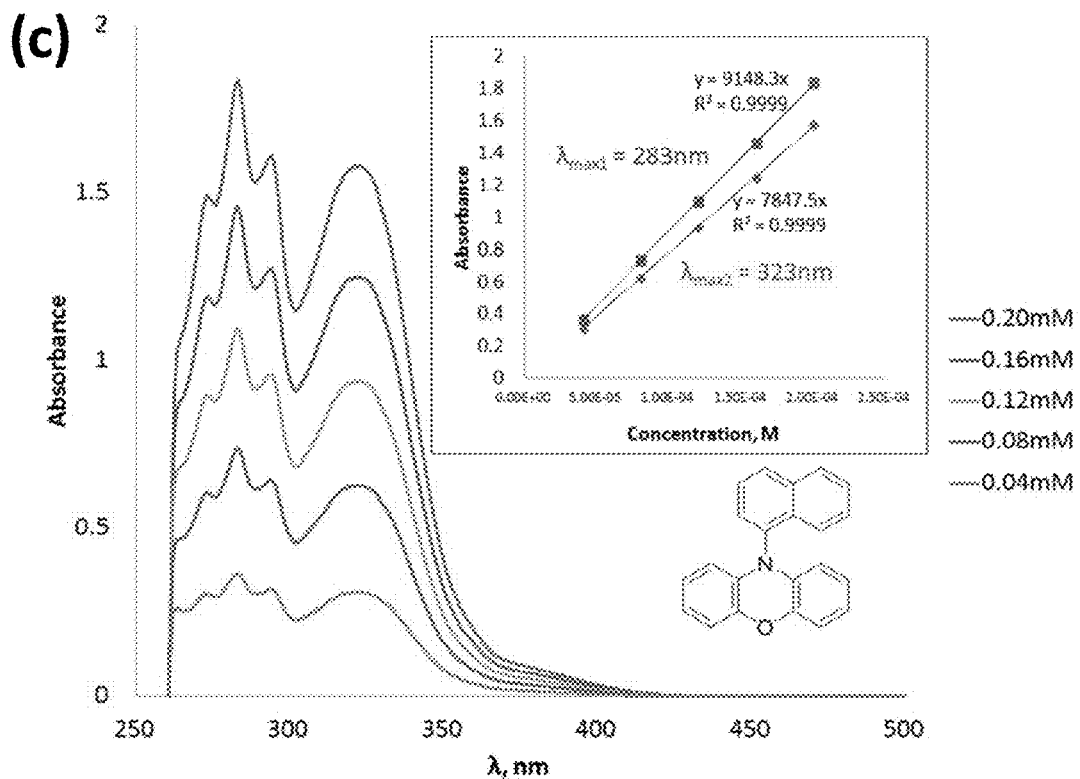
Figure 33D:
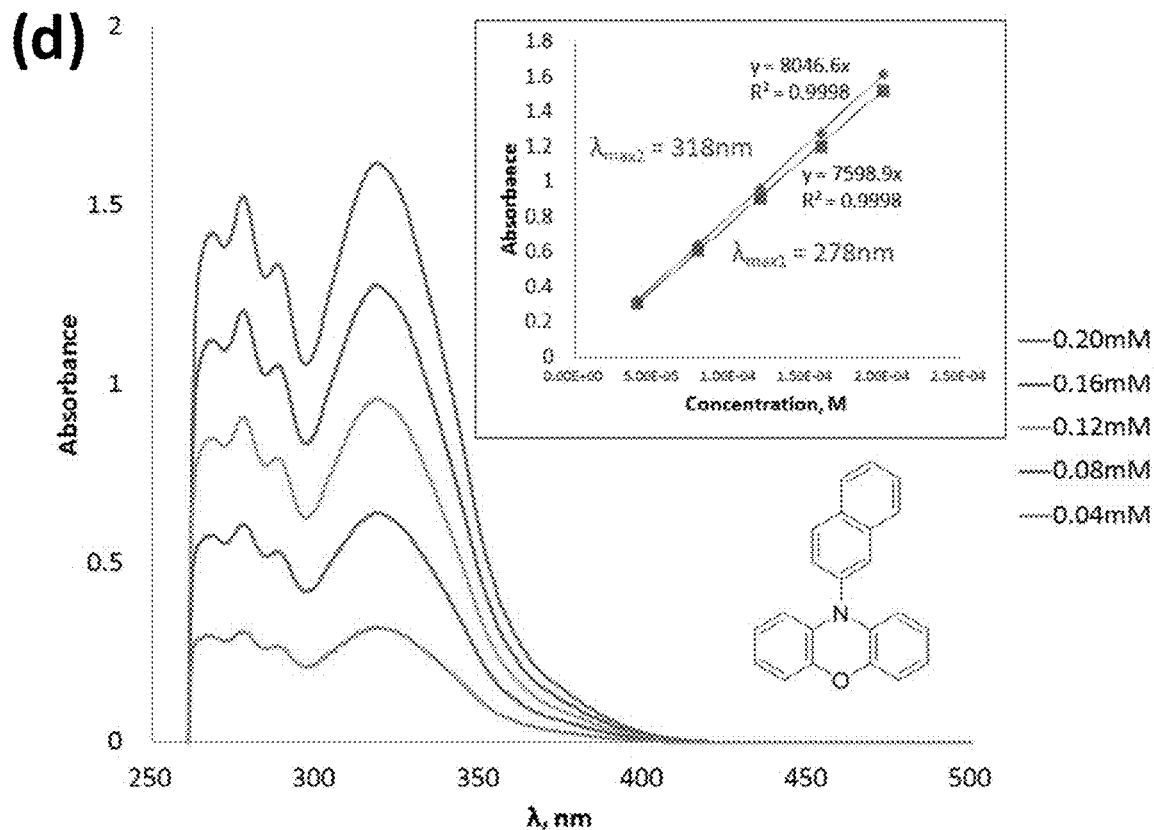
Figure 33E:
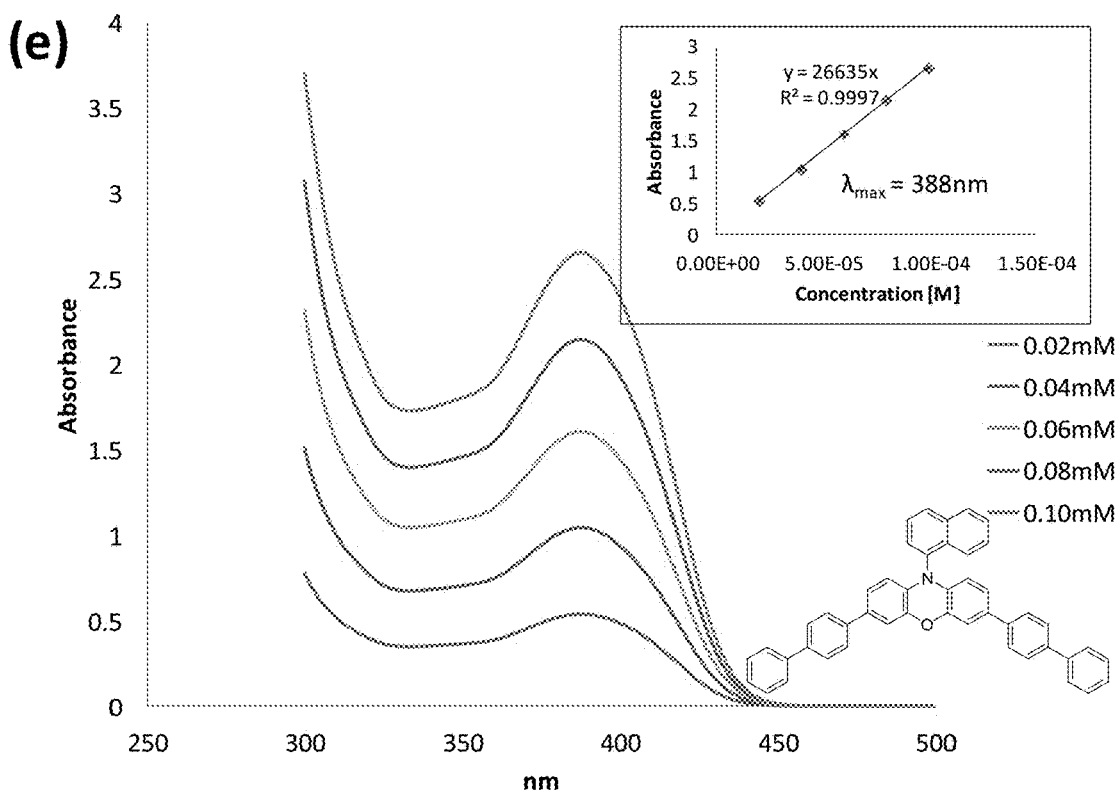
Figure 34:
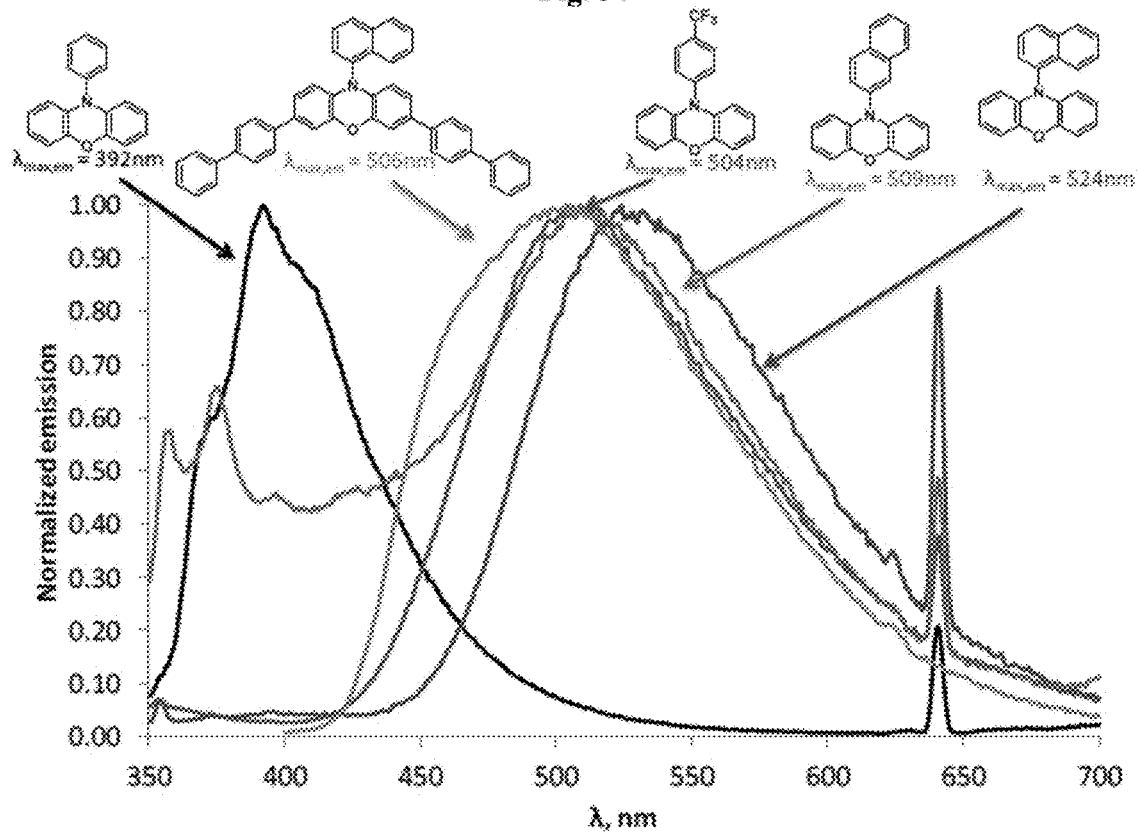
FIG. 34, which relates to Example 7, illustrates a plot of the normalized emission spectrums of the phenoxazine photocatalysts in DMA. PC 1-4 were irradiated with 320 nm light while PC 5 was irradiated with 380 nm light.
Figure 35A:
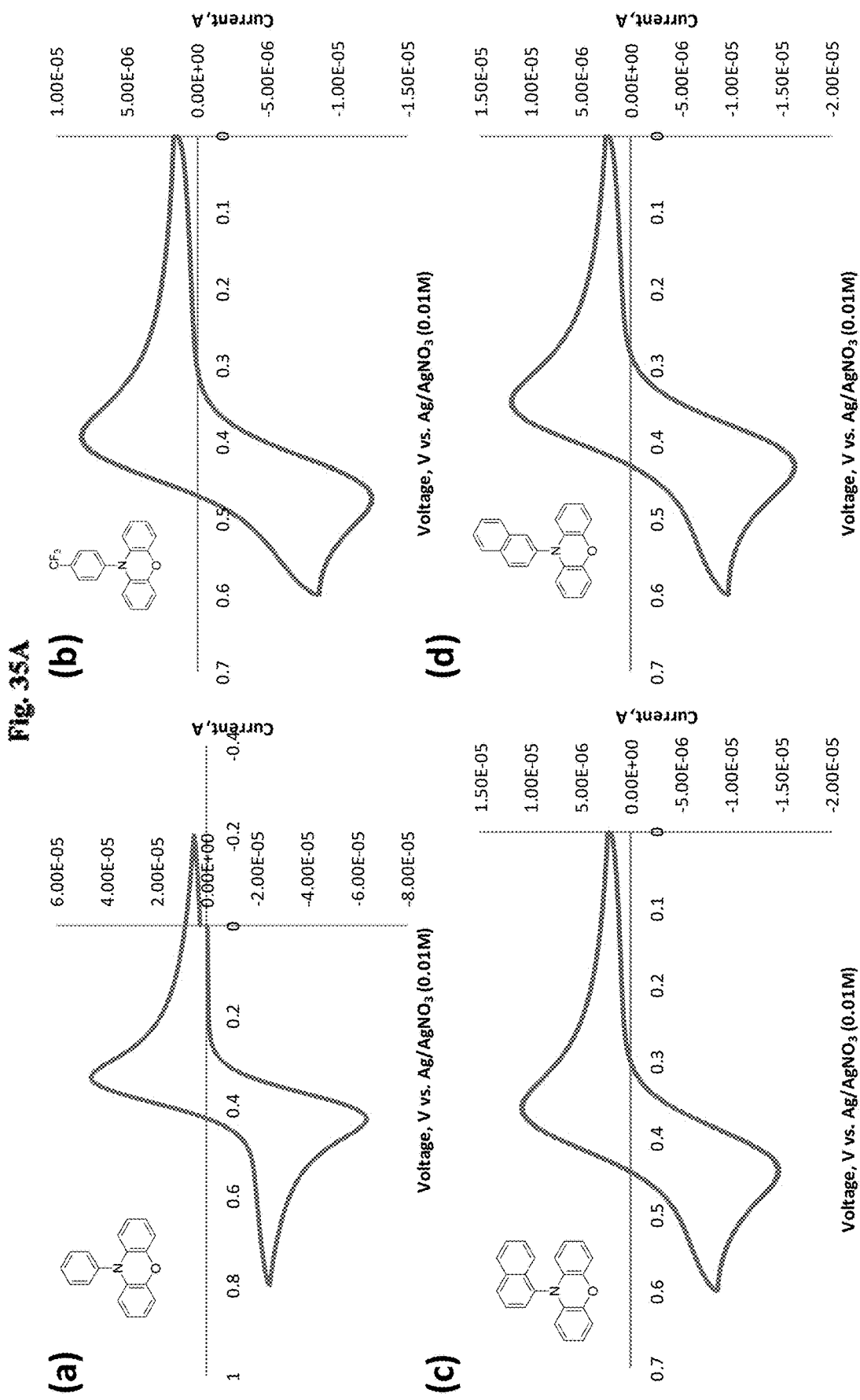
FIGS. 35A-35B illustrate cyclic voltammograms of the phenoxazine photocatalysts performed in a 3-compartment electrochemical cell. Reference electrode: Ag/AgNO$_3$ (0.01M) in MeCN; electrolyte: 0.1 M NBu$_4$PF$_6$; scan rate: 0.10 V/s. DMA is used as the solvent in the working electrode compartment for (b)-(e) while MeCN is used as the solvent in (a). Platinum is used as both the working and counter electrodes.
Figure 35B:
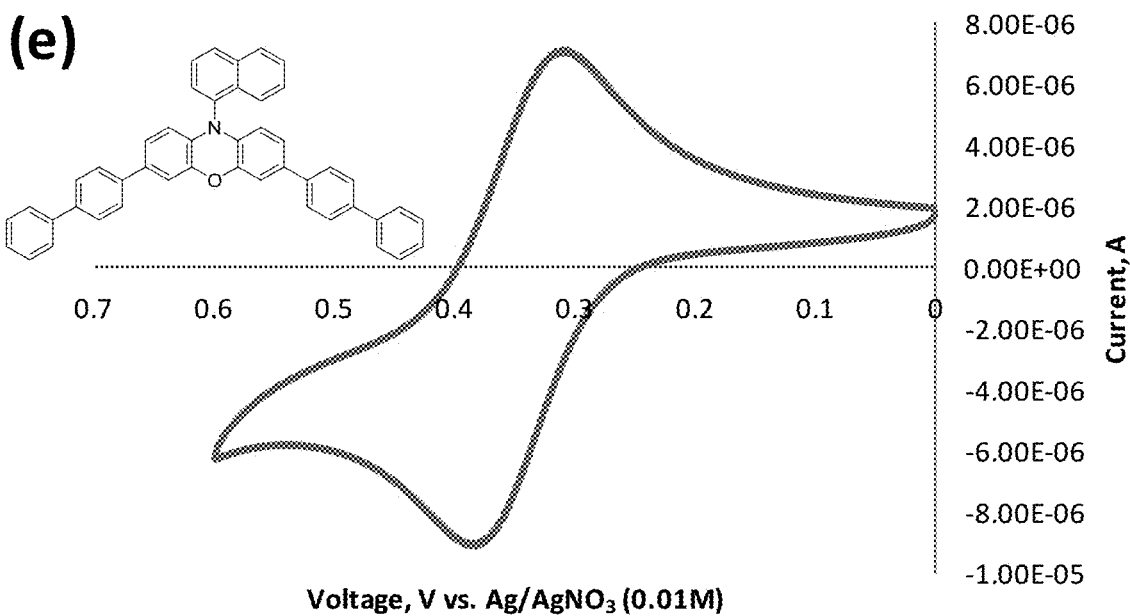
Figure 36:
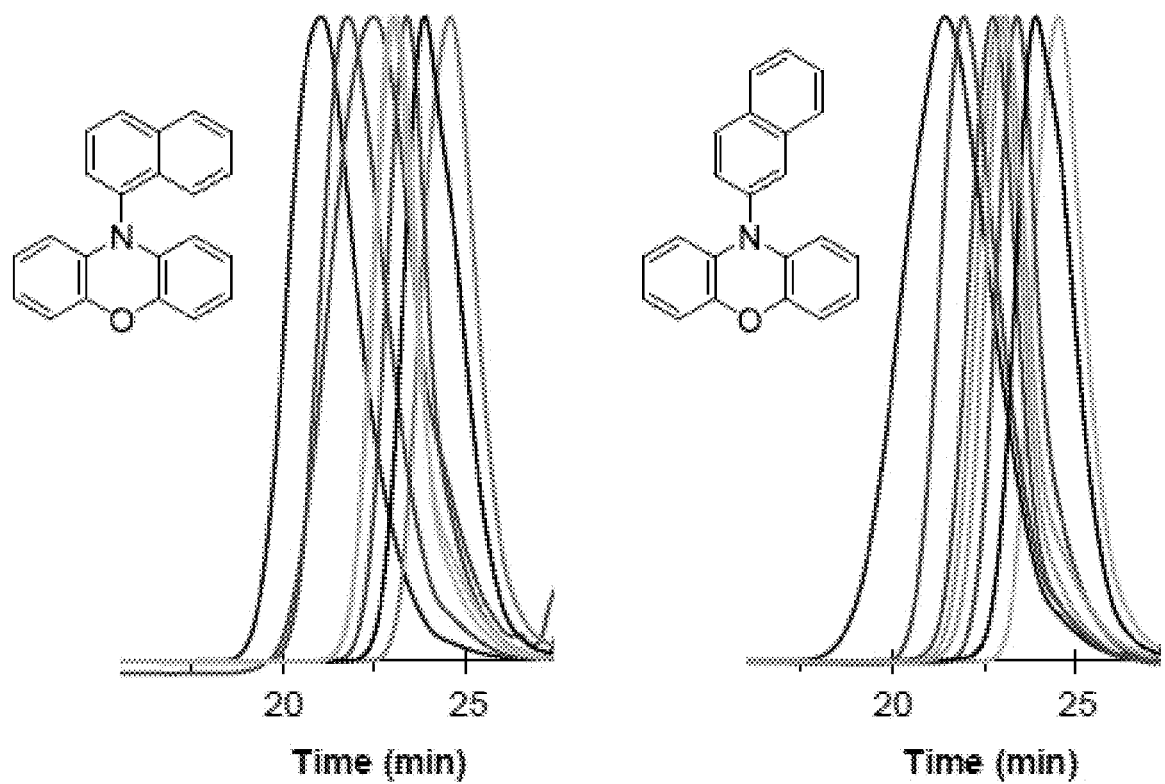
FIG. 36, which relates to Example 7, illustrates gel permeation traces of PMMA produced using 3 (left) and 4 (right) reported in Table 9. Color scheme corresponds to: (left plot) run 5 (light blue), run 6 (gray), run 7 (orange), run 8 (red), run 9 (green), run 10 (blue), run 11 (purple), rune 12 (black); (right plot) run 13 (light blue), run 14 (orange), runt 15 (gray), run 16 (red), run 17 (green), run 18 (blue), run 19 (purple), run 20 (black). Curve colors are in both plots, from left to right: blue, green, red, gray, orange, purple, black and light blue.

The polymerization performance of PC 5 indicated that it is an excellent PC for O-ATRP, demonstrating superior control over the polymerization than the UV-absorbing phenoxazines or even previously reported dihydrophenazines. The polymerization of MMA using PC 5 irradiated by white LEDs was efficient and showcased characteristics of a controlled polymerization with a linear increase in polymer $M_n$ and a low polymer Đ during the course of polymerization (FIG. 30C). Furthermore, the molecular weight of the polymer can be tailored through manipulation of either the monomer or initiator loading, while keeping the polymerization otherwise constant, to produce polymers with Đ of 1.13-1.31 while achieving quantitative I* (Table 10).

TABLE 10

Results of the O-ATRP of MMA using PC 5

| Run No. | [MMA]:[DBMM]:[5] | Conversion (%) | $M_w$ (kDa) | $M_n$ (kDa) | Dispersity (Đ) | I* (%) |
|---|---|---|---|---|---|---|
| 21 | [500]:[10]:[1] | 67.2 | 4.07 | 3.64 | 1.13 | 99.4 |
| 22 | [1500]:[10]:[1] | 75.2 | 13.7 | 11.8 | 1.16 | 98.0 |
| 23 | [2000]:[10]:[1] | 90.9 | 22.9 | 17.5 | 1.31 | 105 |
| 24 | [2500]:[10]:[1] | 87.5 | 27.5 | 21.3 | 1.29 | 104 |

TABLE 10-continued

Results of the O-ATRP of MMA using PC 5

| Run No. | [MMA]:[DBMM]:[5] | Conversion (%) | $M_w$ (kDa) | $M_n$ (kDa) | Dispersity (Đ) | I* (%) |
|---|---|---|---|---|---|---|
| 25 | [1000]:[5]:[1] | 89.9 | 23.0 | 18.1 | 1.27 | 101 |
| 26 | [1000]:[15]:[1] | 73.8 | 6.17 | 5.31 | 1.16 | 97.5 |
| 27 | [1000]:[20]:[1] | 72.1 | 4.52 | 3.76 | 1.20 | 103 |

N-aryl phenoxazines have proven to be efficient PCs for O-ATRP that produce polymers with controlled molecular weights and low dispersity. Through the culmination of computational and experimental results, the present studies provide a visible light absorbing phenoxazine photoredox catalyst that produces polymers with controlled molecular weights and low dispersities, achieving quantitative initiator efficiencies that outcompete previously reported organic PCs for O-ATRP. The continued establishment of design principles for PCs capable of mediating O-ATRP helps expand the scope and impact of this polymerization methodology, which allows for an additional means for selective small molecule transformations.

TABLE 11

Calculation of excited state reduction potentials of photocatalysts 1-5 (Example 7)

| PC | abs $\lambda_{max}$ (nm)[a] | $\varepsilon_{\lambda max}$ ($M^{-1}cm^{-1}$)[b] | em $\lambda_{max}$ (nm)[c] | E(em $\lambda_{max}$) (V vs. SCE)[d] | E(triplet), theo (V vs. SCE)[e] |
|---|---|---|---|---|---|
| 1 | 324 | 7729 | 392 | 3.16 | 2.69 |
| 2 | 322 | 6719 | 504 | 2.46 | 2.63 |
| 3 | 323 | 7848 | 524 | 2.37 | 2.39 |
| 4 | 318 | 8047 | 509 | 2.44 | 2.45 |
| 5 | 388 | 26635 | 506 | 2.45 | 2.41 |

| PC | $E_{1/2}$ (PC•+/PC) (V vs. SCE) | $E^0$ (PC•+/PC), theo (V vs. SCE)[e] | $E^{0*}$ (PC•+/PC*) (V vs. SCE) | $E^{0*}$ (PC•+/3PC*), theo (V vs. SCE)[e] |
|---|---|---|---|---|
| 1 | 0.74 | 0.50 | −2.42[f] | −2.20 |
| 2 | 0.80 | 0.51 | −1.66 | −2.12 |
| 3 | 0.76 | 0.47 | −1.61 | −1.92 |
| 4 | 0.74 | 0.47 | −1.70 | −1.98 |
| 5 | 0.70 | 0.40 | −1.75 | −2.01 |

[a]Maximum absorption wavelength; PC 3 and 4 exhibit another $\lambda_{max}$ at higher energy wavelengths of 283 nm and 278 nm, respectively.
[b]Molar absorptivity at the reported $\lambda_{max}$.
[c]Maximum emission wavelength when irradiated with 320 nm light (PC 1-4) and 380 nm light (PC 5).
[d]Energy of emitted photons.
[e]Theoretical predictions from DFT calculations at uM06/6-31 + Gdp/CPCM-H2O level of theory.
[f]The E0* of PC 1 is significantly more negative than PC 2-5 and deviates from the predicted trend. In the DFT calculations, the triplet excited state was explicitly assumed while the observed emission is likely fluorescence from the relaxed singlet excited state.

TABLE 12

Polymerization Results of O-ATRP of Methacrylates.[a]

| PC | Monomer | Time (h) | Conv (%) | $M_n$ (kDa) | $M_w$ (kDa) | Đ ($M_w/M_n$) | I* (%) |
|---|---|---|---|---|---|---|---|
| 3 | BMA | 8 | 62.0 | 13.5 | 16.4 | 1.22 | 67.4 |
| 3 | BnMA | 8 | 46.1 | 8.2 | 11.6 | 1.41 | 102 |
| 3 | DMA | 8 | 87.5 | 20.9 | 28.3 | 1.35 | 42.9 |
| 4 | BMA | 8 | 62 | 15.2 | 17.3 | 1.14 | 59.7 |
| 4 | BnMA | 8 | 77.1 | 12.5 | 16.0 | 1.28 | 110 |
| 4 | IDMA | 8 | 83.2 | 21.7 | 28.4 | 1.31 | 39.6 |

[a]Polymerizations of vinyl monomers were performed at [1000]:[10]:[1] using DBMM as the initiator and the same volume of solvent as that of the monomer added.

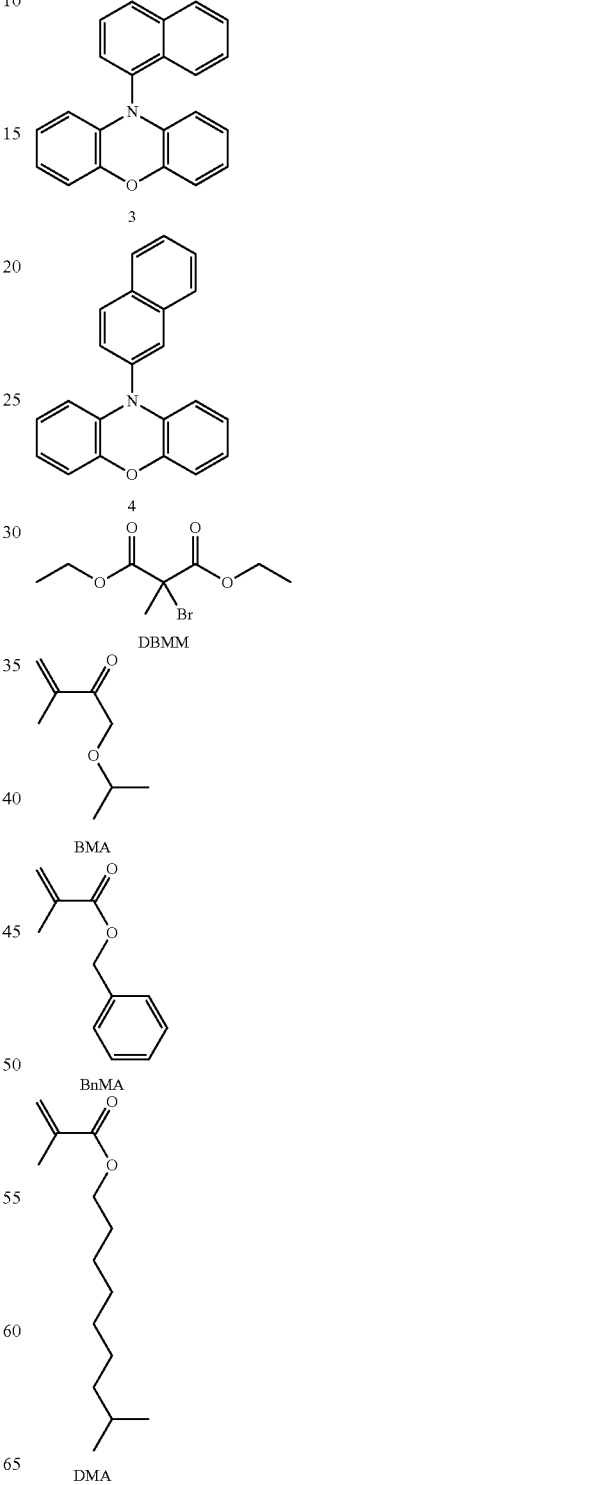

TABLE 13

Polymerization Results of O-ATRP PMMA chain extensions.[a]

| PC | Monomer A | Monomer B | Time (h) | $M_n$ (kDa) | $M_w$ (kDa) | Đ ($M_w/M_n$) |
|---|---|---|---|---|---|---|
| 3 | MMA | MMA | 10 | 38.8 | 49.4 | 1.27 |
| 3 | MMA | BMA | 10 | 38.8 | 43.8 | 1.13 |
| 3 | MMA | IDMA | 10 | 59.8 | 77.6 | 1.29 |
| 3 | MMA | BnMA | 10 | 46.8 | 67.1 | 1.43 |

[a]Polymerization chain extensions were performed at [1500]:[10]:[1] using a PMMA macroinitiator and the same volume of solvent as that of the monomer added.

TABLE 14

Polymerization Results of O-ATRP initiator screen for PC 1-4.[a]

| PC | Initiator | Time (h) | Conv (%) | $M_n$ (kDa) | $M_w$ (kDa) | Đ ($M_w/M_n$) | I* (%) |
|---|---|---|---|---|---|---|---|
| 1 | EBP | 8 | 92.2 | 8.01 | 14.3 | 1.79 | 119 |
| 1 | DBMM | 8 | 95.6 | 7.16 | 10.6 | 1.48 | 137 |
| 2 | EBP | 8 | 61.2 | 15.4 | 20.7 | 1.34 | 41.2 |
| 2 | DBMM | 8 | 55.3 | 6.54 | 9.48 | 1.45 | 85.5 |
| 3 | EBP | 8 | 66.4 | 9.29 | 12.6 | 1.36 | 74.2 |
| 3 | MBiB | 8 | 76.5 | 9.58 | 11.8 | 1.23 | 81.8 |
| 3 | MBP | 8 | 70.7 | 10.9 | 14.1 | 1.29 | 66.4 |
| 3 | DBMM | 8 | 78.8 | 8.79 | 10.8 | 1.22 | 92.6 |
| 4 | EBP | 8 | 59.0 | 11.3 | 13.6 | 1.21 | 54.7 |
| 4 | MBiB | 8 | 69.2 | 11.3 | 15.0 | 1.34 | 63.3 |
| 4 | MBP | 8 | 31.7 | 5.80 | 6.87 | 1.19 | 57.6 |
| 4 | DBMM | 8 | 80.2 | 10.7 | 11.9 | 1.11 | 77.3 |

[a]Polymerizations were performed at [1000]:[10]:[1] for [MMA]:[Initiator]:[PC] using the same volume of DMA as that of the monomer added.

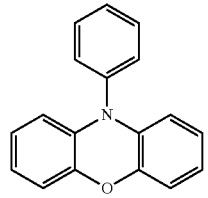

1

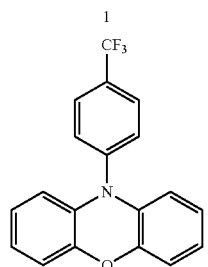

2

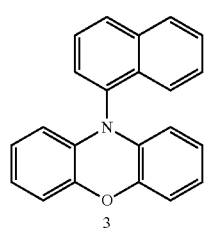 [SMILES: c1ccc2c(c1)Oc1ccccc1N2c1cccc2ccccc12]

3

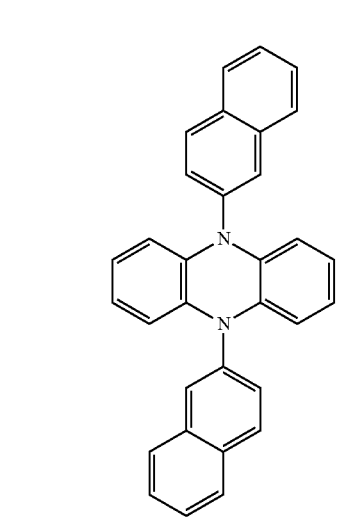

4

EBP

MBiB

MBP

DBMM

Example 8: Additional Radical Addition and Coupling Reactions

5

-continued

7

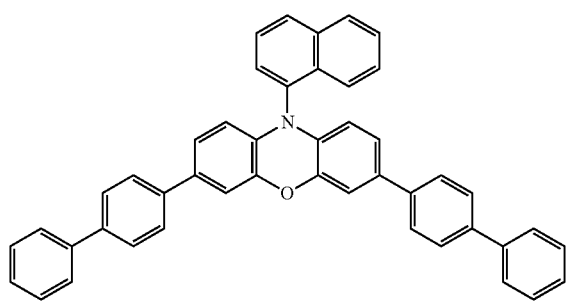

Figure 38:
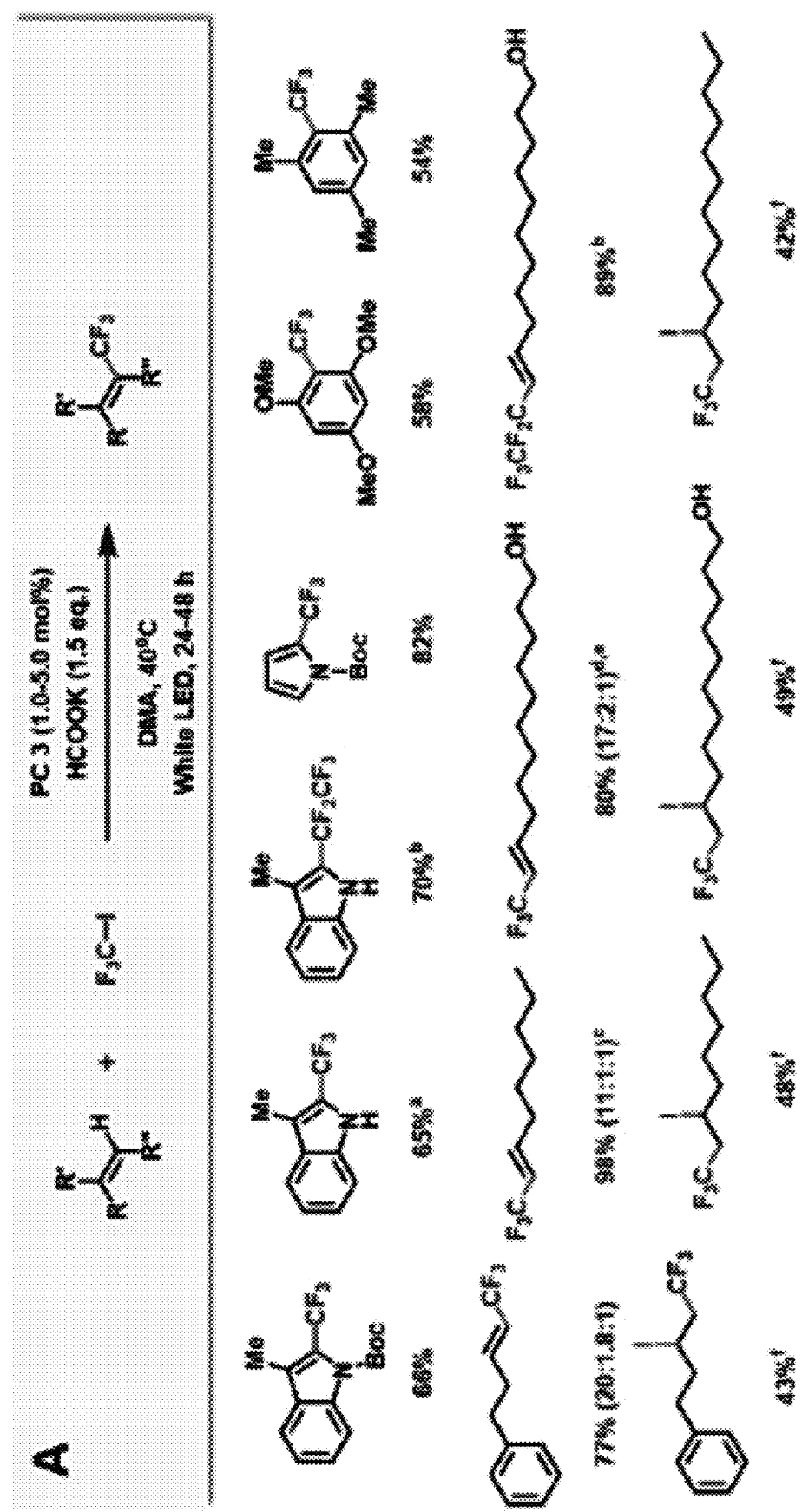
FIG. 38 depicts radical addition reactions according to embodiments of the invention, comprising radical trifluoromethylations on alkenes, five-membered heteroarenes, arenes, and cross-addition on alkenes.

To determine if the strongly reducing dihydrophenazine 5 could directly reduce $CF_3I$ (peak reduction potential (Ep) of −1.52 V vs. SCE on glassy carbon), thereby generating $CF_3$• for the trifluoromethylation of unsaturated substrates (FIG. 38). Using white LED irradiation of 3 (1 to 5 mol %) in the presence of 1.5 equivalents of potassium formate (HCOOK), $CF_3$ was successfully installed onto five-membered heteroarenes (indoles, pyrroles), arenes, and alkenes at moderate to excellent yields (42% to 98%). For alkenes, the presence of HCOOK base affords the substitution product, while the absence of HCOOK favors the addition product. The reduction of $CF_3CF_2I$ was also accomplished, generating $CF_3CF_2$• for substitution onto indoles and alkenes. The trifluoromethylation of 3-methylindole was achieved with similar yield using natural sunlight. The substitution reaction between 10-undecene-1-ol and $CF_3I$ could be performed using lower catalyst loading (0.25 mol %, 69% yield) or on a larger 10 mmol scale (1.74 g product, 73% yield) while maintaining good yields.

Dual catalytic approaches integrating photoredox catalysis using iridium PCs and nickel-catalyzed cross-coupling reactions have enabled access to C—O, C—S, C—N, and various C—C bond forming reactions. Incorporating the photoredox cycle introduces redox or energy-transfer mechanisms with the nickel complexes to complete otherwise demanding catalytic cycles. Cross-coupling reactions have traditionally been catalyzed by palladium complexes at elevated temperatures to construct such critical bonds.

Figure 39:
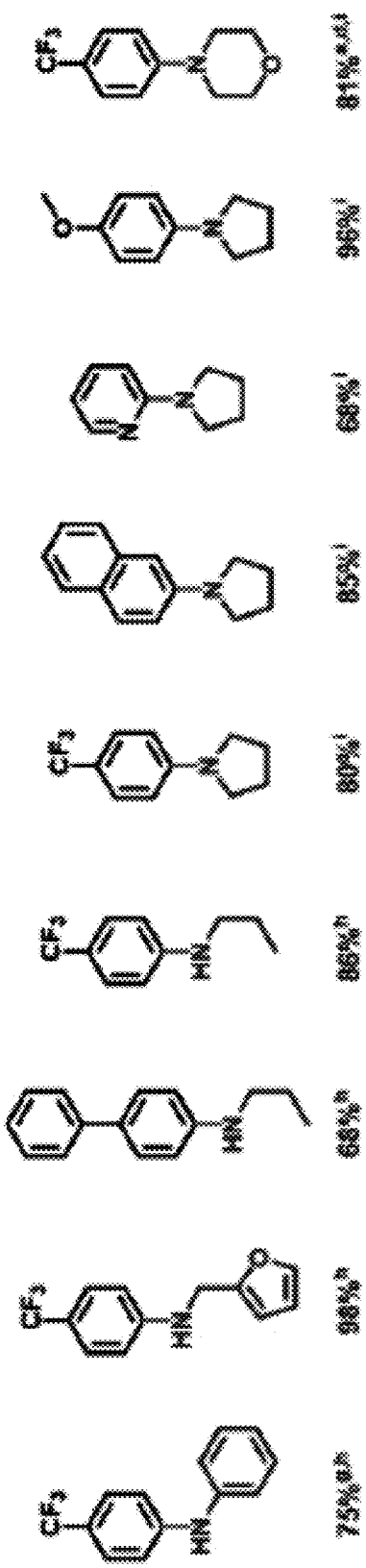
FIG. 39 depicts coupling reactions according to embodiments of the invention, comprising dual organic photoredox and nickel catalyzed C—N cross-coupling reaction scope.

A dual photoredox/nickel catalytic approach employing 0.02 mol % of polypyridyl iridium PC [Ir{dF(CF$_3$)ppy}$_2$(dtbbpy)]PF$_6$ [dF(CF$_3$)ppy=2-(2,4-difluorophenyl)-5-(trifluoromethyl)pyridine; dtbbpy=4,4'-ditertbutyl-2,2'-bipyridine] in conjunction with NiBr$_2$.glyme could efficiently catalyze C—N bond formation under mild reaction conditions. At similar reaction conditions, albeit using a higher catalyst loading (0.4 mol %), PC 5 or PC 7 in combination with NiBr$_2$.glyme successfully catalyzed C—N coupling reactions at good to excellent yields (68% to 96%, FIG. 39). The scope of amines included both primary (aniline, furfurylamine, and propylamine) and secondary amines (pyrrolidine and morpholine) and were effectively coupled with electron-rich, electron-poor, and heter-ocyclic aryl bromides. For secondary amines, both PC 5 and 7 catalyzed C—N bond formations, although PC 5 generally gave slightly higher yields. Whilst PC 5 was unsuccessful in effecting C—N cross-coupling involving primary amines, PC 4 proved to be effective to couple primary amines in high yields.

Figure 40:
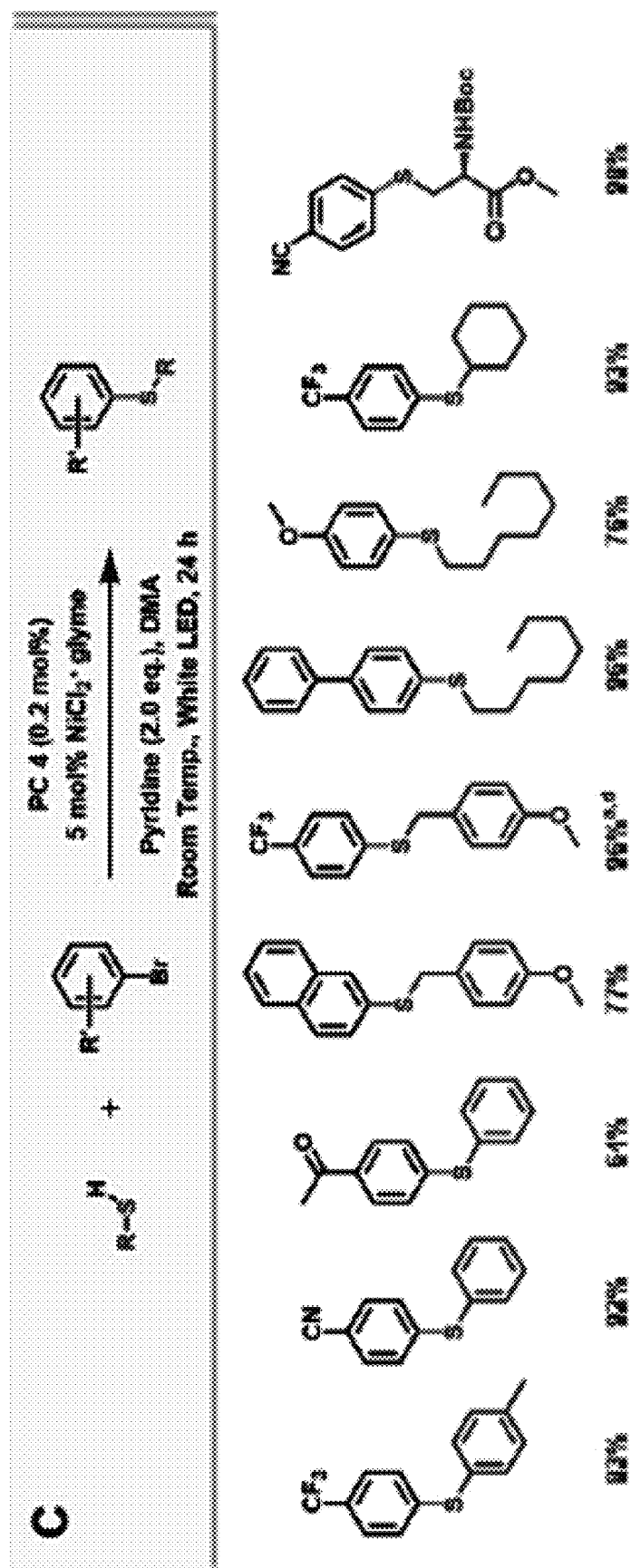
FIG. 40 depicts dual organic photoredox and nickel catalyzed C—S cross-coupling scope. Data reported as isolated yields. For all of FIGS. 38-40, values in parentheses are the ratio of Z:E:b-hydride elimination product. [a] Reaction was also conducted using sunlight for 1 week (67% yield for trifluoromethylation, 83% yield for C—N coupling, 94% yield for C—S coupling). [b] CF$_3$CF$_2$I was used instead of CF$_3$I. [c] Reaction time 6 h. [d] Reaction was also conducted on a larger 10 mmol scale (73% yield for trifluoromethylation, 53% yield for C—N coupling, 98% yield for C—S coupling). [e] Reaction was also conducted at reduced catalyst loading of 0.25 mol %, instead of standard 1.0 mol % (69% yield for trifluoromethylation after 24 h). [f] Performed without HCOOK. [g] Reaction performed with 10 mol % pyrrolidine as the ligand and reduced nickel loading to 1.0 mol %. [h] Reaction catalyzed by PC 4. [i] Reaction catalyzed by PC 3.

In regards to C—S cross-coupling, the dual photoredox/nickel catalysis with 2 mol % [Ir{dF(CF$_3$)ppy}$_2$(dtbbpy)]PF$_6$ and NiCl$_2$.glyme produced C—S coupled products under mild conditions. At analogous reaction conditions, phenoxazine PC 7 achieved C—S cross-couplings at good to excellent yields (64% to 98%, FIG. 40), but proved efficient at a much lower PC loading of 0.2 mol %. Aryl thiol (thiophenol), alkyl thiol (4-methoxybenzyl mercaptan, 1-octanethiol and cyclohexanethiol) and cysteine (N-(tert-butoxycarbonyl)-1-cysteine methyl ester) successfully coupled with a variety of aryl bromides. Aryl bromide coupling partners were successfully incorporated with organic PC 4, which were shown to be inactive when using [Ir{dF(CF$_3$)ppy}$_2$(dtbbpy)]PF$_6$. PC 5 was unsuccessful in C—S coupling reactions, presumably due to its stable radical cation (E0 ox=0.21 V vs. SCE) being unable to generate a thiol radical involved in the coupling reaction.

These photoredox/nickel C—N and C—S cross-coupling reactions could be driven by natural sunlight to obtain similarly high yield. Furthermore, both the C—N and C—S couplings could be performed on a larger 10 mmol scale reaction for C—N (1.22 g, 53% yield) and C—S (2.92 g, 98% yield) couplings. In these scaled reactions, C—S coupling maintained the high yield, while C—N coupling suffered a 30% drop in yield. This lower yield was attributed to limited light penetration owing to the opaque solution mixture compounded by the lower molar absorptivity of PC 5.

The disclosures of each and every patent, patent application, and publication cited herein are hereby incorporated herein by reference in their entirety.

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of promoting reaction of at least one reagent, the method comprising:
   irradiating with electromagnetic radiation the at least one reagent in the presence of an organic compound, or a salt or solvate thereof, selected from the group consisting of:

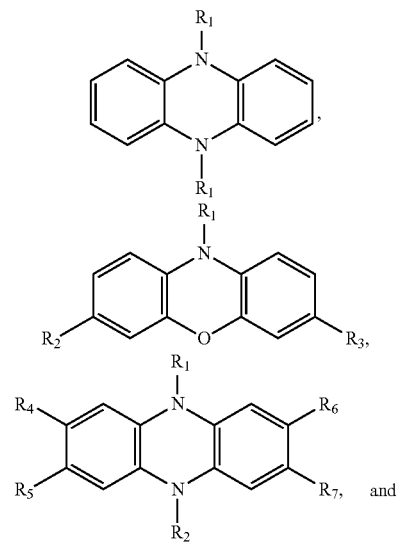

-continued

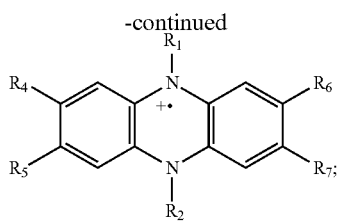

wherein:
each occurrence of R is independently selected from the group consisting of H, $C_1$-$C_6$ alkyl, $C_1$-$C_6$ haloalkyl, optionally substituted phenyl, —OH, —O($C_1$-$C_6$ alkyl), —NO$_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O) ($C_1$-$C_6$ alkyl), —S(O)$_2$($C_1$-$C_6$ alkyl), —S(phenyl), —S(O)(phenyl), and —S(O)$_2$(phenyl), each occurrence of $R_1$ is independently selected from the group consisting of phenyl, 1-naphthyl, and 2-naphthyl, each of which is independently substituted with at least one R;

each occurrence of $R_2$ and $R_3$ is independently selected from the group consisting of phenyl and 4-phenylphenyl, each of which is independently substituted with at least one R; and each occurrence of $R_4$, $R_5$ $R_6$, and $R_7$ is independently selected from the group consisting of phenyl, 4-phenyl-phenyl, 1-naphthyl, 2-naphthyl, triphenylamino, phenanthrenyl, and pyrenyl, each of which is independently substituted with at least one R, wherein:
if the compound is

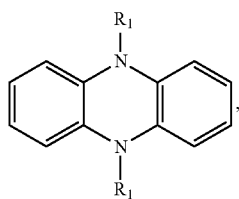

then
each occurrence of R is independently selected from the group consisting of $C_2$-$C_6$ alkyl, $C_1$-$C_6$ haloalkyl, substituted phenyl, —O($C_2$-$C_6$ alkyl), —NO$_2$, —C(=O)OH, —C(=O)O($C_2$-$C_6$ alkyl), —C(=O)O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O) ($C_1$-$C_6$ alkyl), —S(O)$_2$($C_1$-$C_6$ alkyl), —S(phenyl), —S(O)(phenyl), and —S(O)$_2$(phenyl);

if the compound is

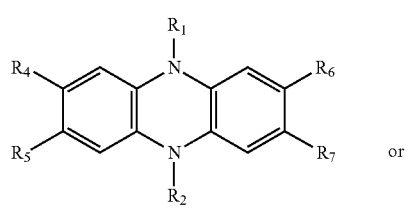

or

-continued

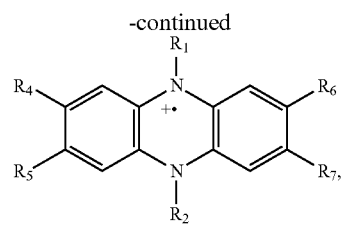

then
each occurrence of R is independently selected from the group consisting of $C_1$-$C_6$ alkyl, $C_1$-$C_6$ haloalkyl, optionally substituted phenyl, —OH, —O($C_2$-$C_6$ alkyl), —NO$_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O) ($C_1$-$C_6$ alkyl), —S(O)$_2$($C_1$-$C_6$ alkyl), —S(phenyl), —S(O)(phenyl), and —S(O)$_2$(phenyl);

if the compound is

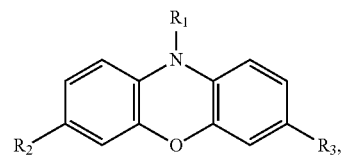

then
each occurrence of $R_1$ is independently selected from the group consisting of 1-naphthyl and 2-naphthyl, each of which is independently substituted with at least one R.

2. The method of claim 1, wherein the reaction comprises at least one selected from the group consisting of atom transfer radical addition/polymerization, dehalogenation, cycloaddition, cyclization, dimerization, coupling, reduction, ring-opening, alkylation, arylation, oxygenation, energy transfer, electron transfer, radical substitution, and radical addition.

3. The method of claim 1, wherein the reaction comprises atom transfer radical addition/polymerization.

4. The method of claim 1, wherein the at least one reagent comprises a (meth)acrylate and an organic halide.

5. The method of claim 4, wherein the organic halide comprises an α-halo ester.

6. The method of claim 1, wherein the reaction is essentially free of a metal or metalloid.

7. The method of claim 1, wherein the radiation comprises visible light.

8. The method of claim 7, wherein the radiation comprises sunlight or a natural light source.

9. The method of claim 7, wherein the radiation comprises radiation provided by a LED.

10. The method of claim 1, wherein $R_1$ is 1-naphthyl or $R_1$ is phenyl substituted by at least one substituent selected from the group consisting of $CF_3$ and C(=O)OH.

11. The method of claim 10, wherein the compound is selected from the group consisting of:

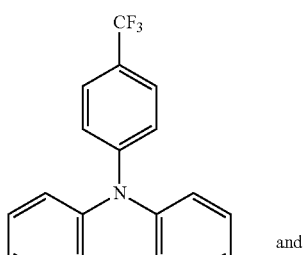

and

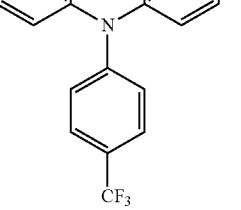

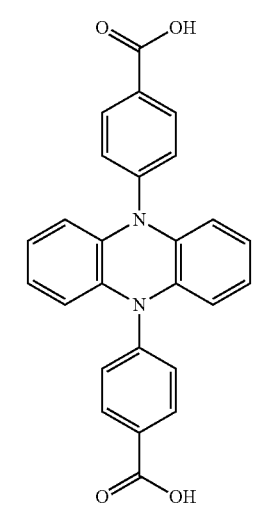

12. The method of claim 1, wherein the organic compound has the structure of

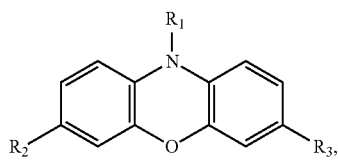

wherein
R₁ is independently selected from the group consisting of 1-naphthyl and 2-naphthyl, each of which is independently substituted with at least one R; and R₂ and R₃ are independently selected from the group consisting of phenyl and 4-phenyl-phenyl, each of which is independently substituted with at least one R.

13. The method of claim 12, wherein if the compound is

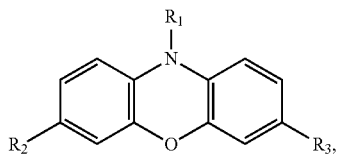

then R₁ is 1-naphthyl.

14. The method of claim 13, wherein the organic compound has the structure:

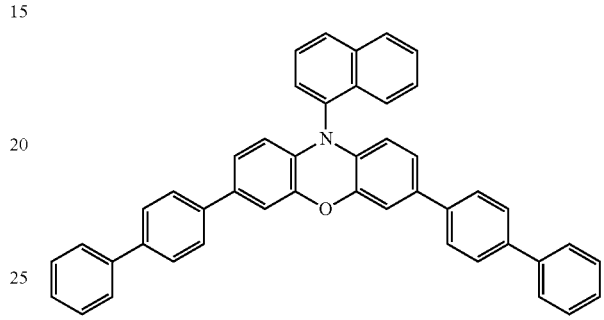

15. The method of claim 1, wherein the organic compound has the structure:

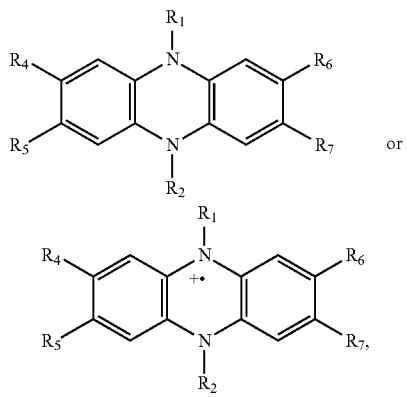

wherein
each occurrence of $R_1$ is independently selected from the group consisting of phenyl, 1-naphthyl, and 2-naphthyl, each of which is independently substituted with at least one R;
each occurrence of $R_2$ and $R_3$ is independently selected from the group consisting of phenyl and 4-phenyl-phenyl, each of which is independently substituted with at least one R; and
each occurrence of $R_4$, $R_5$ $R_6$, and $R_7$ is independently selected from the group consisting of phenyl, 4-phenyl-phenyl, 1-naphthyl, 2-naphthyl, triphenylamino, phenanthrenyl, and pyrenyl, each of which is independently substituted with at least one R, and
each occurrence of R is independently selected from the group consisting of $C_1$-$C_6$ alkyl, $C_1$-$C_6$ haloalkyl, optionally substituted phenyl, —OH, —O($C_2$-$C_6$ alkyl), —NO₂, —CN, —C(=O)OH, —C(=O)O ($C_1$-$C_6$ alkyl), —C(=O)O-phenyl, —C(=O)($C_1$-$C_6$ alkyl), —C(=O)-phenyl, —S(O)$_2$NH$_2$, —S(O)$_2$NH (C$_1$-C$_6$ alkyl), —S(O)$_2$N(C$_1$-C$_6$ alkyl)(C$_1$-C$_6$ alkyl), —S(C$_1$-C$_6$ alkyl), —S(O) (C$_1$-C$_6$ alkyl), —S(O)$_2$ (C$_1$-C$_6$ alkyl), —S(phenyl), —S(O)(phenyl), and —S(O)$_2$(phenyl).

16. The method of claim 15, wherein the organic compound is

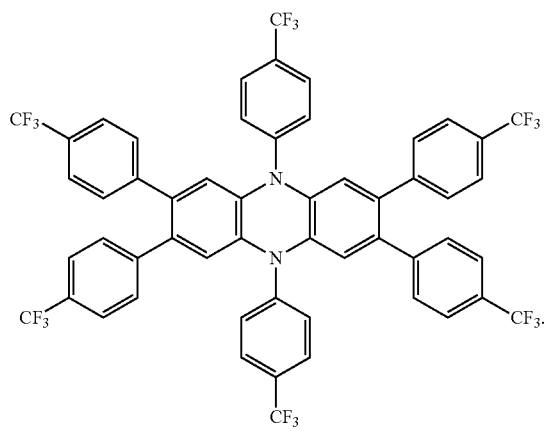 [SMILES: FC(F)(F)c1ccc(-c2cc3c(cc2-c2ccc(C(F)(F)F)cc2)N(c2ccc(C(F)(F)F)cc2)c2cc(-c4ccc(C(F)(F)F)cc4)c(-c4ccc(C(F)(F)F)cc4)cc2N3c2ccc(C(F)(F)F)cc2)cc1]

17. The method of claim 1, wherein the reaction comprises a carbon-carbon bond formation coupling reaction, carbon-nitrogen bond formation coupling reaction, carbon-oxygen bond formation coupling reaction, carbon-sulfur bond formation coupling reaction, or a carbon-phosphorus bond formation coupling reaction.

18. The method of claim 17, wherein the reaction comprises an aryl carbon-aryl carbon bond formation coupling reaction, aryl carbon-alkyl carbon bond formation coupling reaction, aryl carbon-vinyl carbon bond formation coupling reaction, aryl carbon-nitrogen bond formation coupling reaction, aryl carbon-oxygen bond formation coupling reaction, aryl carbon-sulfur bond formation coupling reaction, or an aryl carbon-phosphorus bond formation coupling reaction.

19. The method of claim 17, wherein the carbon-carbon bond formation coupling reaction comprises an alkyl carbon-alkyl carbon bond formation coupling reaction.

20. The method of claim 2, wherein the radical substitution or radical addition comprises reaction with a vinyl group or an aromatic group.

21. A method of promoting reaction of at least one reagent, the method comprising:
irradiating with electromagnetic radiation the at least one reagent in the presence of an organic compound, or a salt or solvate thereof, selected from the group consisting of:

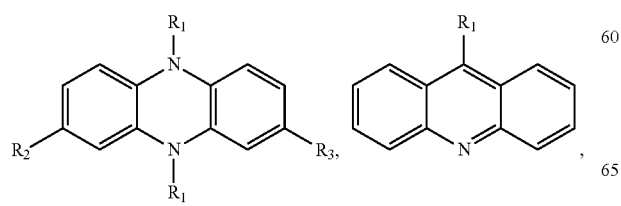

-continued

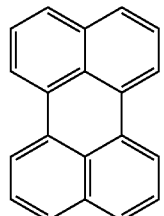

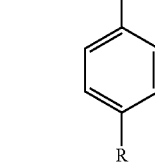

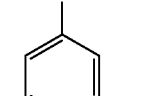

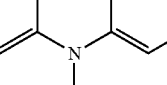

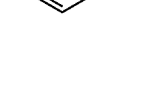

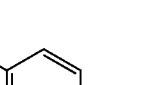

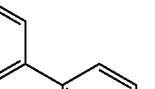

-continued

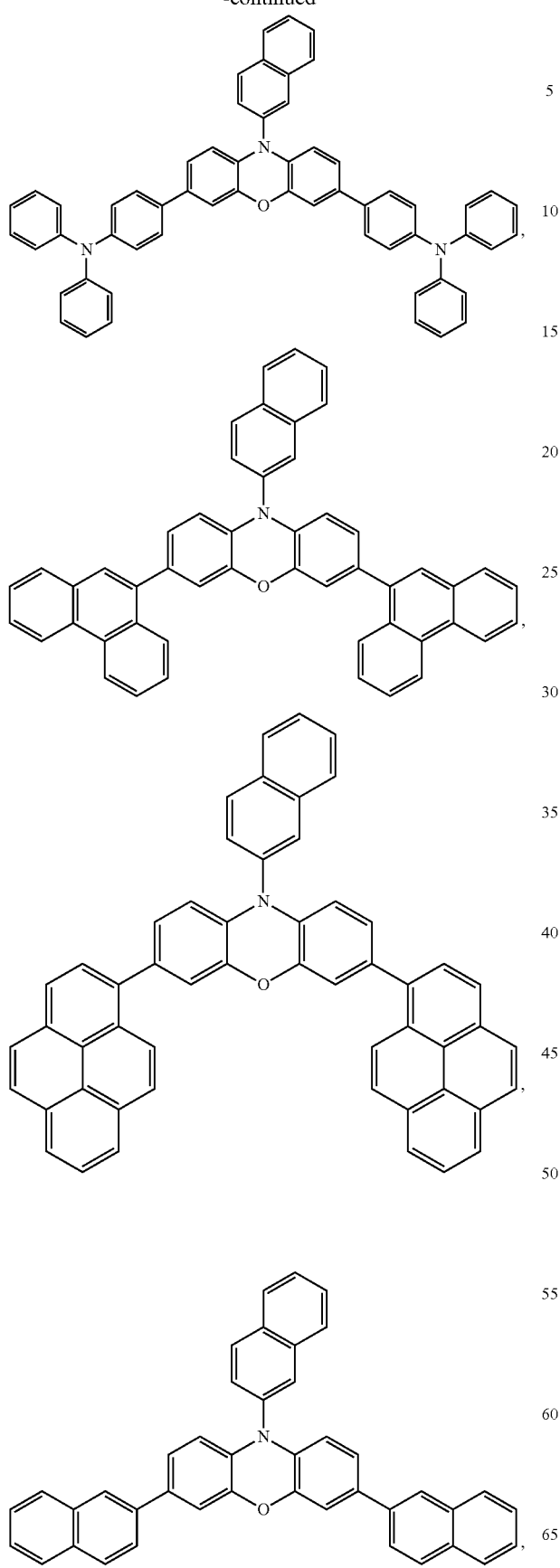

-continued

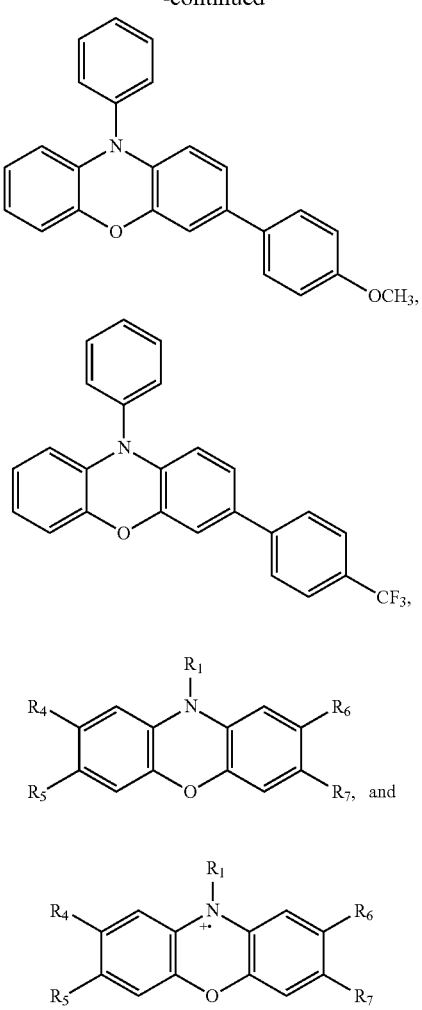

wherein:

each occurrence of R is independently selected from the group consisting of H, $C_1$-$C_6$ alkyl, $C_1$-$C_6$ haloalkyl, optionally substituted phenyl, —OH, —O($C_1$-$C_6$ alkyl), —NO$_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O) ($C_1$-$C_6$ alkyl), —S(O)$_2$($C_1$-$C_6$ alkyl), —S(phenyl), —S(O)(phenyl), and —S(O)$_2$(phenyl), each occurrence of $R_1$ is independently selected from the group consisting of phenyl, 1-naphthyl, and 2-naphthyl, each of which is independently substituted with at least one R;

each occurrence of $R_2$ and $R_3$ is independently selected from the group consisting of phenyl and 4-phenyl-phenyl, each of which is independently substituted with at least one R; and each occurrence of $R_4$, $R_5$ $R_6$, and $R_7$ is independently selected from the group consisting of phenyl, 4-phenyl-phenyl, 1-naphthyl, 2-naphthyl, triphenylamino, phenanthrenyl, and pyrenyl, each of which is independently substituted with at least one R.

22. The method of claim 21, wherein the organic compound has the structure

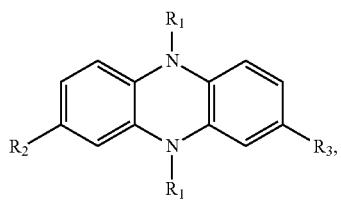

wherein
each occurrence of R$_1$ is independently selected from the group consisting of phenyl, 1-naphthyl, and 2-naphthyl, each of which is independently substituted with at least one R;
each occurrence of R$_2$ and R$_3$ is independently selected from the group consisting of phenyl and 4-phenylphenyl, each of which is independently substituted with at least one R.

23. The method of claim 21, having the structure of:

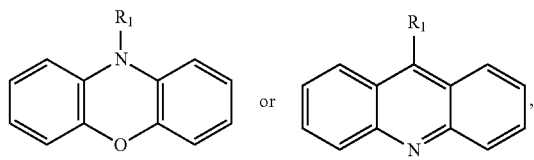

wherein R$_1$ is independently selected from the group consisting of phenyl, 1-naphthyl, and 2-naphthyl, each of which is independently substituted with at least one R.

24. The method of claim 21, wherein the reaction comprises at least one selected from the group consisting of atom transfer radical addition/polymerization, dehalogenation, cycloaddition, cyclization, dimerization, coupling, reduction, ring-opening, alkylation, arylation, oxygenation, energy transfer, electron transfer, radical substitution, and radical addition.

25. The method of claim 21, wherein the reaction comprises atom transfer radical addition/polymerization.

26. The method of claim 21, wherein the at least one reagent comprises a (meth)acrylate and an organic halide.

27. The method of claim 21, wherein the reaction comprises a carbon-carbon bond formation coupling reaction, carbon-nitrogen bond formation coupling reaction, carbon-oxygen bond formation coupling reaction, carbon-sulfur bond formation coupling reaction or a carbon-phosphorus bond formation coupling reaction.

28. The method of claim 27, wherein the reaction comprises an aryl carbon-aryl carbon bond formation coupling reaction, aryl carbon-alkyl carbon bond formation coupling reaction, aryl carbon-vinyl carbon bond formation coupling reaction, aryl carbon-nitrogen bond formation coupling reaction, aryl carbon-oxygen bond formation coupling reaction, aryl carbon-sulfur bond formation coupling reaction, or an aryl carbon-phosphorus bond formation coupling reaction.

29. The method of claim 27, wherein the carbon-carbon bond formation coupling reaction comprises an alkyl carbon-alkyl carbon bond formation coupling reaction.

30. The method of claim 24, wherein the radical substitution or radical addition comprises reaction with a vinyl group or an aromatic group.

31. A method of promoting reaction of at least one reagent, the method comprising:
irradiating with electromagnetic radiation the at least one reagent in the presence of an organic compound, or a salt or solvate thereof, selected from the group consisting of:

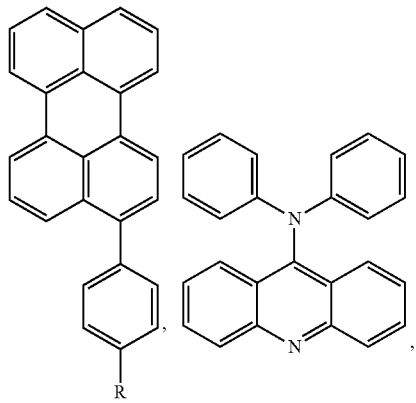

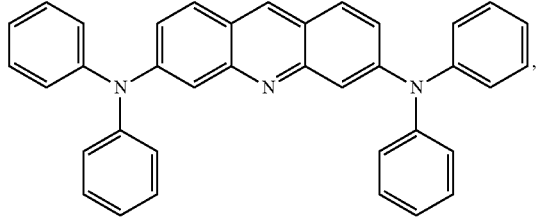

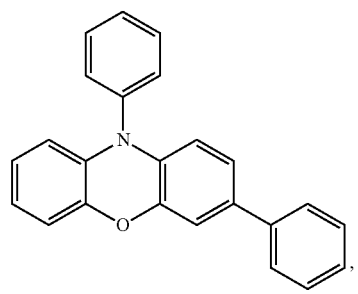

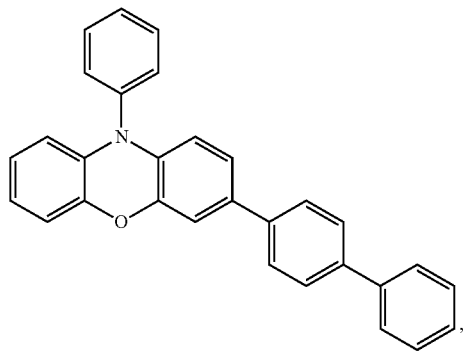

-continued

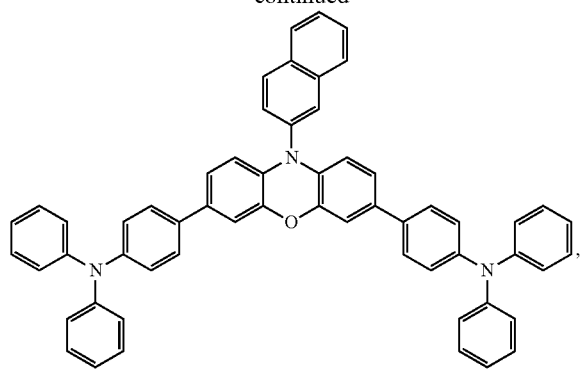

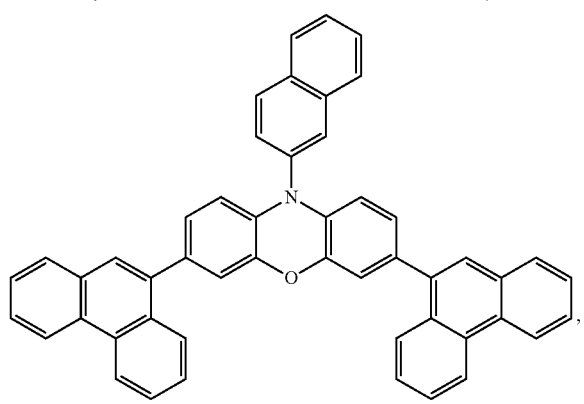

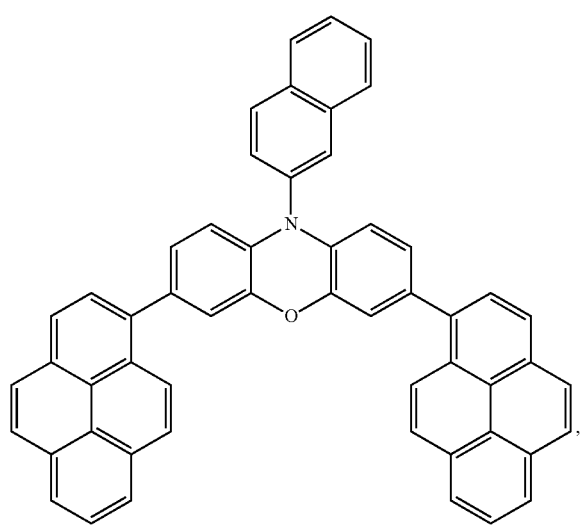

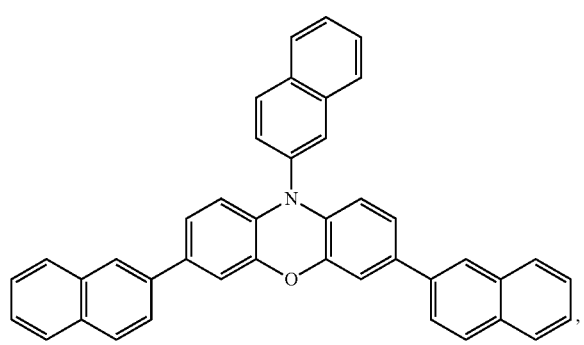

-continued

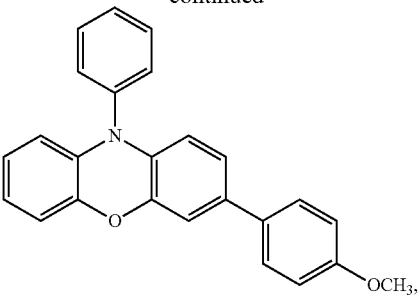

wherein R is independently selected from the group consisting of H, $C_1$-$C_6$ alkyl, $C_1$-$C_6$ haloalkyl, optionally substituted phenyl, —OH, —O($C_1$-$C_6$ alkyl), —$NO_2$, —CN, —C(=O)OH, —C(=O)O($C_1$-$C_6$ alkyl), —C(=O)O-phenyl, —C(=O)($C_1$-$C_6$ alkyl), —C(=O)-phenyl, —S(O)$_2$NH$_2$, —S(O)$_2$NH($C_1$-$C_6$ alkyl), —S(O)$_2$N($C_1$-$C_6$ alkyl)($C_1$-$C_6$ alkyl), —S($C_1$-$C_6$ alkyl), —S(O) ($C_1$-$C_6$ alkyl), —S(O)$_2$($C_1$-$C_6$ alkyl), —S(phenyl), —S(O)(phenyl), and —S(O)$_2$(phenyl).

32. The method of claim 31, wherein the reaction comprises at least one selected from the group consisting of atom transfer radical addition/polymerization, dehalogenation, cycloaddition, cyclization, dimerization, coupling, reduction, ring-opening, alkylation, arylation, oxygenation, energy transfer, electron transfer, radical substitution, and radical addition.

33. The method of claim 31, wherein the reaction comprises atom transfer radical addition/polymerization.

34. The method of claim 31, wherein the at least one reagent comprises a (meth)acrylate and an organic halide.

35. The method of claim 31, the reaction comprises a carbon-carbon bond formation coupling reaction, carbon-nitrogen bond formation coupling reaction, carbon-oxygen bond formation coupling reaction, carbon-sulfur bond formation coupling reaction, or a carbon-phosphorus bond formation coupling reaction.

36. The method of claim 35, wherein the reaction comprises an aryl carbon-aryl carbon bond formation coupling reaction, aryl carbon-alkyl carbon bond formation coupling reaction, aryl carbon-vinyl carbon bond formation coupling reaction, aryl carbon-nitrogen bond formation coupling reaction, aryl carbon-oxygen bond formation coupling reaction, aryl carbon-sulfur bond formation coupling reaction, or an aryl carbon-phosphorus bond formation coupling reaction.

37. The method of claim 35, wherein the carbon-carbon bond formation coupling reaction comprises an alkyl carbon-alkyl carbon bond formation coupling reaction.

38. The method of claim 32, wherein the radical substitution or radical addition comprises reaction with a vinyl group or an aromatic group.

\* \* \* \* \*